(12) United States Patent
Senti et al.

(10) Patent No.: US 12,081,076 B2
(45) Date of Patent: Sep. 3, 2024

(54) ELECTRIC MACHINES USING AXIALLY-MAGNETIZED CURVILINEAR PERMANENT MAGNETS

(71) Applicant: Advanced Magnet Lab, Inc., Melbourne, FL (US)

(72) Inventors: Mark Senti, Melbourne, FL (US); Philippe Masson, Rockledge, FL (US)

(*) Notice: Subject to any disclaimer, the term of this patent is extended or adjusted under 35 U.S.C. 154(b) by 0 days.

(21) Appl. No.: 18/222,382

(22) Filed: Jul. 14, 2023

(65) Prior Publication Data

US 2023/0361635 A1 Nov. 9, 2023

Related U.S. Application Data

(63) Continuation-in-part of application No. PCT/US2022/012622, filed on Jan. 14, 2022, which
(Continued)

(51) Int. Cl.
    *H02K 1/27* (2022.01)
    *H02K 1/02* (2006.01)
    *H02K 1/278* (2022.01)

(52) U.S. Cl.
    CPC ............. *H02K 1/278* (2013.01); *H02K 1/02* (2013.01)

(58) Field of Classification Search
    CPC .................................. H02K 1/278; H02K 1/02
    See application file for complete search history.

(56) References Cited

U.S. PATENT DOCUMENTS 8,928,198 B2 1/2015 Lutz et al.
2002/0153061 A1 10/2002 Harada et al.
(Continued)

FOREIGN PATENT DOCUMENTS

WO 2002101103 A2 12/2002

OTHER PUBLICATIONS

International Search Report, PCT/US2021/030980, dated Dec. 20, 2021.
(Continued)

*Primary Examiner* — Thomas Truong
(74) *Attorney, Agent, or Firm* — Lowndes; Stephen C. Thomas; Robert R. Fredeking

(57) ABSTRACT

A configuration of a plurality of elongate, axially-magnetized curvilinear permanent magnets having high length to cross-section ratio, produced, for example, by the PM-Wire manufacturing process, that produce an electric machine permanent magnet rotor structure with a very low intrinsic demagnetizing field, allowing for operation at high temperature, at high RPM, or enabling use of permanent magnets comprising low coercivity magnetic materials. Exemplary embodiments of two-pole, four-pole, six-pole and eight-pole rotor permanent magnet configurations for single and dual rotor applications. The novel configuration of axially-magnetized curvilinear permanent magnets reduces demagnetization at high temperature, increases electric machine power density, reduces weight by eliminating the need for back iron, increases motor reliability, reduces manufacturing costs, and enables higher electric motor torque and electric generators. Electric machines, rotors and magnets of the invention may contain no rare earth magnetic materials.

15 Claims, 49 Drawing Sheets

Related U.S. Application Data is a continuation-in-part of application No. PCT/US2021/030980, filed on May 5, 2021.

(60) Provisional application No. 63/137,363, filed on Jan. 14, 2021.

(56) References Cited

U.S. PATENT DOCUMENTS

| | | |
|---|---|---|
| 2004/0222713 A1* | 11/2004 | Sidey .................... H02K 1/278 310/156.43 |
| 2004/0245321 A1 | 12/2004 | Spitz |
| 2013/0093121 A1 | 4/2013 | Honkura et al. |
| 2015/0001970 A1* | 1/2015 | Zhang ..................... H02K 1/17 310/43 |
| 2015/0303749 A1* | 10/2015 | Okubo ................... H02K 21/14 310/156.38 |
| 2017/0098971 A1 | 4/2017 | Kobayashi et al. |
| 2017/0187258 A1 | 6/2017 | Fujikawa et al. |
| 2019/0027984 A1 | 1/2019 | Bott et al. |
| 2019/0122818 A1 | 4/2019 | Meinke |
| 2022/0407374 A1 | 12/2022 | Radford et al. |

OTHER PUBLICATIONS

Written Opinion of the ISA, PCT/US2021/030980, dated Dec. 20, 2021.
International Search Report, PCT/US2022/012622, dated May 5, 2022.
Written Opinion of the ISA, PCT/US2022/012622, dated May 5, 2022.

* cited by examiner

ELECTRIC MACHINES USING AXIALLY-MAGNETIZED CURVILINEAR PERMANENT MAGNETS

CROSS REFERENCE TO RELATED APPLICATIONS AND INCORPORATION BY REFERENCE

This patent application is a continuation in part of international patent application PCT/US22/12622, entitled ELECTRICAL MACHINES USING AXIALLY-MAGNETIZED CURVILINEAR PERMANENT MAGNETS, filed in the United States Patent and Trademark Office (USPTO) Receiving Office on Jan. 14, 2022, which published as WO/2022/155535 on Jul. 21, 2022, the disclosure of which is incorporated herein by reference in its entirety; international patent application PCT/US22/12622 claims benefit of priority to U.S. provisional patent application Ser. No. 63/137,363, entitled PERMANENT MAGNETS HAVING CURVILINEAR SHAPES WITH AXIAL MAGNETIZATION, filed in United States Patent and Trademark Office (USPTO) on Jan. 14, 2021, the disclosure of which is incorporated by reference herein in its entirety; this application is also a continuation in part of, and claims priority to, International (PCT) Application No. PCT/US21/30980, entitled METHOD FOR CONTINUING MANUFACTURING OF PERMANENT MAGNETS, filed in the United States Receiving Office (USRO) of the USPTO on May 5, 2021 and which published as WO 2021/226293 on Nov. 11, 2021, the disclosure of which is incorporated by reference herein in its entirety; PCT/US21/30980 is a non-provisional of, and claims benefit of priority to, U.S. provisional patent application Ser. No. 63/137,363, entitled PERMANENT MAGNETS HAVING CURVILINEAR SHAPES WITH AXIAL MAGNETIZATION, filed in United States Patent and Trademark Office (USPTO) on Jan. 14, 2021, the disclosure of which is incorporated by reference herein in its entirety; and PCT/US21/30980 is also a non-provisional of, and claims benefit of priority to, U.S. provisional patent application Ser. No. 63/020,039, entitled METHOD FOR CONTINUOUS MANUFACTURING OF PERMANENT MAGNETS, which was filed in the USPTO on May 5, 2020 the disclosure of which is incorporated by reference herein in its entirety.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISK

Not applicable.

BACKGROUND OF THE INVENTION

1. Field of the Invention

The field of the invention relates generally to novel structures for permanent magnet electric machines such as, for example, electric motors and generators. More specifically, the invention relates to novel configurations of rotors for electric machines comprising permanent magnets, and further, the field of the invention relates to configurations, characteristics, and methods of manufacture and magnetization of axially-magnetized curvilinear permanent magnets and magnet arrays used in the design and production of electric machines, including electric machine rotors, and methods of producing such magnets.

2. Background Art

Permanent magnet synchronous machines (for example motors and generators) of the prior art typically comprise a rotor and a stator that are coaxially disposed. Such synchronous permanent magnet machines use permanent magnets disposed in a steel rotor to create a constant magnetic field having magnetic poles. The stator typically comprises windings connected to a source of electric current that, when used to energize the stator windings, produce a rotating magnetic field. At synchronous speed, the rotor poles lock to the rotating magnetic field produced by current in the stator windings, causing the rotor to rotate relative to the stator, on their common axis. Neodymium or other rare earth magnets are often used in permanent magnet rotors; however, these materials are expensive and are critical and even strategic resources, so they are subject to supply chain disruption. Ferrite magnets are sometimes proposed or used as an alternative, but due to the inherent characteristics of the currently available ferrite magnets, the design of the magnetic circuit of permanent magnet electric machines using such magnets need to be able to concentrate the magnetic flux. One of the most common strategies to direct and concentrate the magnetic flux produced by the permanent magnets is to use back iron, or any ferrous material, to achieve magnetic flux direction and concentration so that higher power density can be achieved. Even so, permanent magnet electrical machines that use ferrite magnets have lower power density and torque density, when compared with machines that use neodymium and other rare earth magnets. Moreover, the use of iron or other ferrous materials to direct and concentrate the magnetic flux produced by the permanent magnets comprising the rotor are heavy, reducing or eliminating the use of such rotor magnets in the design of, for example, electric motors for propulsion of aircraft, rotorcraft, drones and other electrically powered vehicles for which motor weight is a design consideration.

In addition, permanent magnet synchronous motors and generators are typically designed for high power density. Reaching high power density requires both a high magnetic loading (excitation magnetic field generated by the rotor) and high electric loading (electric currents in the stator). Reaching high current density in the stator winding leads to heat generation that contributes to a temperature increase of the rotor through heat transfer mostly from convection and radiation in the air gap between stator and rotor, as well as conduction in the structural components of the motor that provide a thermal path for heat transfer between stator and rotor. As a result, permanent magnets comprising the rotor must operate at high temperatures, sometimes in the range 120 C-150 C or above, which is at the limit of safe operation of permanent magnets comprised of NdFeB or SmCo materials as shown in FIG. 47. In FIG. 47, the x-axis shows the intrinsic coercivity field which represents the magnitude of the magnetic field opposed to the magnetization of the magnets; the coercivity field decreases quickly with increasing temperature. For example, a N50H grade magnet exhibits a coercivity field of over 1.7 T at 20° C., but the coercivity reduces to less than 0.5 T when the magnet is heated to 150° C.

Thus, there is, and has been for a long time, a need in the art for higher power density electrical machines that do not rely on strategically sensitive rare earth metals, does not rely upon iron or ferrous materials, or at least minimizes the use of such materials, to direct and concentrate the magnetic flux produced by the rotor permanent magnets, and is able to operate efficiently and maintain high power density at elevated temperatures ranging up to 120° C.-150° C., or higher.

What is also needed in the art, therefore, is an apparatus and/or method for providing permanent magnet configurations that present as low an intrinsic demagnetizing field as possible, so that low coercivity magnetic materials, for example, magnetic materials with coercivity of between 0.5 and 0.9 Tesla at 20° C., may be used in electric machines that may experience operating temperatures up to and exceeding 120° C., even up to and exceeding 150° C.

BRIEF SUMMARY OF THE INVENTION

The present invention comprises an apparatus and method that have one or more of the following features and/or steps, which alone or in any combination may comprise patentable subject matter.

It is an object of the invention to produce a permanent magnet electric machine rotor that reduces, or eliminates altogether, the use of expensive Neodymium or other rare earth materials. In embodiments, the electric machines, electric machine rotors, and/or the permanent magnets of the invention may not comprise any rare earth magnetic materials.

Is it an object of the invention to produce a permanent magnet electric machine rotor that uses low cost, low coercivity, readily available permanent magnet material in the rotor permanent magnets, reducing cost of the magnets, the rotor, and the electric machine.

It is an object of the invention to produce a permanent magnet electric machine rotor that reduces, or eliminates altogether, the use of iron or other ferrous materials to direct and concentrate the magnetic field generated by the rotor permanent magnets, resulting in lighter weight electric motors suitable as propulsion systems for aircraft.

It is also an object of the invention to produce a permanent magnet electric machine rotor that is operable to generate high power density at temperatures up to 120° C.-150° C., or higher.

It is an object of the invention to provide a structure and method of manufacture that enables and produces permanent magnets having a very low intrinsic demagnetizing field allowing for operation at high temperature or with permanent magnets with low coercivity fields such as AlNiCo that has been heretofore unusable by prior art methods and structures of permanent magnet manufacture.

It is also an object of the invention to provide a permanent magnet that is easy to manufacture, and comprises a mechanical shape and/or structure that is readily adaptable for use in high RPM (rotations per minute) motors, such that it lends itself to ease of mechanical containment of the permanent magnet in high RPM motors.

In embodiments, the invention comprises an axially-magnetized curvilinear permanent magnet for use in electric machine rotors that enables a significant reduction in rotor magnet demagnetization effects that plague prior art electric machine permanent magnet rotors, and method of manufacture of such rotors.

In embodiments, the invention comprises a system of permanent magnets for a rotor of an electric machine, comprising a plurality of axially-magnetized curvilinear permanent magnets that are configured in a rotor so as to be in magnetic communication with the magnets of a stator, forming a rotor-stator pair for use in an electric machine, having novel features for improving electrical machine performance over the prior art.

In embodiments, the invention comprises rotors for electric machines that comprise one or more axially-magnetized curvilinear permanent magnets that enable a significant reduction in rotor magnet demagnetization effects that plagues prior art electric machine permanent magnet rotors.

In embodiments, the invention comprises electric machines comprising rotors having one or more axially-magnetized curvilinear permanent magnets that enable a significant reduction in rotor magnet demagnetization effects that plagues prior art electric machine permanent magnet rotors.

In embodiments, the invention comprises a system of permanent magnets for a rotor of an electric machine, comprising: a plurality of axially-magnetized curvilinear permanent magnets that are configured in a rotor; each magnet of said plurality of axially-magnetized curvilinear permanent magnets being elongate, having a cross sectional shape, and having a curvilinear longitudinal axis; wherein each magnet of said plurality of axially-magnetized curvilinear permanent magnets is disposed such that the resulting magnetic field vector inside each of the plurality of axially-magnetized curvilinear permanent magnets is aligned or substantially aligned with said curvilinear permanent magnet axial magnetization. The curvilinear longitudinal axis of each magnet of said plurality of axially-magnetized curvilinear permanent magnets may further defined as being arcuate in shape, the arcuate shape having an apex, and an open end, and wherein the curvilinear longitudinal axis each magnet of said plurality of axially-magnetized curvilinear permanent magnets is contained within a plane. The plane of the curvilinear longitudinal axis each magnet of said plurality of axially-magnetized curvilinear permanent magnets may be oriented orthogonally to an axis of rotation of the rotor comprising the plurality of axially-magnetized curvilinear permanent magnets. The apex of the arcuate-shaped longitudinal axis of each magnet of the plurality of axially-magnetized curvilinear permanent magnets may be oriented towards the axis of rotation of the rotor.

In embodiments, the invention may comprise a system of permanent magnets for an outer rotor of a dual rotor electric machine, comprising: a plurality of axially-magnetized curvilinear permanent magnets that are configured in an outer rotor of a dual rotor electric machine; each magnet of said plurality of axially-magnetized curvilinear permanent magnets being elongate, having a cross sectional shape, and having a curvilinear longitudinal axis; wherein each magnet of said plurality of axially-magnetized curvilinear permanent magnets is disposed such that the resulting magnetic field vector inside each of the plurality of axially-magnetized curvilinear permanent magnets is aligned or substantially aligned with said curvilinear permanent magnet axial magnetization.

In embodiments, the invention may comprise a permanent magnet rotor for an electrical machine, comprising: a plurality of axially-magnetized curvilinear permanent magnets that are configured in the rotor so as to be in magnetic communication with the magnets of a stator, forming a rotor-stator pair for use in an electric machine; each magnet of said plurality of axially-magnetized curvilinear permanent magnets being elongate, having a cross sectional shape, and having a curvilinear longitudinal axis; wherein each magnet of said plurality of axially-magnetized curvilinear permanent magnets is disposed such that the resulting magnetic field vector inside each of the plurality of axially-magnetized curvilinear permanent magnets is substantially aligned with said curvilinear permanent magnet axial magnetization; a structure for supporting said plurality of axially-magnetized curvilinear permanent magnets; and a rotor shaft attached to the structure, the rotor shaft having a longitudinal axis. The curvilinear axis of the axially-magnetized curvilinear permanent magnets may be arcuate.

In embodiments, the invention may comprise a permanent magnet outer rotor for a dual rotor electric machine, comprising: a plurality of axially-magnetized curvilinear permanent magnets that are configured in an outer rotor of a dual rotor electric machine; each magnet of said plurality of axially-magnetized curvilinear permanent magnets being elongate, having a cross sectional shape, and having a curvilinear longitudinal axis; wherein each magnet of the plurality of axially-magnetized curvilinear permanent magnets is disposed such that the resulting magnetic field vector inside each of the plurality of axially-magnetized curvilinear permanent magnets is substantially aligned with said curvilinear permanent magnet axial magnetization; a structure for supporting the plurality of axially-magnetized curvilinear permanent mag-nets; and a rotor shaft attached to said structure, the rotor shaft having a longitudinal axis. The curvilinear axis of the axially-magnetized curvilinear permanent magnets may be arcuate.

In embodiments, the invention may comprise an axially-magnetized curvilinear permanent magnet having a length, produced by the steps of: providing an elongate curvilinear permanent magnet having a curvilinear longitudinal axis; placing the elongate curvilinear permanent magnet in a magnetic field that, for the length of the elongate curvilinear permanent magnet, the magnetic field magnetization vector is aligned with the curvilinear longitudinal axis of said curvilinear permanent magnet; wherein the magnetic field is of sufficient strength, and is applied for a long enough period of time, that the magnetic material comprising the elongate permanent magnet is permanent axially magnetized with a magnet magnetization vector that is aligned with the curvilinear longitudinal axis of the elongate curvilinear permanent magnet. The axially-magnetized curvilinear permanent magnet having a length of claim 53, wherein said curvilinear longitudinal axis is further defined as being arcuate. The curvilinear permanent magnet may be produced by the steps of; providing a tube having an interior volume a length, a first end, and a second end; providing a magnetic powder; filling the interior volume of the tube with anisotropic or isotropic magnetic powder while subjecting the anisotropic magnetic powder to a pre-aligning magnetic field while the magnetic powder is being poured into the tube; and subjecting the exterior surfaces of the tube to compressive forces, reducing the cross-sectional size of the tube, and compressing the magnetic material within the tube.

In any of the embodiments, the axially-magnetized curvilinear permanent magnets of the invention may comprise a magnetic material characterized by a coercivity of less than 0.9 Tesla at 20° C., and the permanent magnets may each have less than 20% by volume demagnetization when operating at 150° C. In embodiments, the axially-magnetized curvilinear permanent magnets may comprise a magnetic material characterized by a coercivity of less than 0.9 Tesla at 20° C. In embodiments, the axially-magnetized curvilinear permanent magnets may comprise a magnetic material characterized by a coercivity of less than 0.8 Tesla at 20° C. In embodiments, the axially-magnetized curvilinear permanent magnets of the invention may comprise a magnetic material characterized by a coercivity of less than 0.7 Tesla at 20° C. In embodiments, the axially-magnetized curvilinear permanent magnets of the invention may comprise a magnetic material characterized by a coercivity of less than 0.6 Tesla at 20° C. In embodiments, the axially-magnetized curvilinear permanent magnets of the invention may comprise a magnetic material characterized by a coercivity of less than 0.5 Tesla at 20° C. In embodiments, the permanent magnets of the invention may each have less than 15% by volume demagnetization when operating at 150° C.

In a non-limiting embodiment, the invention comprises a configuration and assembly of permanent magnets, produced, for example, by the Applicant's PM-Wire (Permanent Magnet-Wire) manufacturing process and the method step and structures described herein, that produce a final structure with a very low intrinsic demagnetizing field allowing for operation at high temperature or with permanent magnets with low coercivity fields. As used herein, "PM-Wire" includes within its meaning permanent magnets fabricated by the PM-Wire process. In this disclosure, exemplary embodiments of resulting permanent magnet structures using PM-Wire permanent magnets are described and shown, however it is to be understood that these are exemplary embodiments and are non-limiting, as the methods of the invention are intended to produce resulting permanent magnet structures of any desired physical configuration, producing any desired magnetic field geometry or strength.

In embodiments, the magnets of the invention may comprise anisotropic magnetic materials, or isotropic magnetic materials, or any combination of both. In embodiments, the electric machines, rotors and magnets of the invention may comprise low-coercivity magnetic materials. In embodiments, the electric machines, rotors and magnets of the invention may not contain any rare earth magnetic materials.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating exemplary embodiments of the invention and are not to be construed as limiting the invention. In the drawings:

FIG. 21 depicts a perspective view, and FIG. 22 depicts a top orthogonal view.

Figure 1:
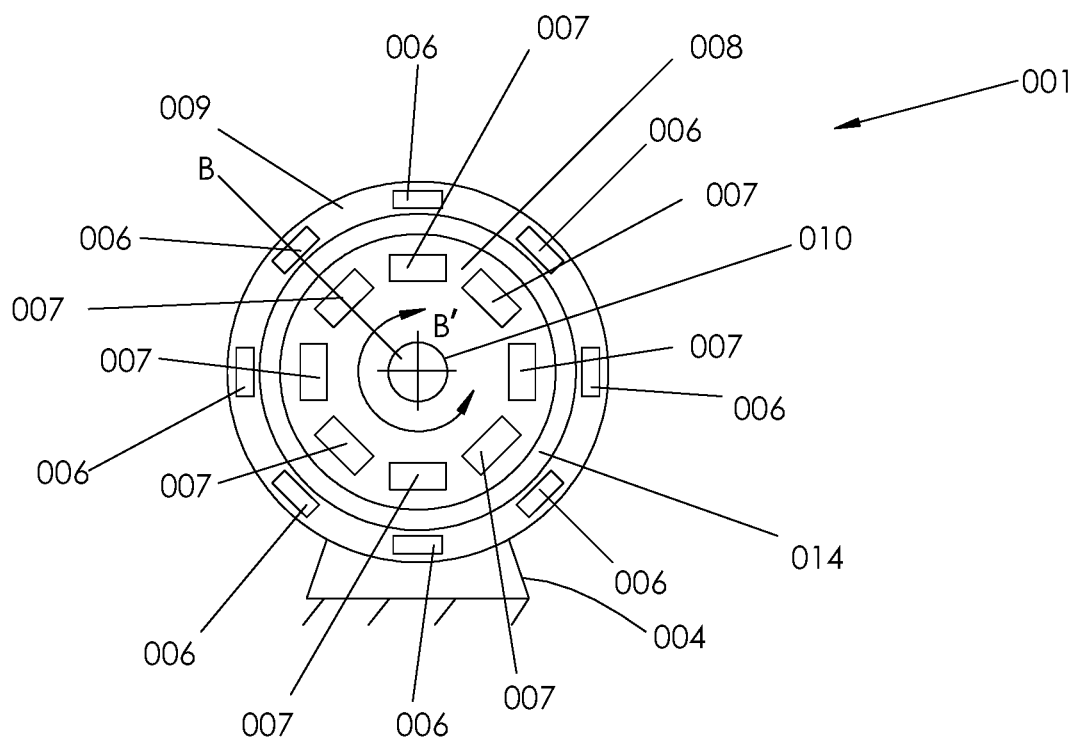
FIG. 1 depicts a schematic diagram of an electrical machine having a single permanent magnet rotor.

In the figures of the drawings, like callouts refer to like items. Magnetic field lines exit the north pole of a permanent magnet, and enter the south pole of a permanent magnet. Magnetic field lines are represented by lines leaving the north pole of a permanent magnet and entering the south pole of a permanent magnet, with superimposed arrow heads to indicate magnetic field direction. Magnetic field lines that are closer together indicate a higher magnetic field density, and magnetic field lines that are further apart from one another indicate a higher lower field density. In the figures, "N" means North and "S" means South.

DETAILED DESCRIPTION OF THE INVENTION

The following provides a detailed description of the invention.

Although a detailed description as provided in this application contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention. Thus, the scope of the invention should be determined by the appended claims and their legal equivalents, and not merely by the preferred examples or embodiments given.

As used herein, "axial" and "axially arranged" include within their meaning structures that are arranged along an axis of rotation of the electrical machine, such as, for example, the longitudinal axis of an electrical machine, rotor or stator. An example of a longitudinal axis of an electrical machine is the longitudinal axis of a rotable shaft of an electric motor or generator.

As used herein, "radial" and "radially arranged" includes within their meanings structures that are arranged generally along a direction that is orthogonal to an axis of rotation of the electrical machine, or in a plane orthogonal to an axis of rotation of the electrical machine. As an example, the reference axis may be the longitudinal axis of a rotable shaft of an electric motor or generator.

As used herein, "axially magnetized" refers to a permanent magnet that has been magnetized such that the direction of magnetization of the permanent magnet generally, or substantially, follows, i.e. is aligned with, a longitudinal axis of the permanent magnet. The longitudinal axis of the permanent magnet may be linear, curvilinear or any other shape, even three-dimensional. In the case of a curvilinear permanent magnet, the longitudinal axis is curvilinear. The principles discussed relative to curvilinear permanent magnets of the invention also apply to permanent magnets with linear or other shapes.

As used herein, "electric machine" means any device or system that uses electric current to generate electromagnetic forces that are then converted to mechanical power (such as rotation of a motor shaft, as in the case of a motor) or converts mechanical power (such as rotation of a rotor shaft) to electromagnetic forces that are used to generate electric current (such as in the case of a generator). Electric machines, as used herein, typically comprise a stator and a rotor.

As used herein, "coercivity" is a measure of the resistance of a magnetic material to changes in magnetization when subjected to magnetic fields opposite to the direction of magnetization or demagnetizing field. High coercivity magnetic materials, such as some rare earth materials, are able to resist higher demagnetizing fields than low coercivity materials. Units of coercivity are Amperes/meter (A/m), or kA/m. "Intrinsic coercivity" is the H field required to reduce the magnetization (average M field inside the magnet material) to zero. A "low coercivity" magnetic material is defined as a magnetic material with coercivity of between up 0.9 Tesla at 20° C. In embodiments a low coercivity magnetic material may have a coercivity greater than 0.9 at 20° C.

As used herein, "resulting field" and "resulting magnetic field" refers to the magnetic field produced by the permanent magnets of a permanent magnet electric machine rotor when those magnets are arranged in the rotor in a given configuration.

As used herein, "magnetic material" includes within its meaning any material that exhibits the capacity of retaining a magnetization in the absence of external magnetic field or in the presence of an opposing external magnetic field. The magnetic flux density B is related to the magnetization vector M, and the magnetic field intensity H via $B=\mu(H+M)$, in a permanent magnet in zero external field, M and H have opposite directions and H is the demagnetizing field. A hard magnetic material will retain its magnetization for values of opposing magnetic field H; the value of H leading to the decrease of M to 0 is called the intrinsic coercivity of the material. Magnetic materials are also said to be "magnetizable," meaning that the application of a magnetic field causes the material itself to become a source of the magnetic field. "Magnetic materials" further includes but is not limited to magnetic materials comprising any one or more of the iron nitrides $Fe_2N$, $Fe_3N_4$, $Fe_4N$, $Fe_7N_3$, $Fe_{16}N_2$, NdFeB, SmCo AlNiCO, and SmFeN in any combination. Thus, as used herein, "magnetic materials" may, but does not necessarily, comprise an iron nitride.

"Isotropic magnetic materials" includes within its meaning magnetic materials characterized as having magnetic properties that are not dependent upon a magnetization direction.

"Anisotropic magnetic materials" includes within its meaning materials characterized as having magnetic properties that are dependent upon their magnetization direction, meaning that they have different levels of magnetism in varying magnetization directions.

Referring now to FIG. 1, a schematic view of an exemplary electric machine 001 is depicted for the purposes of establishing basic terminology and electric machine configuration and operation. A rotor assembly 008, that is mechanically attached to a rotor shaft 010 having an axis of rotation B comprises a one or more, or a plurality of, rotor permanent magnets 007, and is typically disposed within (or interior to) an opening in stator assembly 009. Stator assembly 009 may comprise one or more, or a plurality of, stator coils, or stator electromagnets, 006 for either generating a rotating magnetic field that interacts with the rotor permanent magnets 007 (as in the case in which electric machine 001 is operated as an electric motor), or for generating an electric current when rotor assembly 008 is rotated by a mechanical rotating force operating on rotor shaft 010 (as in the case in which electric machine 001 is operated as an electric generator). Rotor assembly 008 and stator assembly 009 are not mechanically coupled, i.e., they free to rotate with respect to one another on common axis of rotation B as indicated by arrow B', and further, there is an air gap 005 between an outer surface of rotor assembly 008 and an inner surface of stator assembly 009, allowing rotor 008 to rotate freely, without interference, with respect to stator assembly 009, and vice versa. Stator assembly 009 may be fixed to a base or other permanent structure 004.

Still referring to FIG. 1, in the exemplary case of the single-rotor permanent magnet electric machine 001 being used as an electric motor, when a multi-phase alternating electric current is applied to each of stator coils 006, a rotating magnetic field is produced that is in magnetic communication with rotor permanent magnets 007, causing rotor assembly 008 to rotate, and also causing rotor shaft 010 to rotate, about rotor axis A. Thus, in this exemplary motor case, a single-rotor permanent magnet electric machine 001 has converted electric current to rotational mechanical energy.

Still referring to FIG. 1, in the exemplary case of the single-rotor permanent magnet electric machine 001 being used as an electric generator, a reverse process is used: a mechanical rotating force tending to rotate rotor shaft 010 along arrow B' is applied to rotor shaft 010, causing rotor assembly 008 and its rotor permanent magnets 007 to rotate about axis A, resulting in a rotating magnetic field that acts on stator coils 006 because stator coils 006 are disposed so as to be in magnetic communication with the rotor's rotating magnetic field. Since stator assembly 009 is fixed, i.e. cannot rotate with the rotating magnetic field, an electric current is generated in stator coils 006, thus producing electric current output from an input rotating mechanical force.

Still referring to FIG. 1, in embodiments, portions of rotor assembly 008 or rotor shaft 010 may be disposed in rotatable engagement with a structure such as 004 or any other structure, such as may be accomplished using bearing or other rotatable structure. Thus, rotor assembly 008 may be mechanically supported by such rotatable engagement as is known in the mechanical arts while it freely rotates within the opening in stator assembly.

Figure 2:
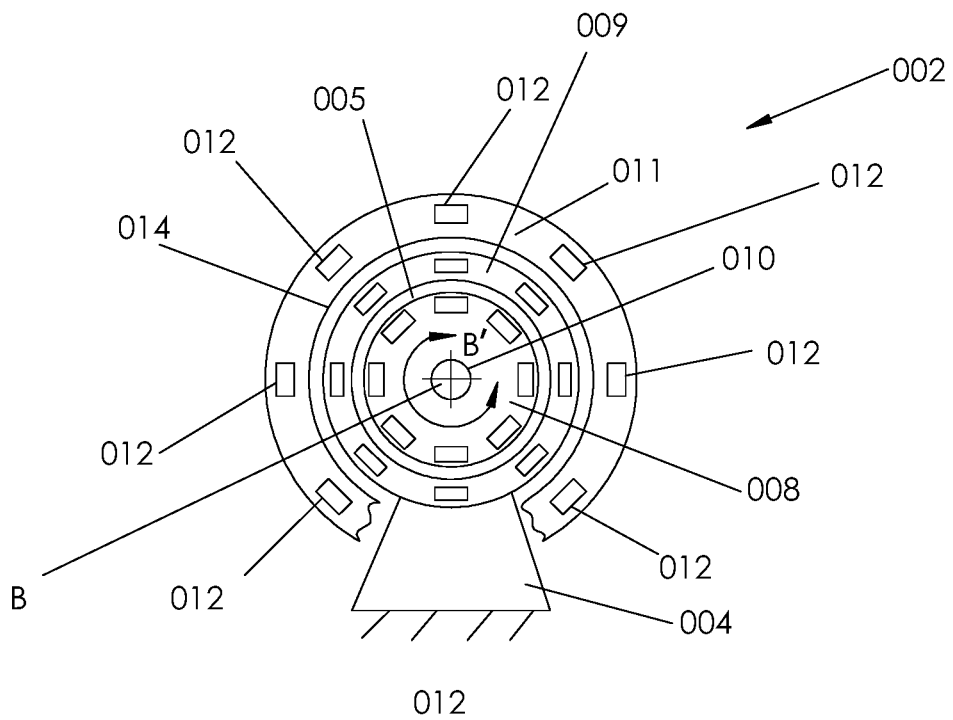
FIG. 2 depicts a schematic diagram of an electrical machine having a dual permanent magnet rotor.

Referring now to FIG. 2, a schematic view of an exemplary dual-rotor permanent magnet electric machine 002 is depicted for the purposes of establishing basic terminology and electric machine configuration and operation. In FIG. 2, the rotor shaft 010, rotor assembly 008, and stator assembly are configured and disposed, and operate, as described above relative to FIG. 1; however, a second rotor assembly, outer rotor assembly 011, has been added, forming a dual-rotor permanent magnet electric machine 002 which has a rotor-stator-outer rotor configuration, which increases the number of rotor permanent magnets 007 and 012 that are either 1) in magnetic communication with the stator rotating magnetic field (in the case in which dual-rotor permanent magnet electric machine 002 is operated as a motor) or are used to generate a rotor rotating magnetic field that is in magnetic communication with, i.e. is in flux linkage with, stator coils 006 (in the case in which dual-rotor permanent magnet electric machine 002 is operated as a generator). Outer rotor assembly 013 may be mechanically coupled to rotor assembly 008 such that they rotate together with respect to stator assembly 009, about axis of rotation B. Outer rotor assembly 011 may comprise one or more, or a plurality of, permanent magnets 012. There may be a stator-outer rotor air gap 014 between an outer surface of stator assembly 009 and an inner surface of outer rotor assembly 011, allowing rotor assembly 011 to rotate freely, without interference, with respect to stator assembly 009, and vice versa. In the dual rotor permanent magnet electric machine 002 depicted in FIG. 2, stator assembly 009 may be disposed inside an opening in outer rotor assembly 011.

Still referring to FIG. 2, in the exemplary case of the dual-rotor permanent magnet electric machine 002 being used as an electric motor, when an electric current is applied to each of stator coils 006, a rotating magnetic field is produced that is in magnetic communication with rotor permanent magnets 007 comprising rotor assembly 008, and with permanent magnets 012 comprising outer rotor assembly 011, causing the assembly comprising rotors 008 and 011 to rotate, and also causing rotor shaft 010 to rotate, about rotor axis A. Thus, in this case, dual-rotor permanent magnet electric machine 001 has converted electric current to rotational mechanical energy.

Still referring to FIG. 2, in the exemplary case of the dual-rotor permanent magnet electric machine 002 being used as an electric generator, a reverse process is used: a mechanical rotating force tending to rotate rotor shaft 010 along arrow B is applied to rotor shaft 010, causing rotor assembly 008 and its rotor permanent magnets 007, as well as outer rotor assembly 011 and its permanent magnets 012, to rotate about axis A, resulting in a rotating magnetic field that acts on stator coils 006 because stator coils 006 are disposed so as to be in magnetic communication with the rotating magnetic field. Since stator assembly 009 is fixed, i.e. cannot rotate with the rotating magnetic field, an electric current is generated in stator coils 006, thus producing electric current output from an input rotating mechanical force.

Figure 3:
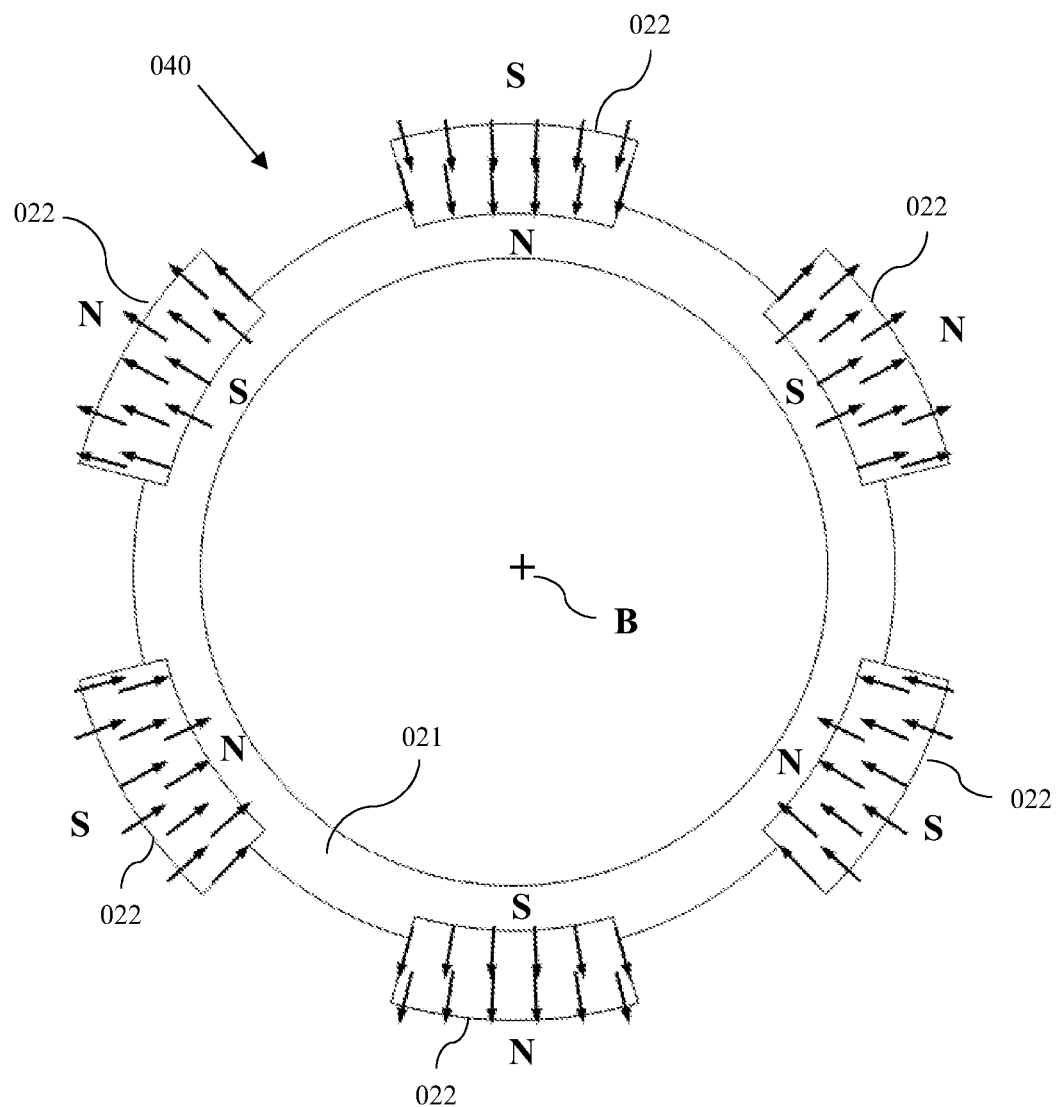
FIG. 3 depicts a schematic view of a prior art six-pole N-S permanent magnet rotor having back iron.
Figure 4:
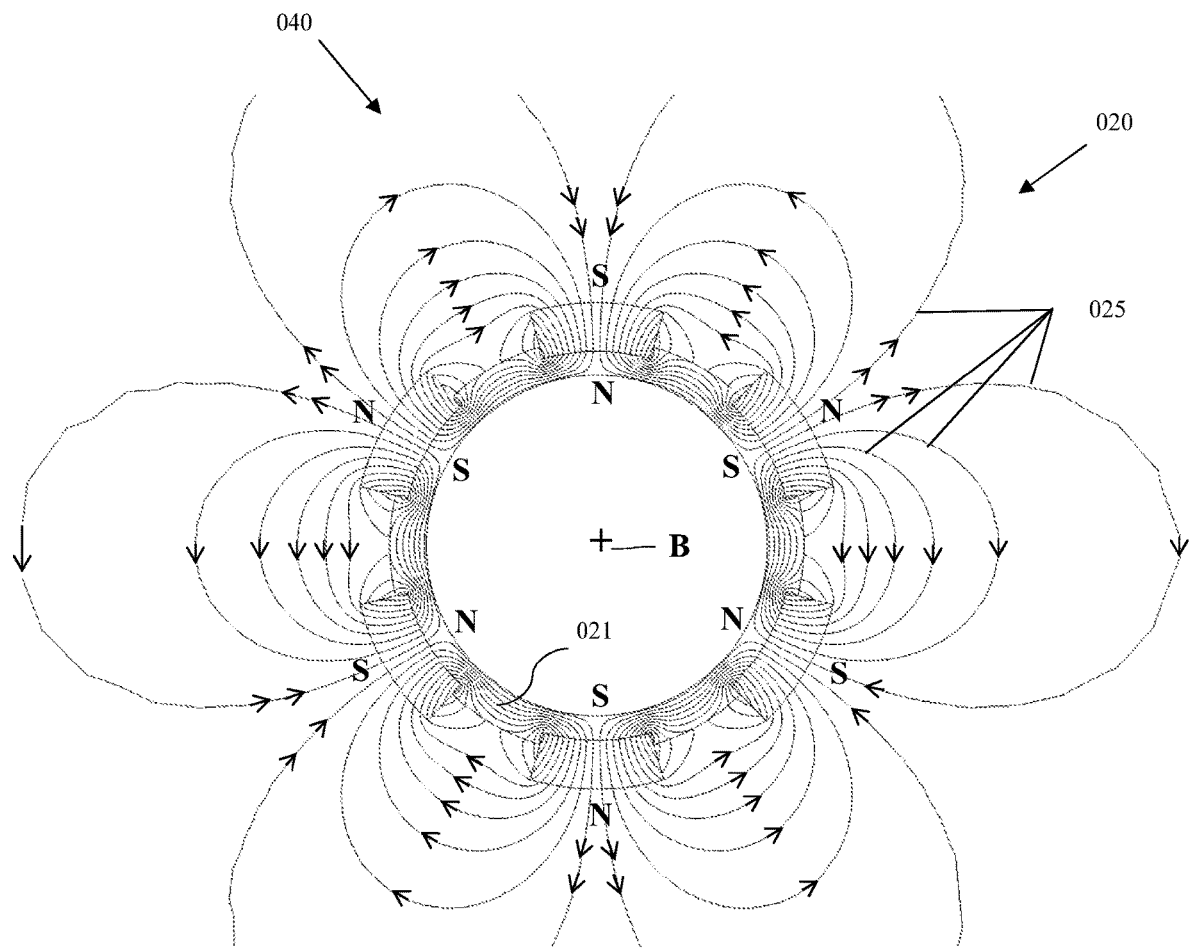
FIG. 4 depicts the resulting magnetic field associated with a prior art six-pole N-S permanent magnet rotor having back iron.

Referring now to FIGS. 3 and 4, an end view of a prior art six-pole N-S permanent magnet rotor 040 having an iron structure 021 for directing the magnetic field produced by permanent North-South magnets 022 is depicted for comparison to embodiments of the claimed invention. Permanent North-South magnets 022 are attached to the iron structure, such as iron core, or back iron, 021, with magnetization direction and N-S pole orientation as indicated by the arrows in FIG. 3. Permanent magnets 022 are used to produce the magnetic field depicted in FIG. 1D. In FIG. 4 it can be seen that each magnetic field line 025, which follows the direction of the magnetic field produced by each permanent magnet 025 exits a North pole and closes back upon a South pole. So, in the six-pole N-S permanent magnet prior art rotor 040 example shown for comparison purposes in FIGS. 3 and 4, magnetic field lines 025 are directed away from permanent magnets 022 north poles, and towards permanent magnets 022 south poles, as depicted in FIG. 4. Referring now to FIG. 1D, the following observations may be made: 1) the resulting magnetic fields produced by N-S permanent magnets 022 emanating outer rotor 040 are the magnetic fields that are in magnetic communication with, and therefore interact with, stator coils 006 as described above; 2) the back iron structure 021 directs the magnetic field on the inside side of N-S permanent magnets 022 such that the magnetic field is concentrated into, and directed by, the back iron 021 itself, and very little of it emanates outer the back iron 021 into the inside area of the rotor, causing tightly curving magnetic field lines as these field lines enter and exit N-S permanent magnets 022 on the inside side of the magnets; and 3) the resulting magnetic field lines inside N-S permanent magnets 022 deviate from, i.e. are not aligned with, the direction of magnetization of N-S permanent magnets 022 themselves. Said another way, the resulting magnetic field vectors inside permanent magnets 022 are not equal in magnitude and direction to each magnet's own magnetic field vector at all points within permanent magnet 022. In fact, in certain regions within permanent magnet 022 in which the difference between the magnetic field vector and the magnet's own magnetic field vector is substantial. This vector difference between the resulting magnetic field vector inside N-S permanent magnets 022, and magnetization vector of N-S permanent magnets 022, which has both a direction and magnitude, may be defined as a demagnetizing field vector that results in a local reduction of the magnetization and, in some cases, irreversible demagnetization of N-S permanent magnets 022. The demagnetization effect is proportional in a non-linear fashion to the vector difference at any point within permanent magnets 022, and thus may not be uniform over a cross section of N-S permanent magnets 022. I.e., the greater the deviation vector at any point in N-S permanent magnets 022, the greater the demagnetization field, and the greater the demagnetization. If the demagnetization field is strong enough at any point, that point or portion of N-S permanent magnets 022 can be permanently demagnetized, depending on the magnets intrinsic coercivity and the magnets temperature.

Figure 18:
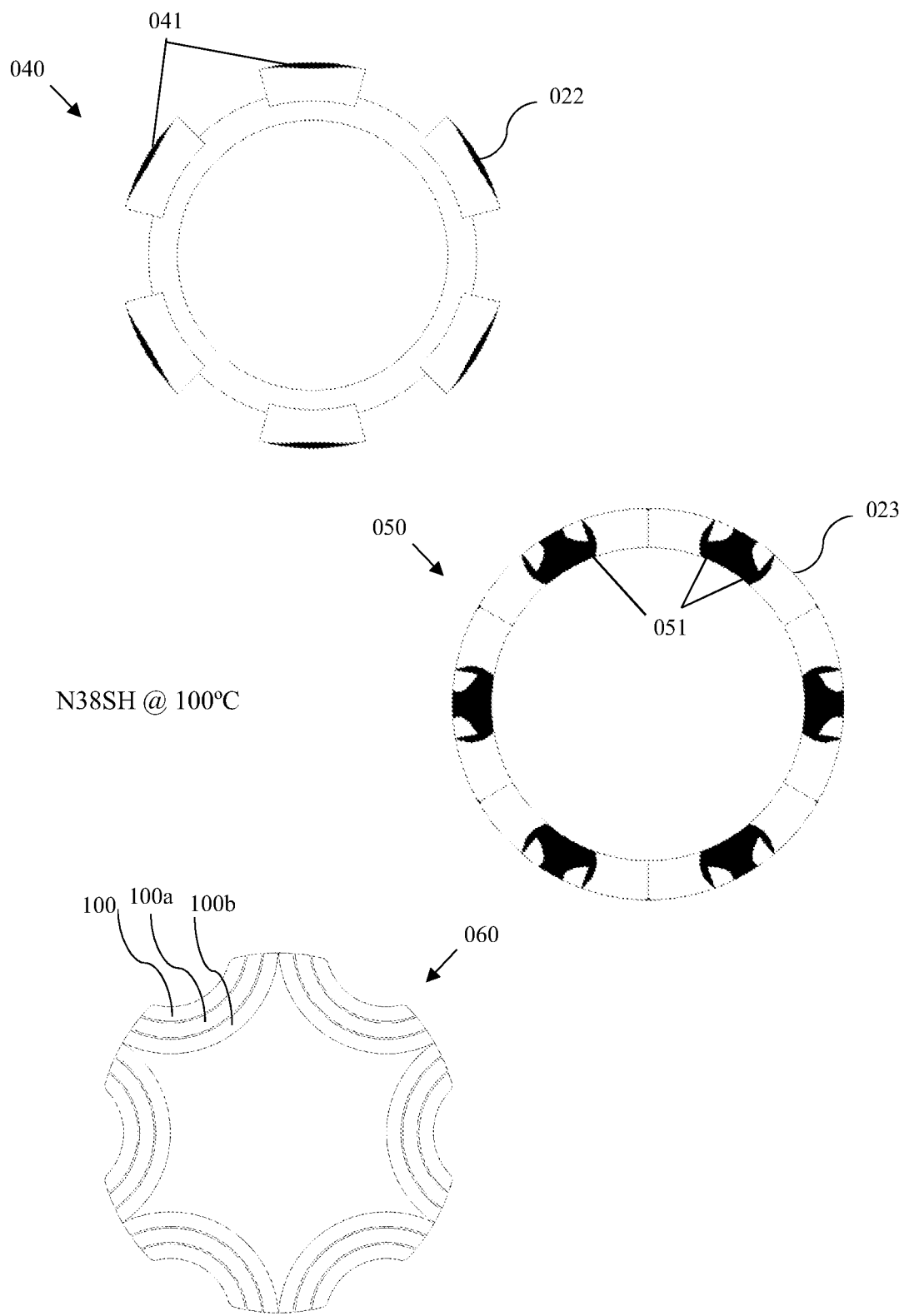
FIG. 18 depicts a comparison of demagnetization as between a six-pole prior art N-S permanent magnet rotor having back iron, a prior art six-pole Halbach permanent magnet array, and a six-pole magnet configuration of the invention that uses axially-magnetized curvilinear permanent magnets of the invention, at 100° C., for N48SH magnet material.
Figure 19:
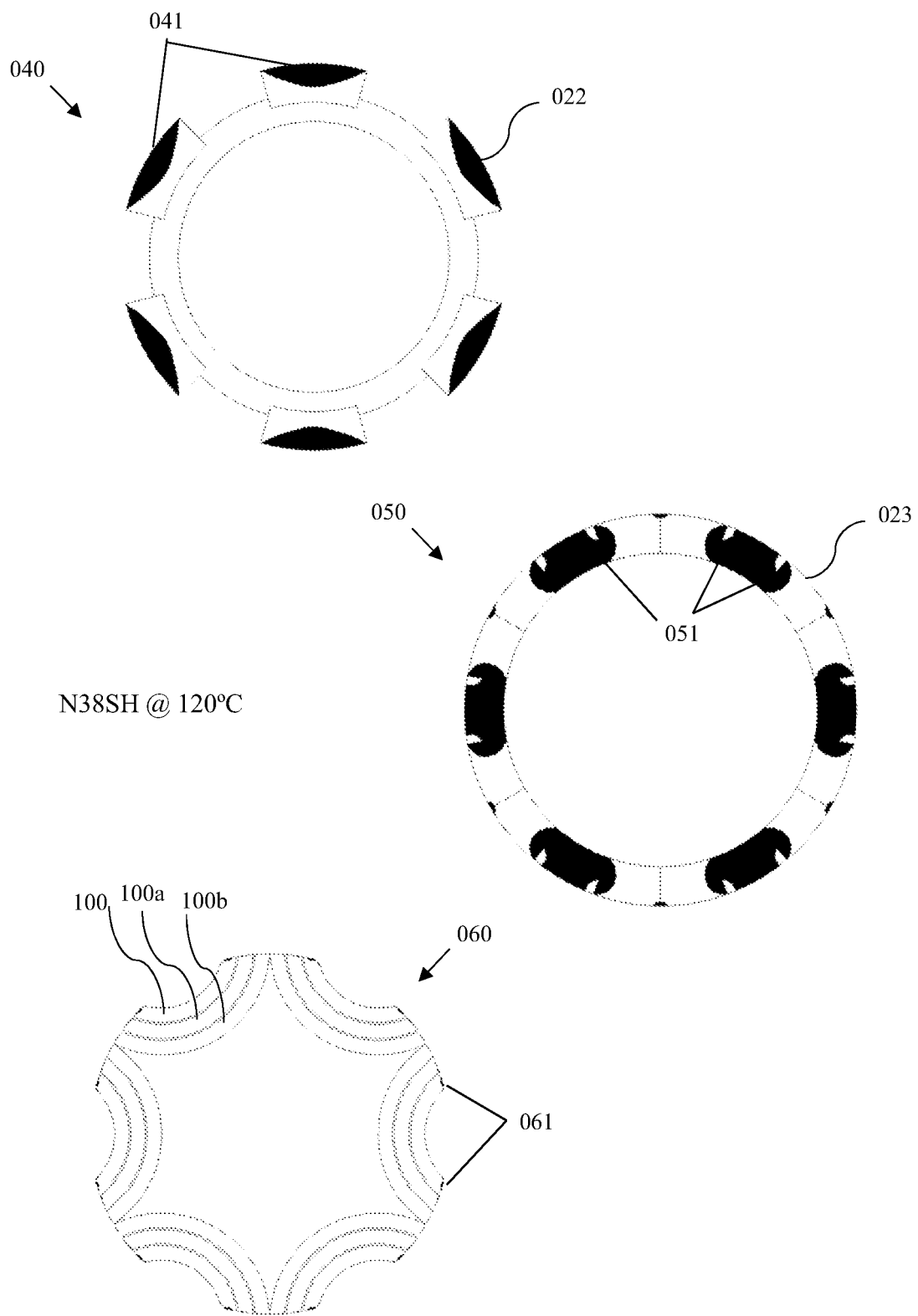
FIG. 19 depicts a comparison of demagnetization as between a six-pole prior art N-S permanent magnet rotor having back iron, a prior art six-pole Halbach permanent magnet array, and a six-pole magnet configuration of the invention that uses axially-magnetized curvilinear permanent magnets of the invention, at 120° C., for N48SH magnet material.
Figure 20:
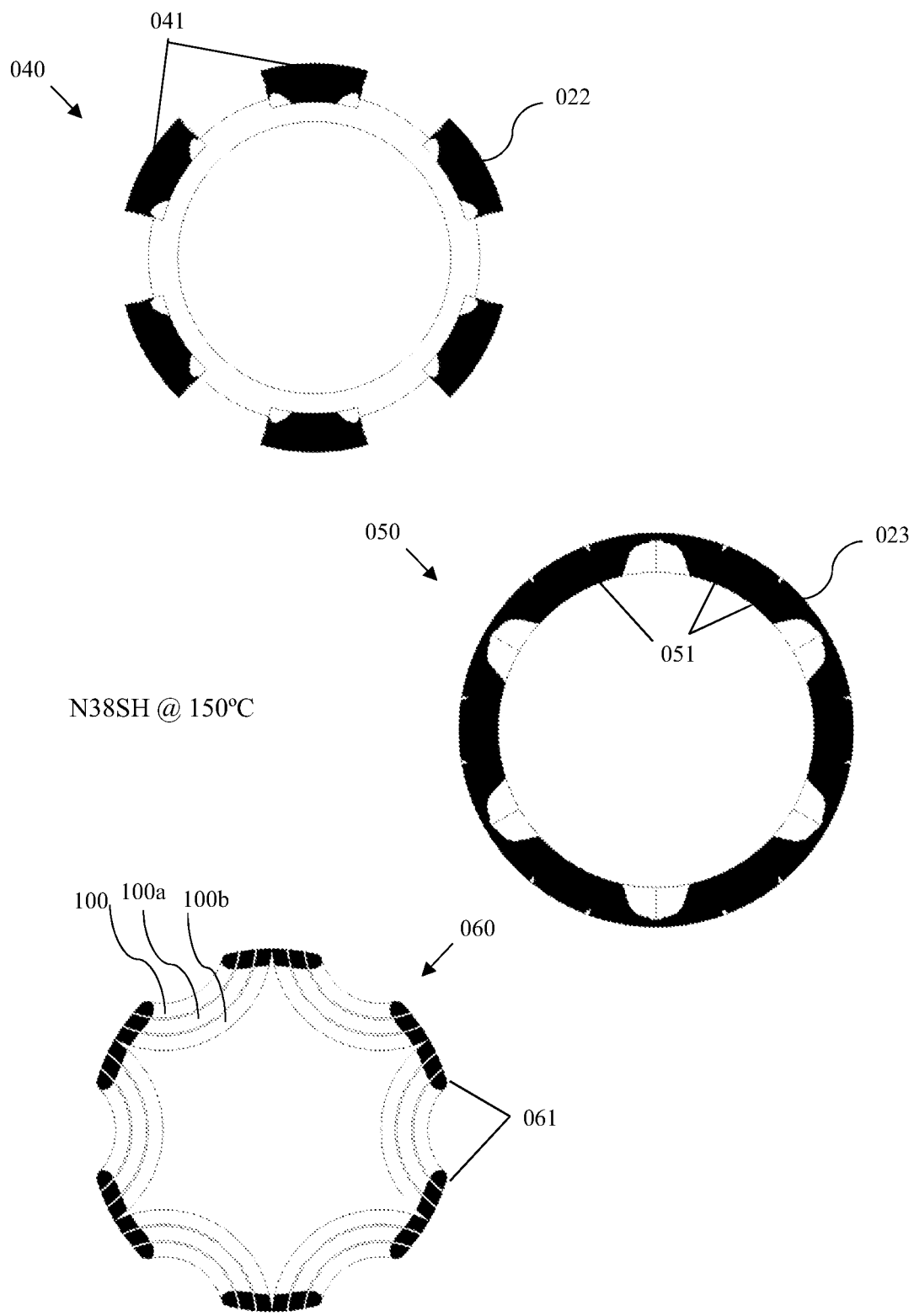
FIG. 20 depicts a comparison of demagnetization as between a six-pole prior art N-S permanent magnet rotor having back iron, a prior art six-pole Halbach permanent magnet array, and a six-pole magnet configuration of the invention that uses axially-magnetized curvilinear permanent magnets of the invention, at 120° C., for N48SH magnet material.

Referring to FIG. 4, difference between the resulting magnetic field vector in the permanent magnet 022 and the magnetization vector of the magnet can be observed in areas of permanent magnets 022 in which the resulting magnetic field lines and the magnets own magnetic field lines are not aligned, i.e., they curve or lead away from one another. These areas experience a demagnetization field, depicted as dark areas in FIGS. 18-20, showing almost complete demagnetization of permanent magnets 022 as temperature rises to 120° C.-150° C. in the dark areas of the permanent magnets 022. These dark areas are areas in which the demagnetization vector, i.e. the difference, or deviation, between the permanent magnet 022 magnetization vector and the resulting magnetic field vector, is great enough to cause demagnetization of permanent magnet 022, which may be permanent.

The magnetic flux density in permanent magnets is related to the magnetization M and the magnetic field H as shown in equation (1), where μo is the permeability of a vacuum.

$$B = \mu o (H + M) \tag{Eqn. 1}$$

The field H is a combination of the intrinsic demagnetization field resulting from the shape of the permanent magnet and the external field. Once the demagnetizing field becomes greater than the intrinsic coercivity field of the magnetic material in magnitude, the permanent magnet material become irreversibly (short of a re-magnetization) demagnetized and the performance of the motor is severely degraded. It is therefore very important to develop permanent magnet configurations that present as low an intrinsic demagnetizing field as possible.

It is also a feature of magnetic materials that the intrinsic coercivity for a particular magnetic material typically reduces as temperature of the magnetic material increases. Thus, a permanent magnet subjected to a demagnetizing field as described above may not experience significant demagnetization at low temperatures, but, as the temperature of the permanent magnetic material comprising the magnet increases, the magnetic material coercivity decreases, which allows demagnetization to increase. If the magnet material coercivity is reduced enough as temperature increases, the magnet may undergo permanent demagnetization at higher temperature, which may dramatically negatively affect electric machine performance. One challenge in the design of electric machines is that they are known to be subjected to high temperatures under certain operating or load conditions, which creates a challenge for the selection of magnetic material for rotor permanent magnets. The traditional answer to this challenge is to select high intrinsic coercivity magnetic materials, such as, for example, Neodymium-Iron Boron treated for high temperature operation with Dysprosium diffusion or Samarium-Cobalt, for use in the rotor permanent magnets. However, these materials are expensive, are difficult to manufacture and use because they are subject to oxidation when exposed to air, they are scarce to the point of being strategic materials, and they are subject to supply chain disruptions. There has therefore been a long-felt need to arrive at some other solution to the demagnetization effect suffered by rotor permanent magnets.

The discussion herein regarding demagnetization, the change in coercivity over temperature, and the resulting detrimental effects on electric machine performance are true for the other prior art configurations of rotor permanent magnets as well.

Figure 5:
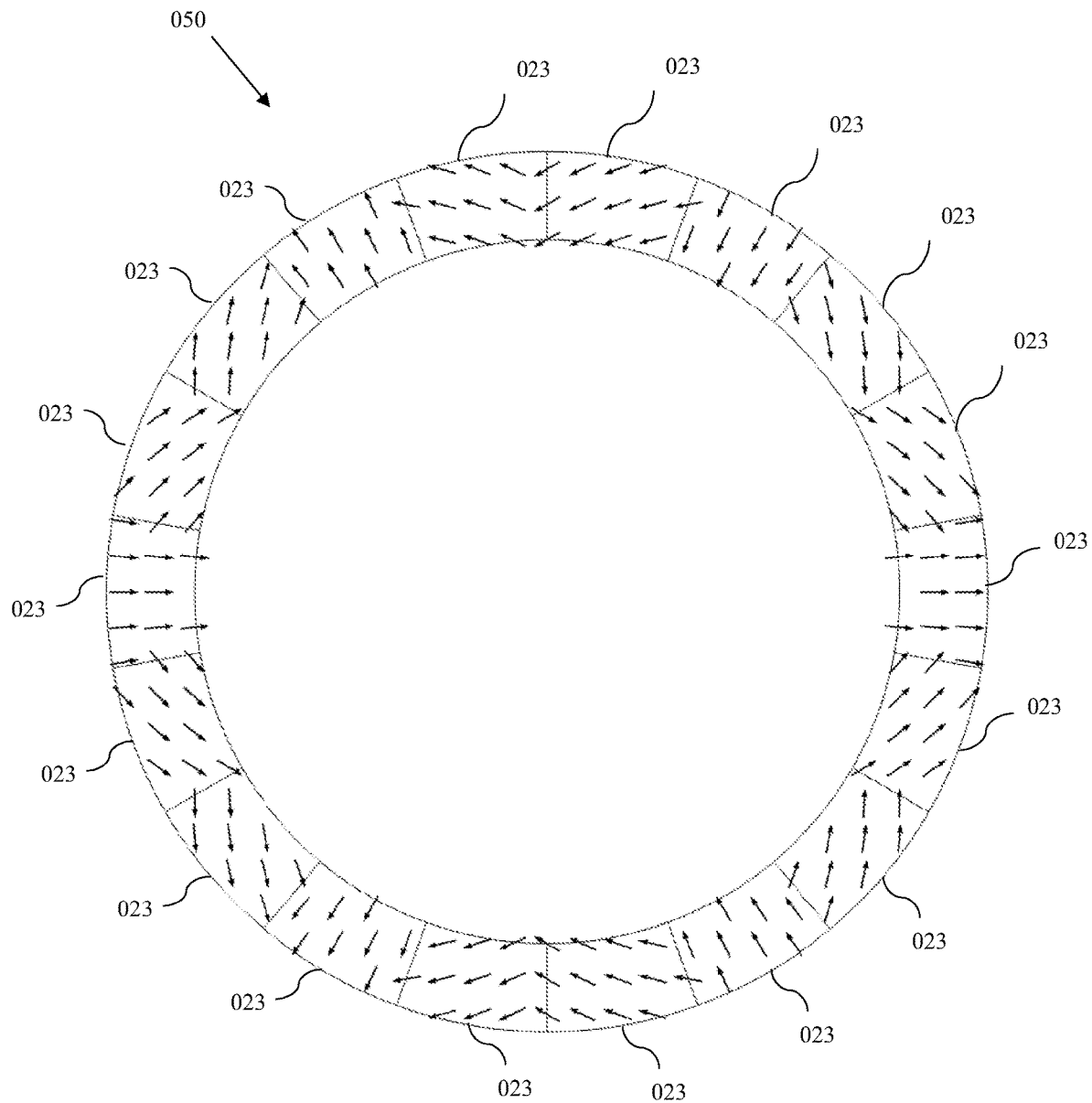
FIG. 5 depicts schematic view of a prior art six-pole Halbach permanent magnet array.
Figure 6:
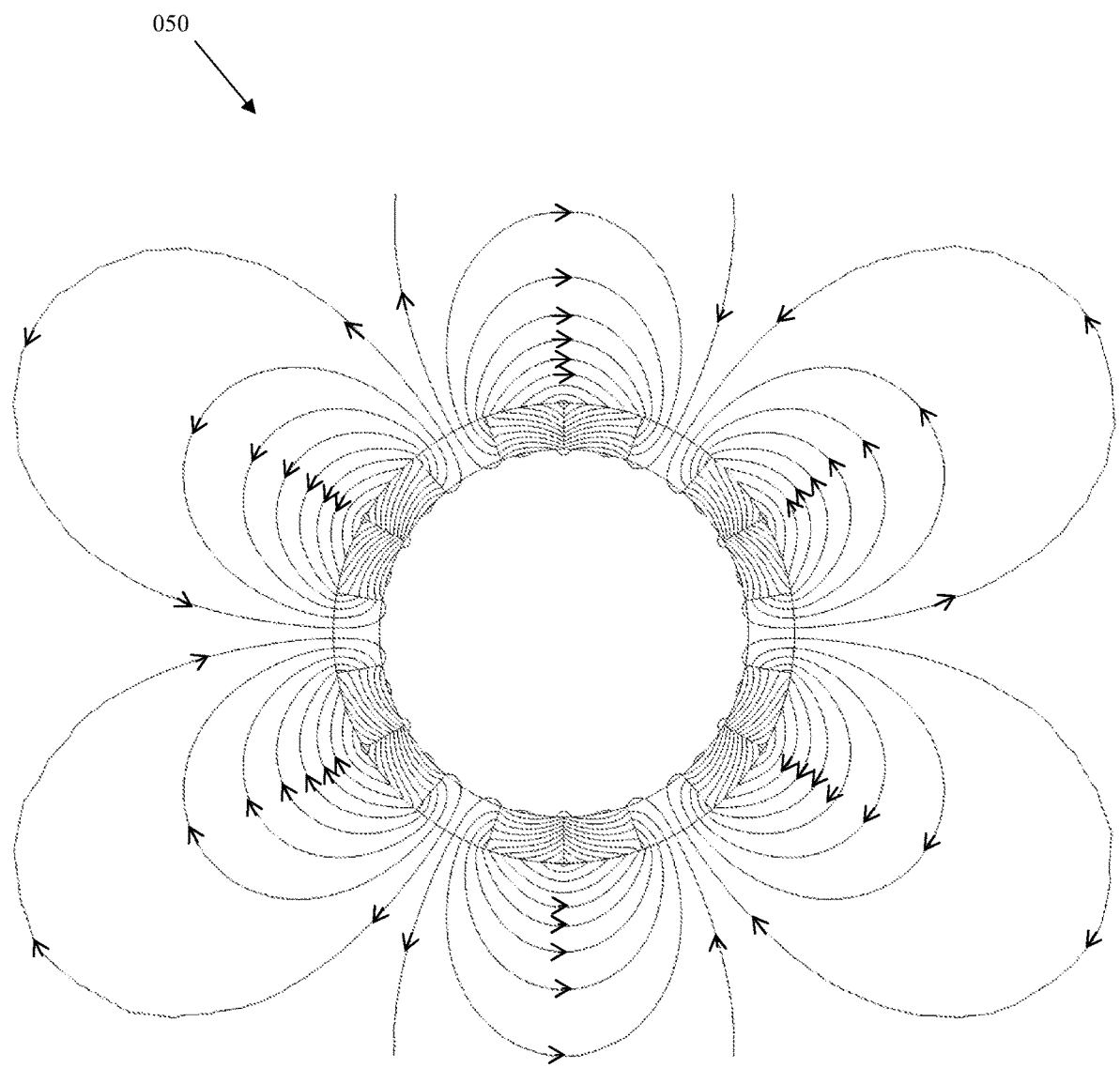
FIG. 6 depicts the resulting magnetic field associated with a prior art six-pole Halbach permanent magnet array.

Referring now to FIGS. 5 and 6, another type of prior art permanent magnet rotor example, a Halbach array 050, is depicted. This type of array is comprised of a plurality of magnet segments that are each linearly magnetized as shown in FIG. 5, resulting in the magnetic fields shown in FIG. 6. It can be seen by comparing the magnetization direction of each magnet segment in FIG. 5 to the resulting field lines in FIG. 6 that some magnet segments in the Halbach array 050 experience demagnetizing fields in areas in which the resulting magnetic field vector is not equal to the permanent magnet magnetic field vector as discussed above, resulting in a demagnetization field vector that causes rotor permanent magnet demagnetization that increases over temperature as depicted in FIGS. 16-20. These figures show almost complete demagnetization of permanent magnets 023 at 120° C.-150° C. A further disadvantage of Halbach arrays is that the adjacent permanent magnet segments 023 tend to push away from one another due repelling forces arising from the direction of magnetization of the adjacent segments. When the permanent magnet segments of the Halbach array are strongly magnetized, the magnets tend to fly away from one another, making assembly exceedingly difficult, and requiring structures to be created to hold them into place once they are managed to be assembled. These structures add cost and unwanted weight to the rotor. Still further, elaborate jigs or fixtures may be required to affect repair procedures, is replacing magnets the place of strong magnetic forces can be extremely difficult. In contrast, the axially magnetized curvilinear permanent magnets of the invention do not experience repelling magnetic forces when being assembled into the rotor permanent magnet configurations of the invention.

It is a novel feature of the invention that axially-magnetized curvilinear permanent magnets are employed to greatly reduce the demagnetization field that plagues prior art rotor permanent magnets. Axially-magnetized curvilinear permanent magnets of the invention are shaped in a curvilinear fashion and axially magnetized, i.e. magnetized in a direction along their curvilinear axis such that the magnet's magnetization vector at any point is parallel, or substantially parallel, to, or is aligned with, the magnet's curvilinear longitudinal axis, and disposed in an electric machine rotor such that the magnetic field in the inventive curvilinear permanent magnet lines up much more closely with the resulting magnetic field than was previously achievable with prior art rotor permanent magnets. The use of curvilinear permanent magnets dramatically reduces the demagnetization field vector in the rotor permanent magnets, which tends to eliminate or greatly reduce the demagnetization field in most regions within the rotor curvilinear permanent magnets. The curvilinear shape of the magnets eliminates the need for back iron, and thus eliminates the tight curvature of the resulting magnetic fields that is present in the regions of rotor permanent magnets of the prior whether those magnet are in contact with, or in close proximity to, the back iron of prior art permanent magnet rotors. Further, the elongated shape and higher length to cross sectional area of the curvilinear permanent magnets of the invention result in higher resulting magnetic field density inside the rotor permanent magnets, which also results in a lower demagnetizing field, because the deviation field (i.e. demagnetizing field) vector is much lower than that of prior art magnets that do not have the high length to cross sectional area aspect ratio of the inventive curvilinear permanent magnets.

The use of axially-magnetized curvilinear permanent magnets in electric machine rotors has a number of benefits over rotor permanent magnets of the prior art, enabling significant advantages in electric machines produced using the curvilinear permanent magnets of the invention, and in permanent magnet rotors comprising curvilinear permanent magnets of the invention, which include but are not limited to the following:

because the demagnetization field vector is far lower in the curvilinear permanent magnets of the invention, lower coercivity magnet material may be used in rotor permanent magnet design, resulting reducing or even eliminating the need for expensive, hard to acquire rare earth magnetic materials, reducing cost to produce and eliminating strategic supply chain problems;

electric machine performance, such as output power, over temperature is dramatically improved because the demagnetization field vector is far lower in the curvilinear permanent magnets of the invention, reducing the negative effects of changes in magnet material coercivity decreases as permanent magnet temperature increases;

the need for back iron to direct the magnetic field on the inside portion of the rotor is eliminated or greatly reduced, resulting in dramatic weight reduction of the inventive curvilinear permanent magnet rotor;

eliminating back iron eliminates the tightly curved magnetic field lines present in the inside portion of prior art rotor permanent magnets that cause a high demagnetization field vector in rotor permanent magnets of the prior art, further enabling the of low-coercivity magnet material and dramatically improving electric machine performance, such as motor torque and generator output power, as temperature increases;

the high length to cross sectional area aspect ratio of the curvilinear permanent magnets of the invention supports a higher density resulting magnetic field over rotor permanent magnets of the prior art, enabling higher power density electric machines to be produced;

operation at higher temperature for a given material coercivity;

much easier manufacturing of the axially-magnetized curvilinear permanent magnets with the PM-Wire process than with traditional process;

ease of assembly (low forces on magnets) compared to Halbach arrays and even N-S assemblies; and mechanical containment leads to reduction of the containment sleeve thickness in high RPM machines, resulting in smaller, lighter electric machines.

Figure 7:
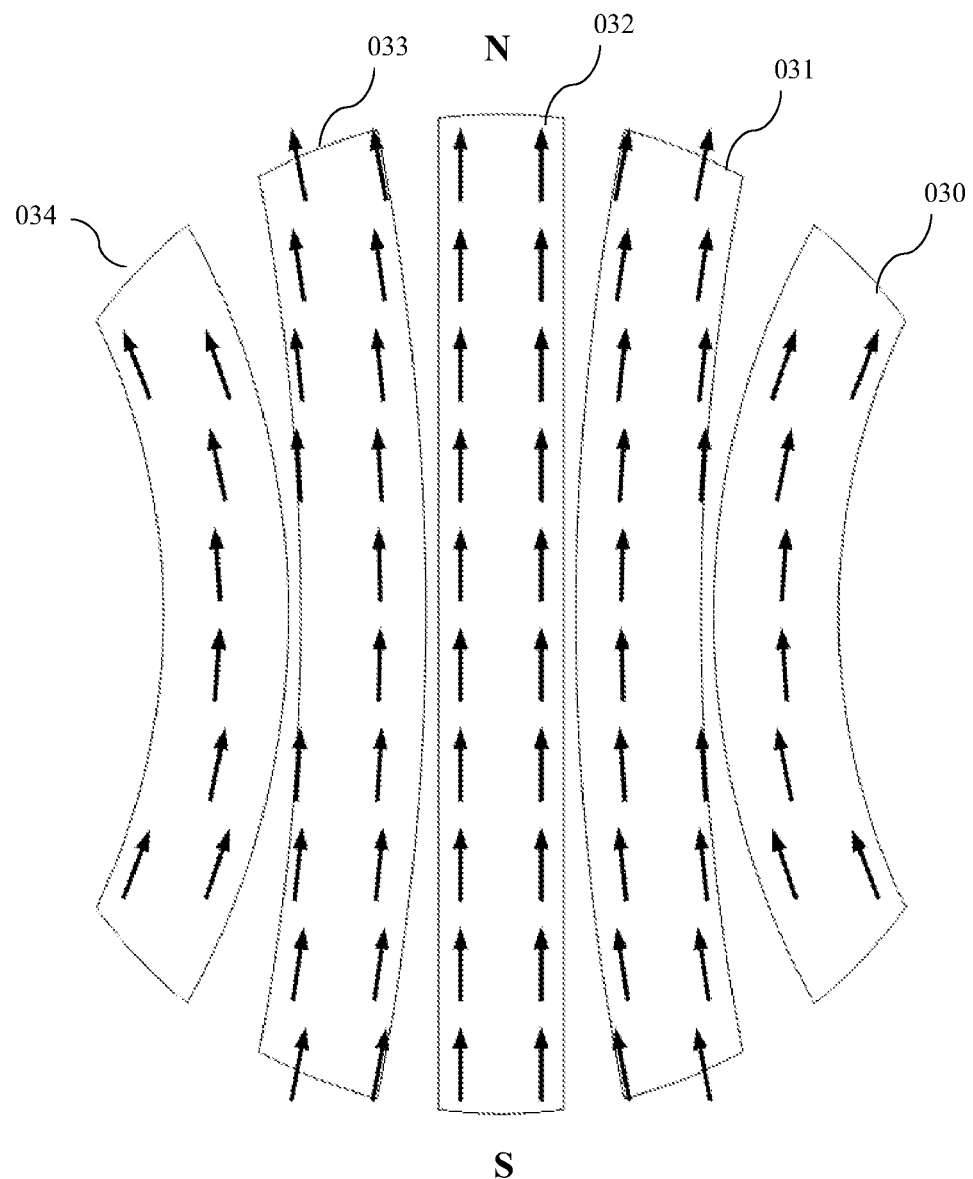
FIG. 7 depicts schematic view of a two-pole magnet configuration of the invention, using axially-magnetized curvilinear permanent magnets of the invention.
Figure 8:
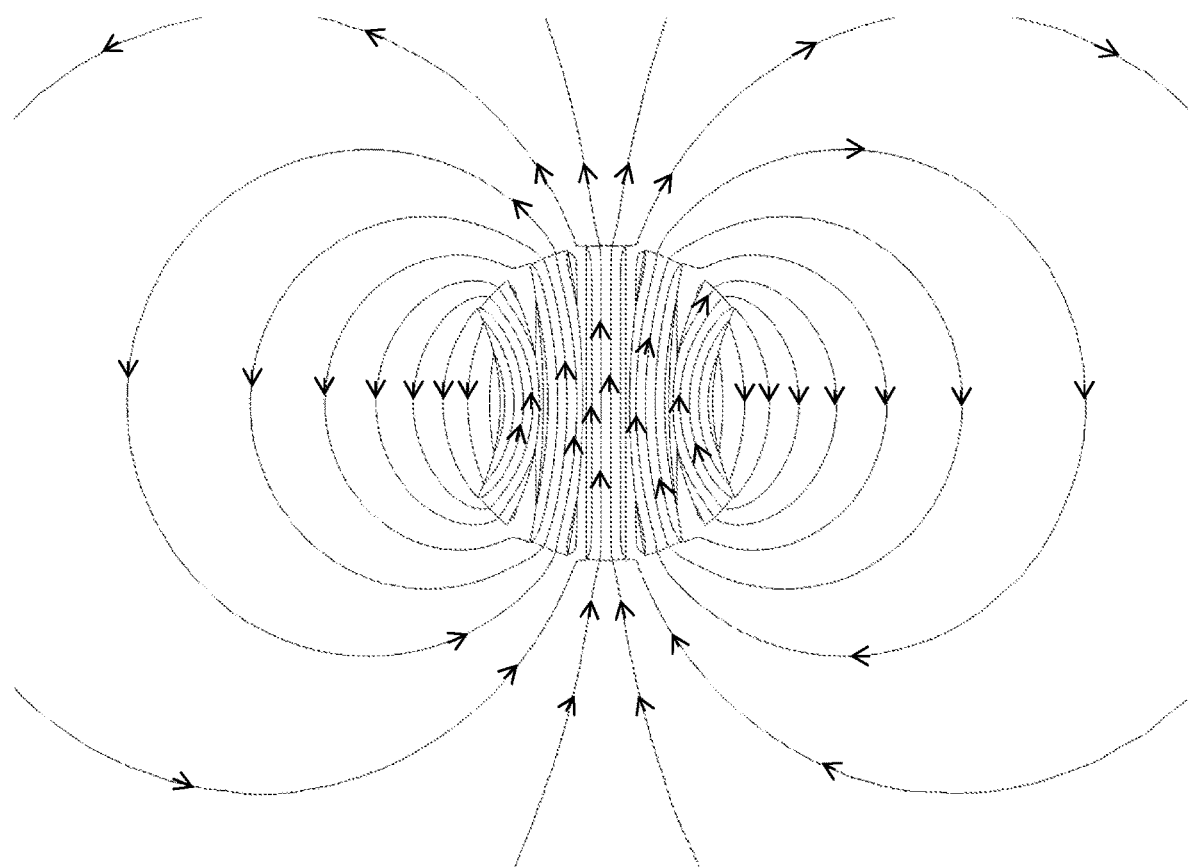
FIG. 8 depicts the resulting magnetic field associated with a two-pole magnet configuration of the invention, using axially-magnetized curvilinear permanent magnets of the invention.

Referring now to FIGS. 7 and 8, an exemplary embodiment of a magnet configuration of two-pole permanent magnet grouping of the invention is depicted. Permanent magnets 030, 031, 032, 033, and 034 (which are simply variations of curvilinear permanent magnet 100, described below, with varying radii of curvature, but otherwise the same) may each be axially magnetized and configured as shown. It can be seen from the magnetic field vector arrows that each of these permanent magnets are characterized by magnetic field vectors that are parallel to, i.e. they run along, the longitudinal axis of each permanent magnet. It is also noted that each of these permanent magnets is elongate in its overall shape such that it has a higher length to cross-section ratio than rotor permanent magnets of the prior art. Referring now to FIG. 8, the resulting magnetic field from the two pole permanent magnet grouping is depicted. Magnetic field lines emanate from the north pole side of the permanent magnet grouping, and move around to enter the south side of the permanent magnet grouping. It can be seen in FIG. 8 that the magnetic field vector in the permanent magnets, indicated by the lines with arrows, is in substantial alignment with the longitudinal axis of each permanent magnet. Since each of these permanent magnets is axially magnetized, the resulting magnetic field vector inside each permanent magnet is thus closely aligned with the magnet's own magnetic field vector, resulting in a very small demagnetization field, or eliminating the demagnetization field altogether. This alignment of resulting magnetic field vector and magnet magnetic field vector in the rotor permanent magnets, which is novel in the art, provides the above-mentioned benefits to electric machine performance.

Figure 9:
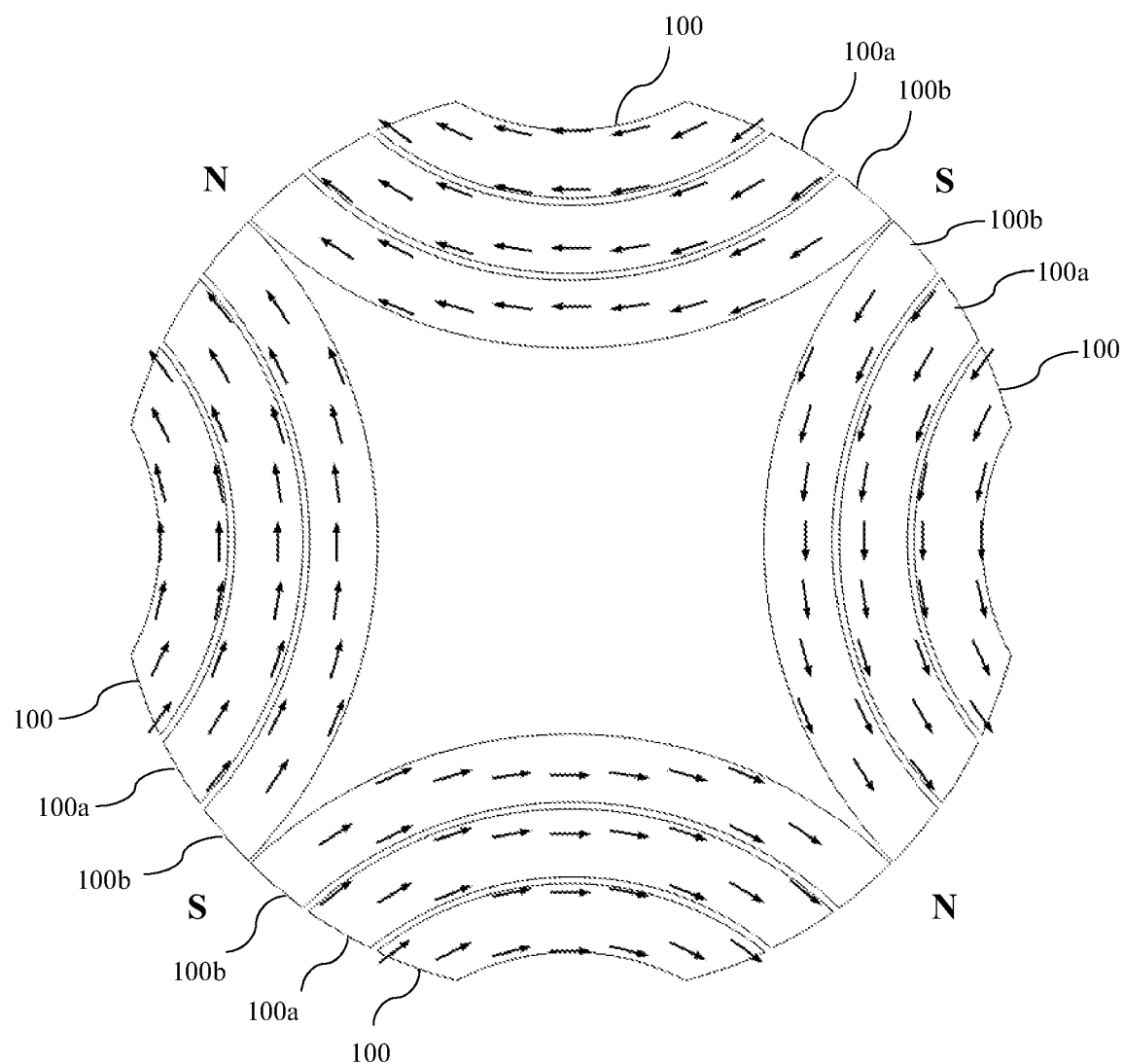
FIG. 9 depicts schematic view of a four-pole magnet configuration of the invention, using axially-magnetized curvilinear permanent magnets of the invention.
Figure 10:
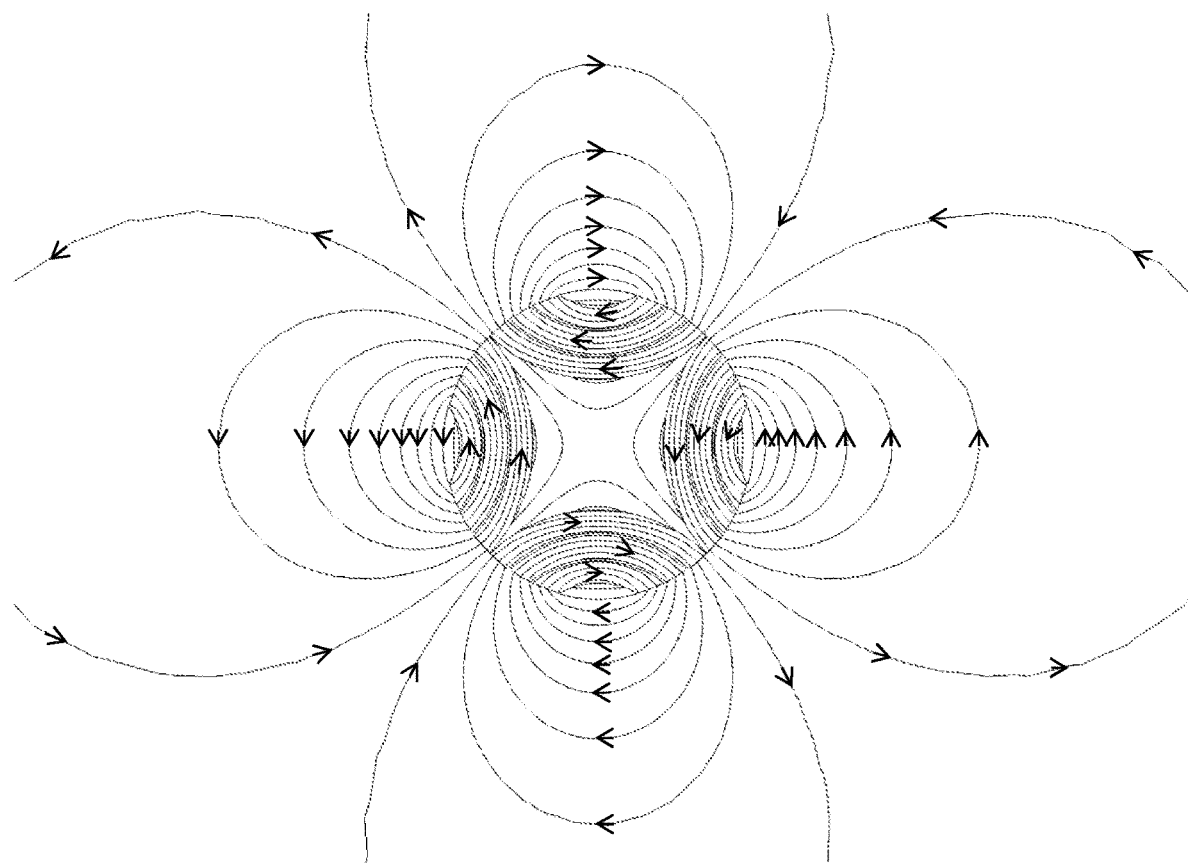
FIG. 10 depicts the resulting magnetic field associated with a four-pole magnet configuration of the invention, using axially-magnetized curvilinear permanent magnets of the invention.

Referring now to FIGS. 9 and 10, an exemplary embodiment of a magnet configuration of a four-pole permanent magnet grouping of the invention is depicted. FIG. 9 depicts four curvilinear permanent magnet arrays, each array comprising three curvilinear permanent magnets 100, 100a, 100b, arranged forming North and South poles as depicted in the figure. Again, as in the other figures of the drawing, the arrows in the magnets indicate the direction of each magnet's axial magnetization. Referring now to FIG. 10, the resulting magnetic field from the four-pole permanent magnet grouping is depicted. Magnetic field lines emanate from the north pole side of the permanent magnet grouping, and move around to enter the south side of the permanent magnet grouping. It can be seen in FIG. 10 that the magnetic field vector in the permanent magnets, indicated by the lines with arrows, is in substantial alignment with the longitudinal axis of each permanent magnet. Since each of these permanent magnets is axially magnetized, the resulting magnetic field vector inside each permanent magnet is closely aligned with the magnet's own magnetic field vector, resulting in a very small demagnetization field, or eliminating the demagnetization field altogether. This alignment of resulting magnetic field vector and magnet magnetic field vector in the rotor permanent magnets, which is novel in the art, provides the above-mentioned benefits to electric machine performance.

Figure 11:
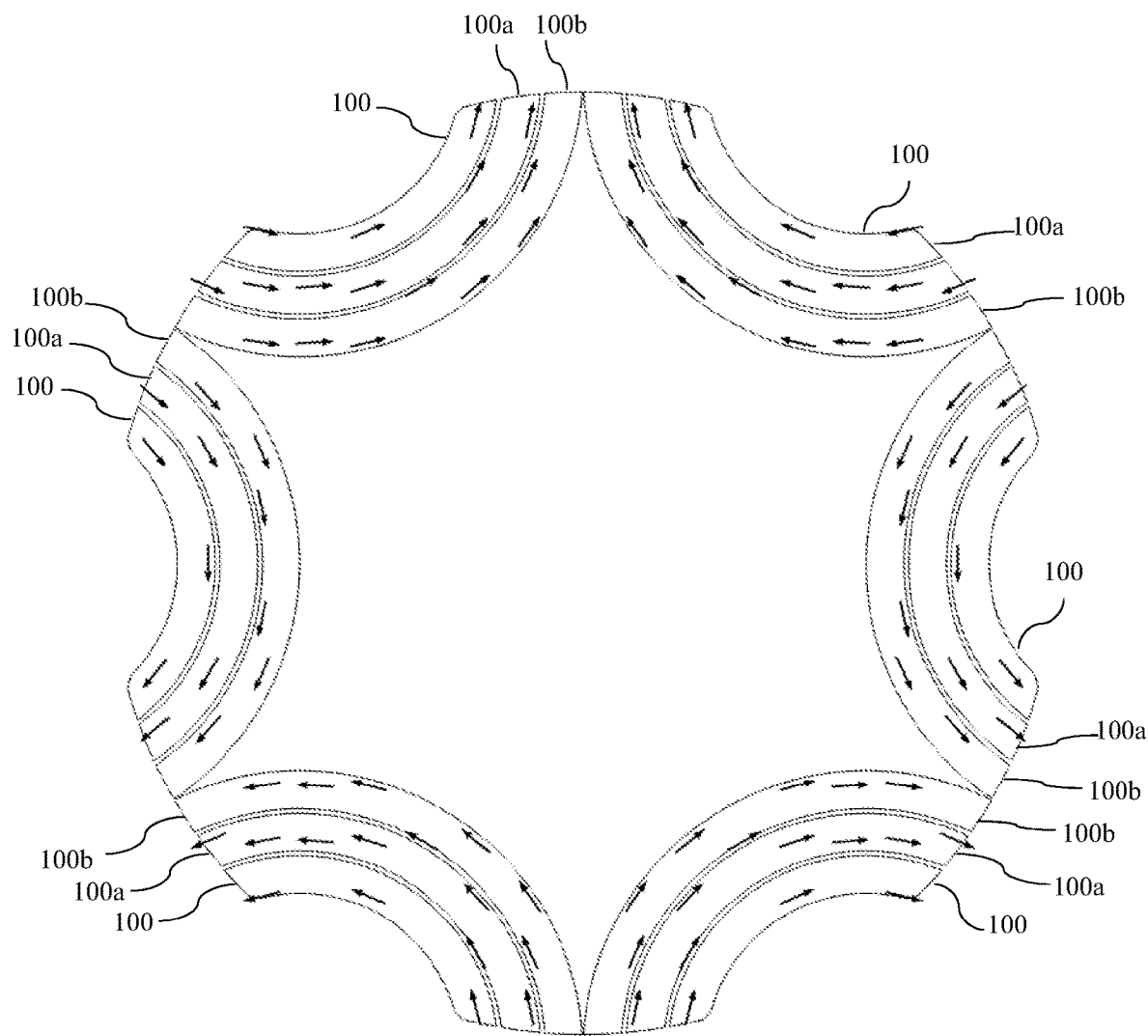
FIG. 11 depicts schematic view of a six-pole magnet configuration of the invention, using axially-magnetized curvilinear permanent magnets of the invention.
Figure 12:
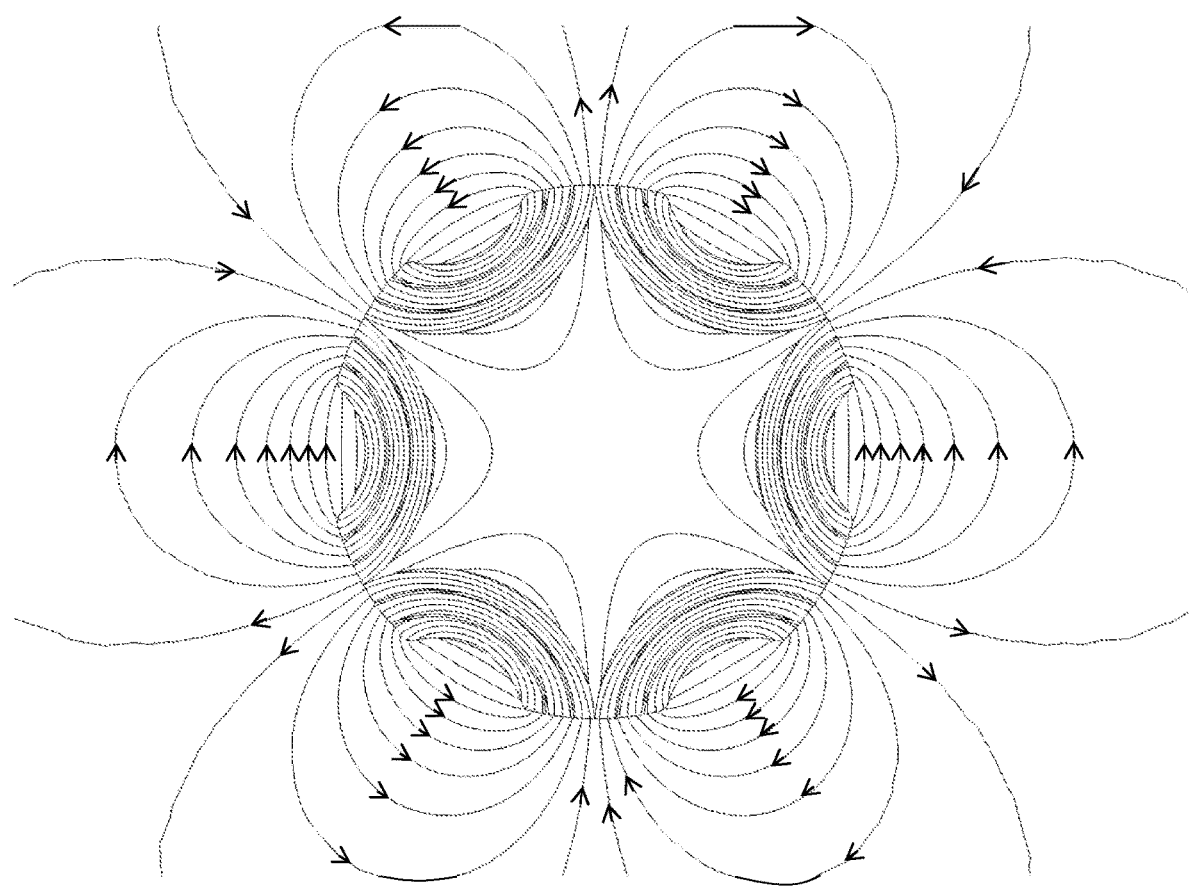
FIG. 12 depicts the resulting magnetic field associated with a six-pole magnet configuration of the invention, using axially-magnetized curvilinear permanent magnets of the invention.

Referring now to FIGS. 11 and 12, an exemplary embodiment of a magnet configuration of a six-pole permanent magnet grouping of the invention is depicted. FIG. 11 depicts six curvilinear permanent magnet arrays, each array comprising three curvilinear permanent magnets 100, 100a, 100b, arranged forming North and South poles as depicted in the figure. Again, as in the other figures of the drawing, the arrows in the magnets indicate the direction of each magnet's axial magnetization. Referring now to FIG. 12, the resulting magnetic field from the six-pole permanent magnet grouping is depicted. Magnetic field lines emanate from the north poles of the permanent magnet grouping, and move around to enter the south poles of the permanent magnet grouping. It can be seen in FIG. 12 that the magnetic field vector in the permanent magnets, indicated by the lines with arrows, is in substantial alignment with the longitudinal axis of each permanent magnet. Since each of these permanent magnets is axially magnetized, the resulting magnetic field vector inside each permanent magnet is closely aligned with the magnet's own magnetic field vector, resulting in a very small demagnetization field, or eliminating the demagnetization field altogether. This alignment of resulting magnetic field vector and magnet magnetic field vector in the rotor permanent magnets, which is novel in the art, provides the above-mentioned benefits to electric machine performance.

Figure 13:
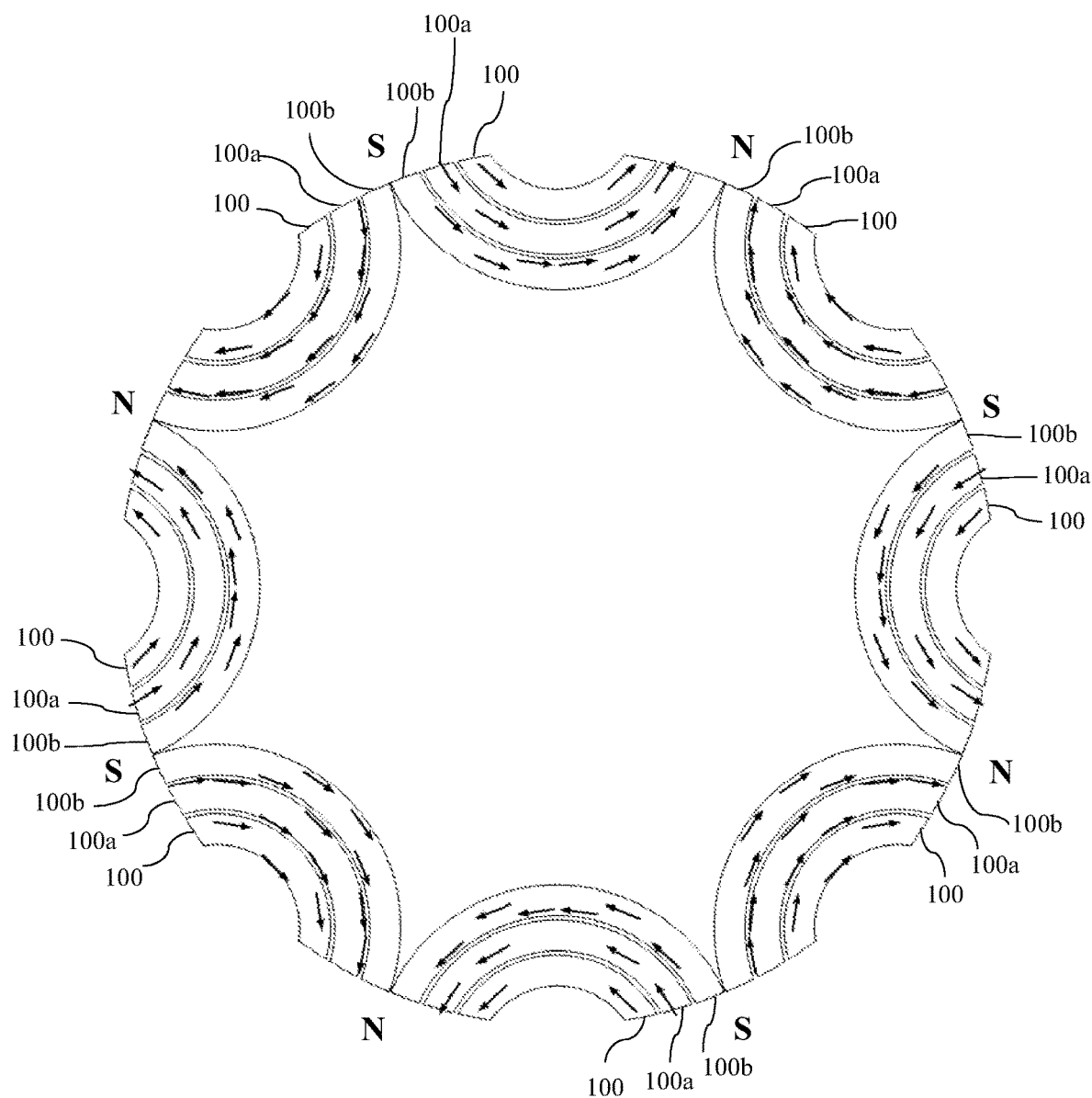
FIG. 13 depicts schematic view of an eight-pole magnet configuration of the invention, using axially-magnetized curvilinear permanent magnets of the invention.
Figure 14:
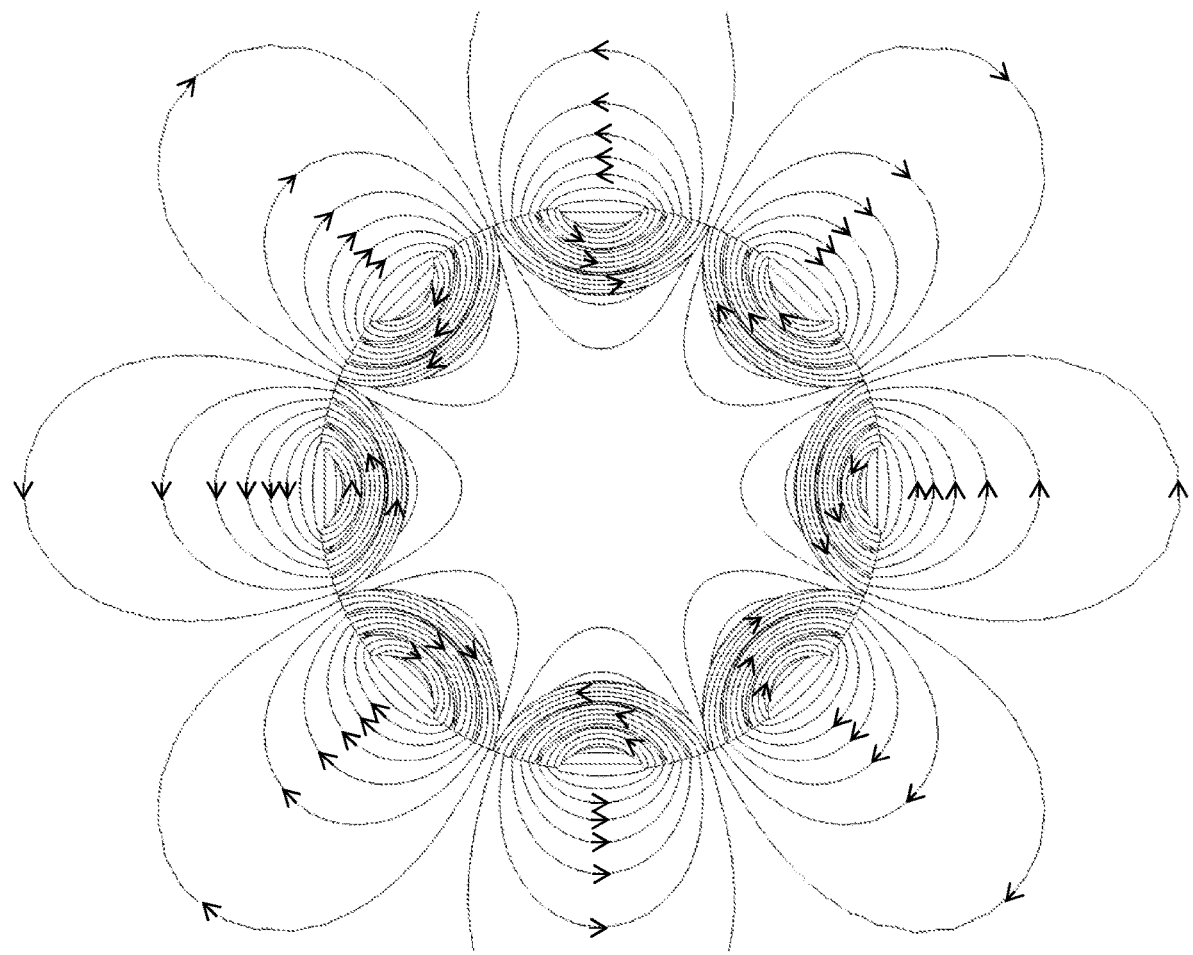
FIG. 14 depicts the resulting magnetic field associated with an eight-pole magnet configuration of the invention, using axially-magnetized curvilinear permanent magnets of the invention.

Referring now to FIGS. 13 and 14, an exemplary embodiment of a magnet configuration of an eight-pole permanent magnet grouping of the invention is depicted. FIG. 13 depicts eight curvilinear permanent magnet arrays, each array comprising axially-magnetized curvilinear permanent magnets 100, 100a, and 100b, arranged forming North and South poles as depicted in the figure. Again, as in the other figures of the drawing, the arrows in the magnets indicate the direction of each magnet's axial magnetization. Referring now to FIG. 14, the resulting magnetic field from the eight-pole permanent magnet grouping is depicted. Magnetic field lines emanate from the north poles of the permanent magnet grouping, and move around to enter the south poles of the permanent magnet grouping. It can be seen in FIG. 14 that the magnetic field vector in the permanent magnets, indicated by the lines with arrows, is in substantial alignment with the longitudinal axis of each permanent magnet. Since each of these permanent magnets is axially magnetized, the resulting magnetic field vector inside each permanent magnet is closely aligned with the magnet's own magnetic field vector, resulting in a very small demagnetization field, or eliminating the demagnetization field altogether. This alignment of resulting magnetic field vector and magnet magnetic field vector in the rotor permanent magnets, which is novel in the art, provides the above-mentioned benefits to electric machine performance (e.g., significant reduction or elimination of demagnetization effect).

Referring now to FIGS. 15-20, the demagnetization effect in prior art rotor permanent magnets 040 (rotor comprising N-S permanent magnets) and 050 (rotor comprising a Halbach array) over temperature are compared to the demagnetization effect in the inventive six-pole rotor permanent magnet configuration 060. The figures are arranged in order of increasing temperature from FIG. 15 to FIG. 20, beginning with magnet temperature 20° C. in FIG. 15, and ending with magnet temperature 150° C. in FIG. 20. Areas of demagnetization of the magnets in each rotor permanent magnet array are depicted by blackened or darkened areas designated as 041 in the prior art N-S permanent magnet rotor 040 comprising permanent N-S magnets 022 and back iron 021, 051 in the prior art Halbach array 050 comprising permanent magnets segments 023, and 061 in the exemplary six-pole permanent magnet configuration of an embodiment of the invention 060, comprising six sets of nested axially-magnetized curvilinear permanent magnets 001, 001a and 001b. The plots shown in FIGS. 15-20 are the results of computer analysis of each magnet, where the permanent magnet magnetic material in the rotor magnets is Neodymium (N48SH).

Figure 15:
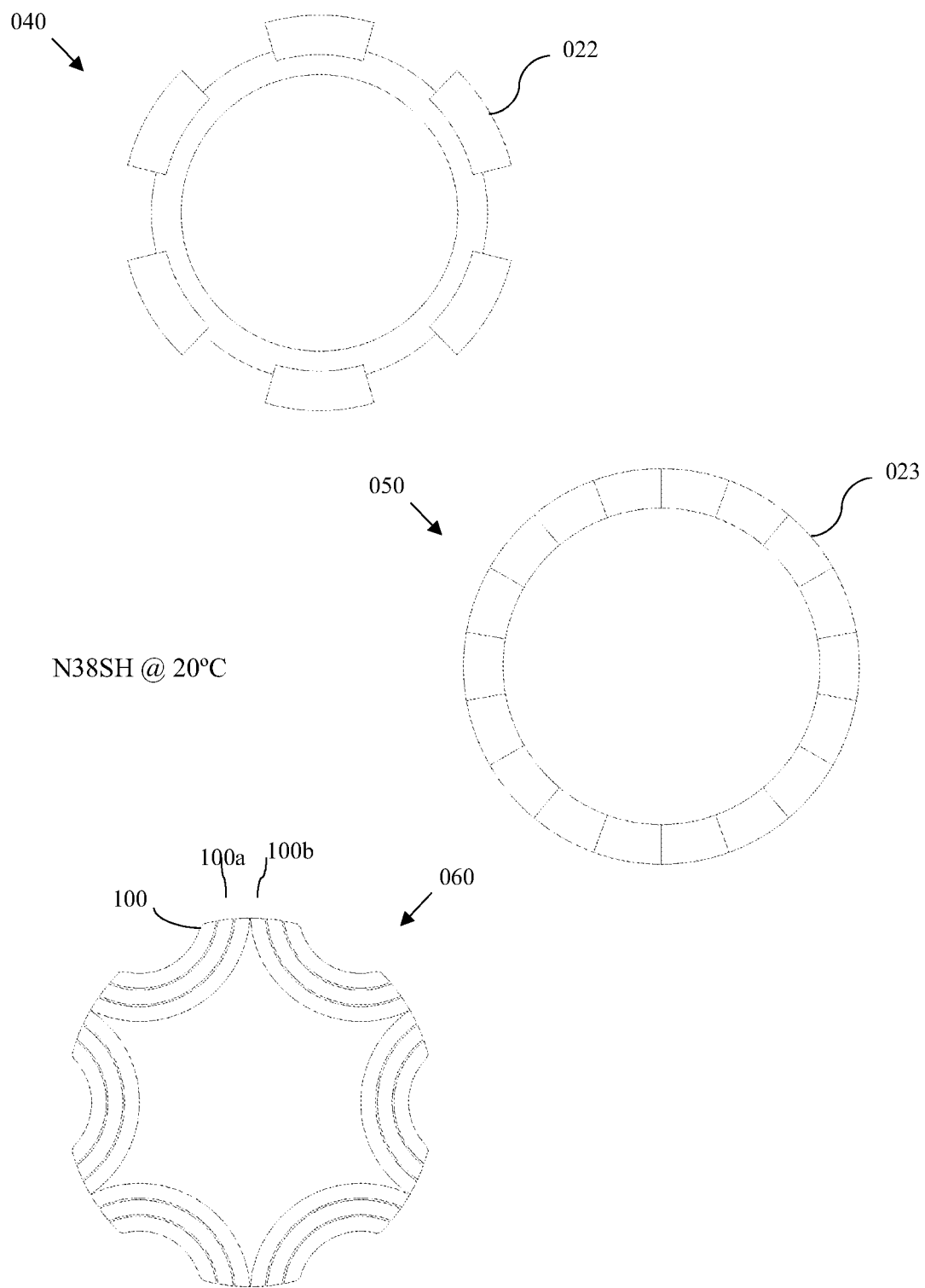
FIG. 15 depicts a comparison of demagnetization as between a six-pole prior art N-S permanent magnet rotor having back iron, a prior art six-pole Halbach permanent magnet array, and a six-pole magnet configuration of the invention that uses axially-magnetized curvilinear permanent magnets of the invention, at 20° C., for N48SH magnet material.

Referring now to FIG. 15, it can be seen there is no demagnetization effect at 20° C. in any of the permanent magnets of the various rotor configurations.

Figure 16:
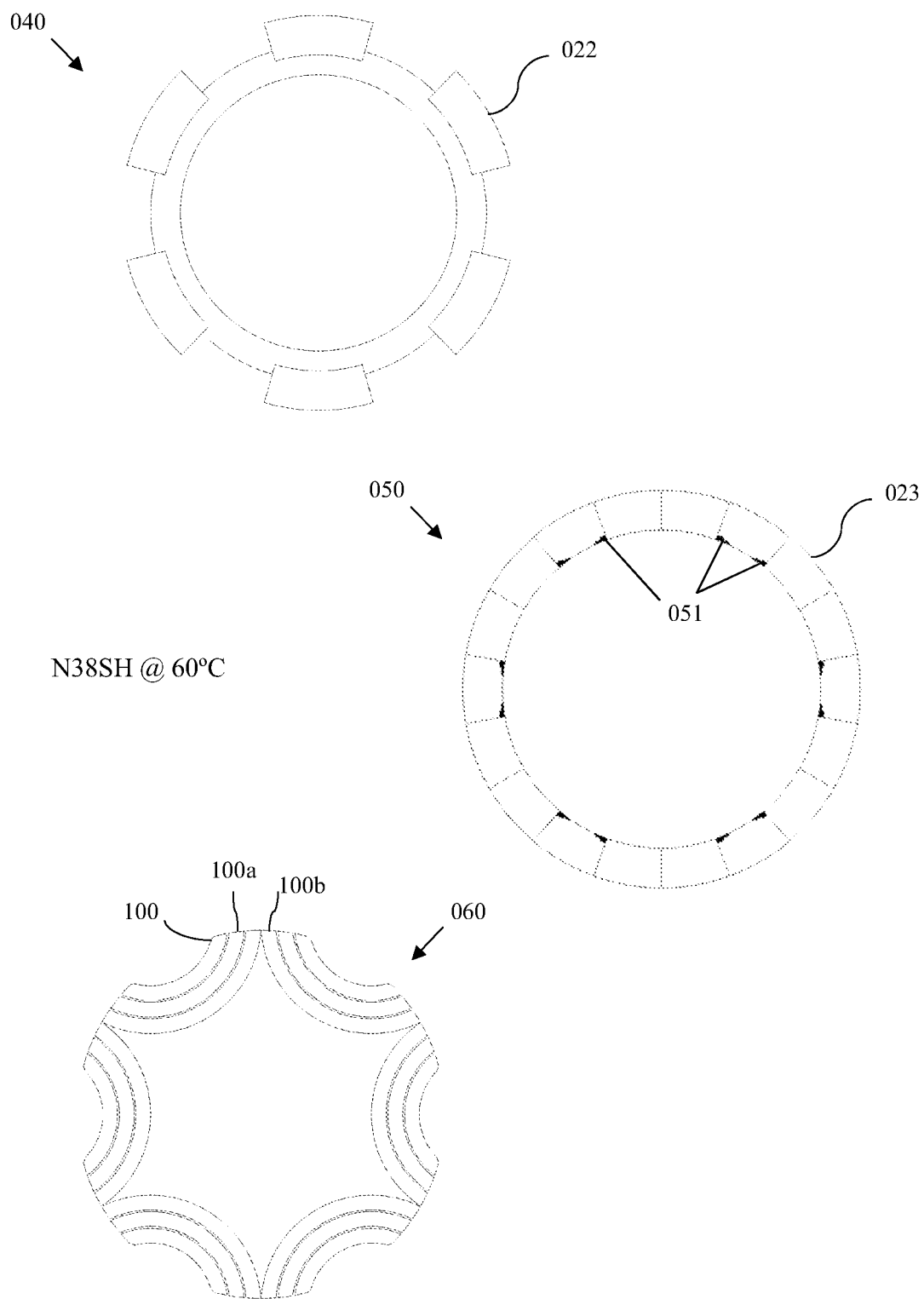
FIG. 16 depicts a comparison of demagnetization as between a six-pole prior art N-S permanent magnet rotor having back iron, a prior art six-pole Halbach permanent magnet array, and a six-pole magnet configuration of the invention that uses axially-magnetized curvilinear permanent magnets of the invention, at 60° C., for N48SH magnet material.

However, in FIG. 16, at 60° C., it can be seen that there is no demagnetization effect in the permanent magnets comprising N-S permanent magnet rotor 040, but demagnetization is beginning to occur at areas 051 in the permanent magnet segments comprising Halbach array 050. In the axially-magnetized curvilinear permanent magnets of the six-pole embodiment of the inventive rotor 060, there is no demagnetization effect at 60° C.

Figure 17:
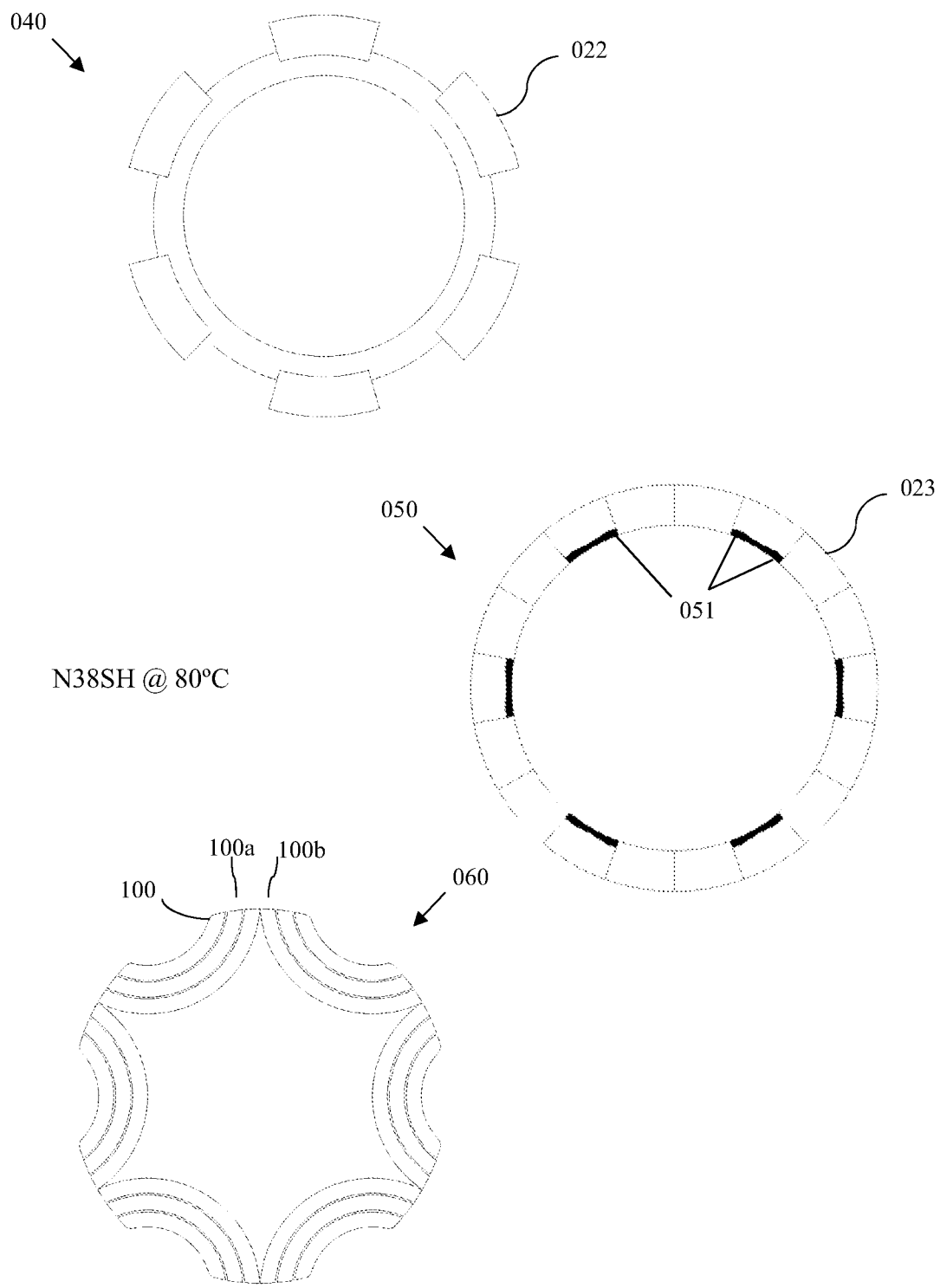
FIG. 17 depicts a comparison of demagnetization as between a six-pole prior art N-S permanent magnet rotor having back iron, a prior art six-pole Halbach permanent magnet array, and a six-pole magnet configuration of the invention that uses axially-magnetized curvilinear permanent magnets of the invention, at 80° C., for N48SH magnet material.

In FIG. 17, at 80° C., the demagnetization effect at areas 051 has worsened in the permanent magnet segments comprising Halbach array 050 (i.e. the size of demagnetized areas 051 have increased as temperature has increased), but there is still no demagnetization effect in either the permanent magnets comprising N-S permanent magnet rotor 040, or in the axially-magnetized curvilinear permanent magnets of the six-pole embodiment of the inventive rotor 060.

In FIG. 18, at 100° C., a demagnetization effect has begun to occur in the darkened areas 041 of permanent magnets 022 comprising N-S permanent magnet rotor 040. Further, the demagnetization effect in the permanent magnet segments comprising Halbach array 050 at areas 051 has worsened still further (i.e. the size of demagnetized areas 051 have increased as temperature has increased), but there is still no demagnetization effect in the axially-magnetized curvilinear permanent magnets of the six-pole embodiment of the inventive rotor 060.

In FIG. 19, at 120° C., the demagnetization effect in the darkened areas 041 of permanent magnets 022 comprising N-S permanent magnet rotor 040 have increased as temperature has increased. Further, the demagnetization effect in the permanent magnet segments comprising Halbach array 050 at areas 051 has worsened still further (i.e. the size of demagnetized areas 051 have increased as temperature has increased), but there is still no demagnetization effect in the axially-magnetized curvilinear permanent magnets of the six-pole embodiment of the inventive rotor 060. The superior performance of the curvilinear permanent magnets in reducing or eliminating the demagnetization field vector in the magnets, and the resulting dramatic reduction in demagnetization over the prior art rotor permanent magnet configurations as temperature increases (and coercivity decreases), is evident in this plot.

In FIG. 20, at 150° C., the demagnetization effect in the darkened areas 041 of permanent magnets 022 comprising N-S permanent magnet rotor 040 have continued to increase as temperature has increased. Further, the demagnetization effect in the permanent magnet segments comprising Halbach array 050 at areas 051 has worsened still further (i.e. the size of demagnetized areas 051 have increased as temperature has increased). There is some demagnetization effect beginning in the axially-magnetized curvilinear permanent magnets of the six-pole embodiment of the inventive rotor 060 at areas 061, but this demagnetization is of far less magnitude than that of N-S permanent magnet rotor 040 and Halbach array 050, both of which are almost completely demagnetized, rendering their electric machines inoperable at 150° C. An electric machine comprising the six-pole embodiment of the inventive rotor 060 comprising axially-magnetized curvilinear permanent magnets of the invention would suffer only slight degradation in performance (for example motor torque or generator output power) at 150° C. The superior performance of the axially-magnetized curvilinear permanent magnets in reducing or eliminating the demagnetization field vector in the magnets, and the resulting dramatic reduction in demagnetization over the prior art rotor permanent magnet configurations as temperature increases (and coercivity decreases), is clearly evident in this plot.

Having described some of the inventive schemes and advantages of exemplary embodiments of the axially-magnetized curvilinear permanent magnets of the invention, various exemplary embodiments of axially-magnetized curvilinear permanent magnets, and arrays and groups of axially-magnetized curvilinear permanent magnets for use in electric machine rotors, is next presented.

Figure 21:
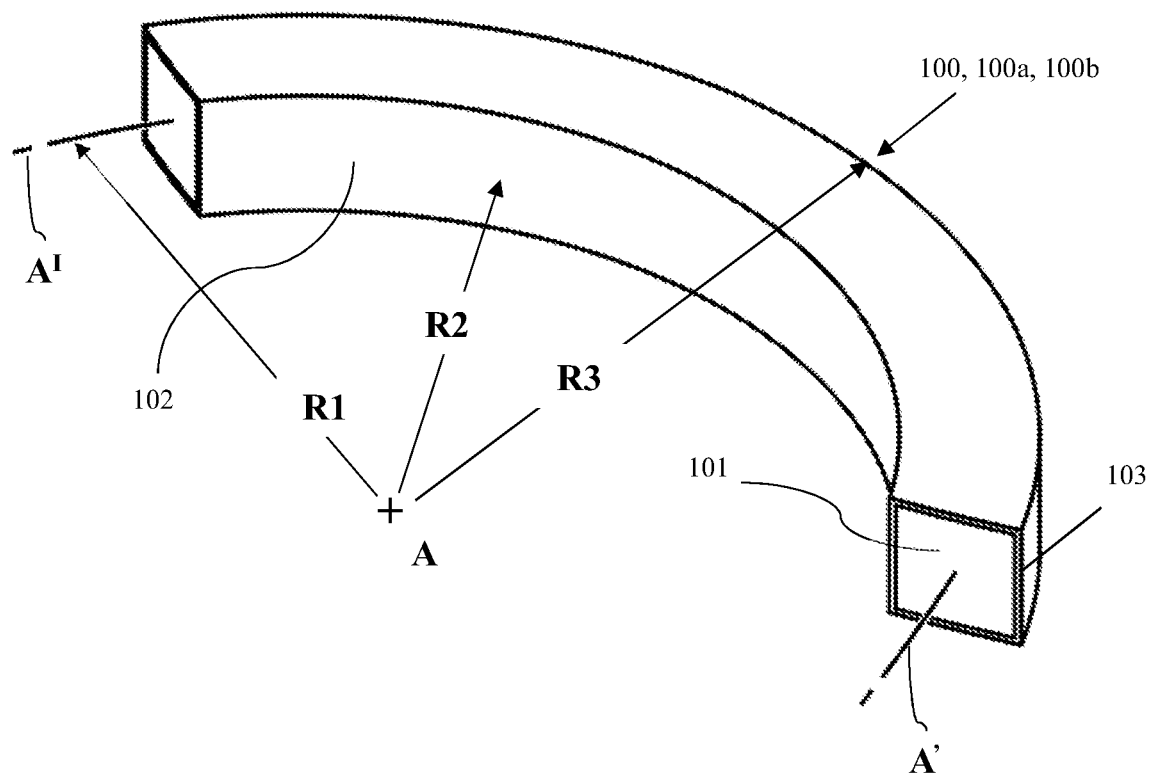
FIGS. 21 and 22 depict an embodiment of an axially-magnetized curvilinear permanent magnet of the present invention.

Referring now to FIG. 21, an embodiment of an axially-magnetized curvilinear permanent magnet of the invention 100, 100a, 100b and so on is depicted in perspective view. Axially-magnetized curvilinear permanent magnets 100, 100a, 100b and so on may have a curvilinear longitudinal axis A' running lengthwise through the magnet, passing through the center of the permanent magnet cross section taken in a plane transverse to the curvilinear longitudinal axis A'. Curvilinear longitudinal axis A' may take any curvilinear or linear shape. In embodiments, curvilinear longitudinal axis A' may be defined as being shaped in a circular shaped arc (i.e., is arcuate), for example a portion of a circular-shaped arc, that is defined by a center point A and a radius R1. Curvilinear permanent magnets 100, 100a, 100b and so on may have an inner curvilinear surface 102, and an outer curvilinear surface 103. Both inner curvilinear surface 102 and outer curvilinear surface 103 may be, but are not necessarily, defined as being shaped in a circular shaped arc that is defined by a center point A and a radius R2, and a radius R3, respectively. Curvilinear permanent magnets 100, 100a, 100b and so on may have an outer arcuate surface 103. In embodiments, the cross section 101 of axially-magnetized curvilinear permanent magnets 100, 100a, 100b and so on may be square, rectangular, circular, oval or any cross-sectional shape as may be required or desired in a particular use.

Figure 22:
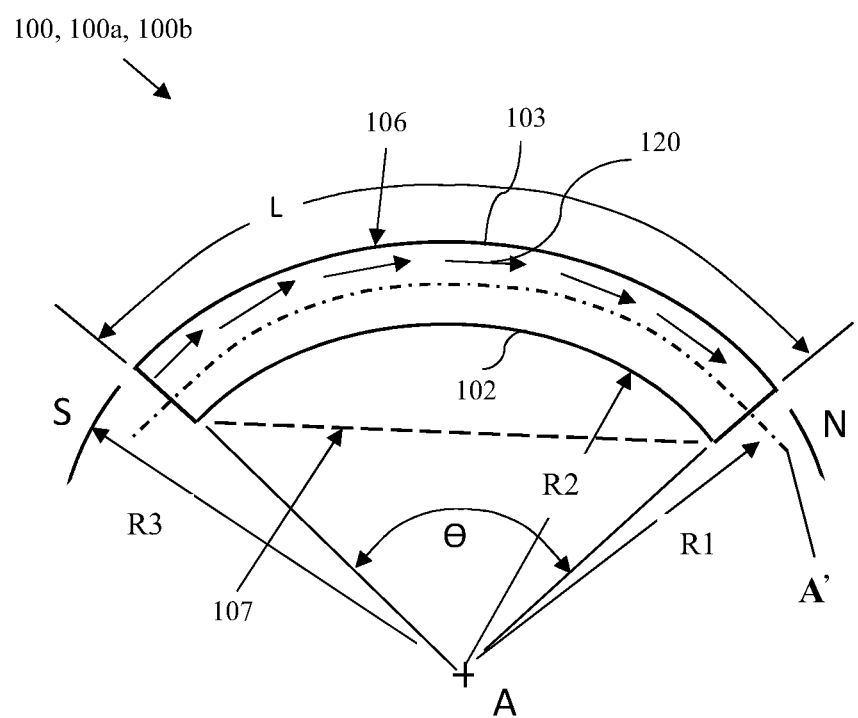

Referring now to FIG. 22, an orthogonal top view of an axially-magnetized curvilinear permanent magnet of the invention is depicted. While, generally, the shape of permanent magnet(s) 100, 100a, 100b and so on of the invention may be any curvilinear shape, in embodiments the shoe of longitudinal axis of axially-magnetized curvilinear permanent magnet 100, 100a, 100b and so on may be arcuate, with radius R1, and having an apex 106 and open end 107. Inner surface 102 and outer surface 103 may be arcuate as well, having radii R2 and R3, respectively. The magnet may have an arcuate length L, and angle θ may be less than, equal to, or greater than 180°. The direction of magnetization is indicated by arrows 120 as being aligned with, parallel to, and running along the curvilinear longitudinal axis of magnet 100, 100a, 100b and so on.

Figure 23:
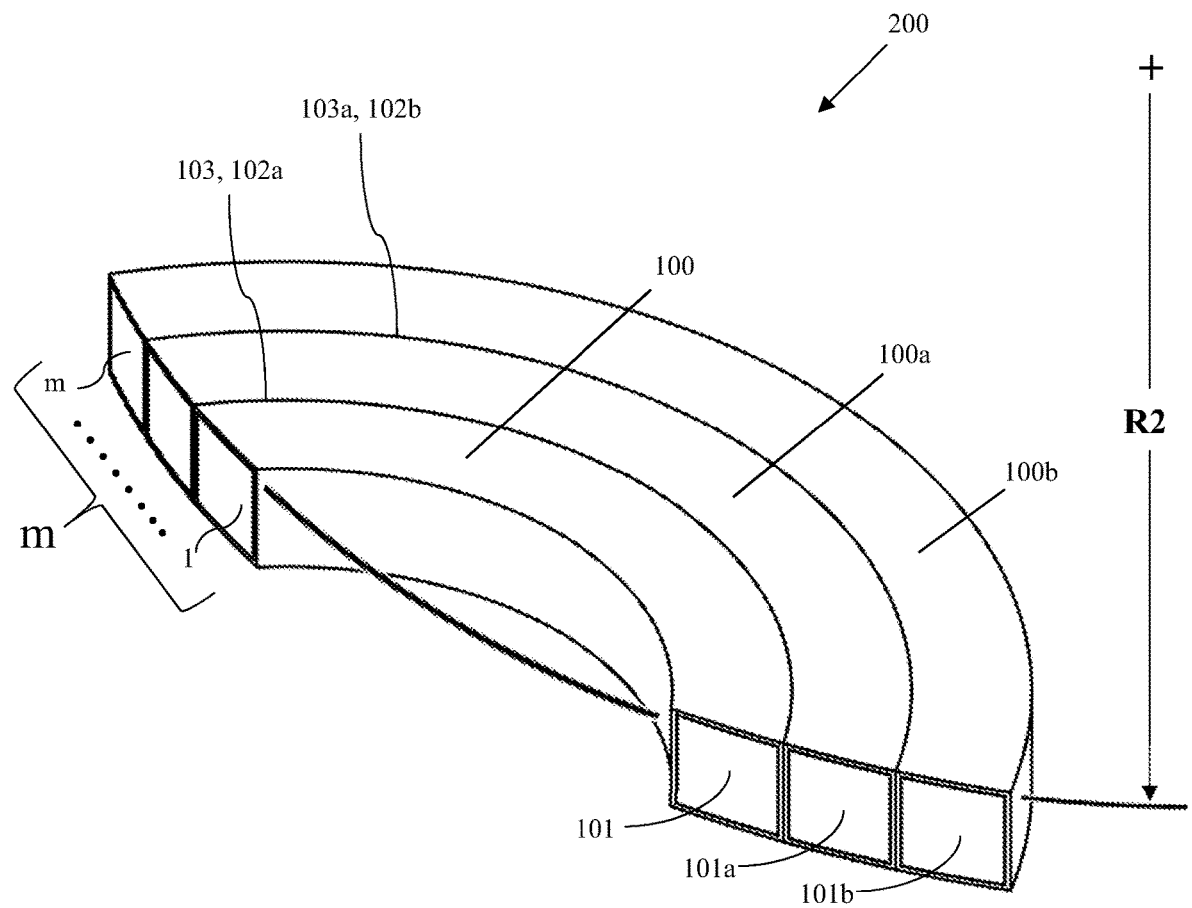
FIG. 23 depicts an embodiment of a array of axially-magnetized curvilinear permanent magnets of the present invention.

Referring now to FIG. 23, an embodiment of an "m-deep" planar array 200 of m axially-magnetized curvilinear permanent magnets of the invention 100, 100a, 100b and so on is depicted, comprising a plurality of axially-magnetized curvilinear permanent magnet of the invention nested together, outer curvilinear surface to inner curvilinear surface. In the example depicted in FIG. 2B, m=3. In the example depicted in FIG. 23, m=3, but m can be any desired number of axially-magnetized curvilinear permanent magnets 100, 100a, 100b and so on. In this example, the outer curvilinear (which may be arcuate) surface 103 of a first axially-magnetized curvilinear permanent magnet of the invention 100 is nested with the inner curvilinear (which may be arcuate) surface 102a of a second axially-magnetized curvilinear permanent magnet of the invention 100a, and the outer curvilinear (which may be arcuate) surface 103a of the second axially-magnetized curvilinear permanent magnet of the invention 100a is nested with the inner curvilinear (which may be arcuate) surface 102b of a third axially-magnetized curvilinear permanent magnet of the invention 100b. "Nested" as used herein means that magnets are in contact, in near proximity, or substantially in contact along at least a portion of their nesting surfaces, and, in embodiments, are substantially in contact along the entirety of their nesting surfaces. Axially-magnetized curvilinear permanent magnets of the invention 100, 100a, 100b and so on may take square, rectangular or any desired cross section 101, 101a, and 101b, respectively, as described relative to FIG. 21. While three axially-magnetized curvilinear permanent magnets of the invention 100, 100a, 100b are depicted forming array 200, array 200 may be comprised of any number of axially-magnetized curvilinear permanent magnets nested, as shown.

Figure 24:
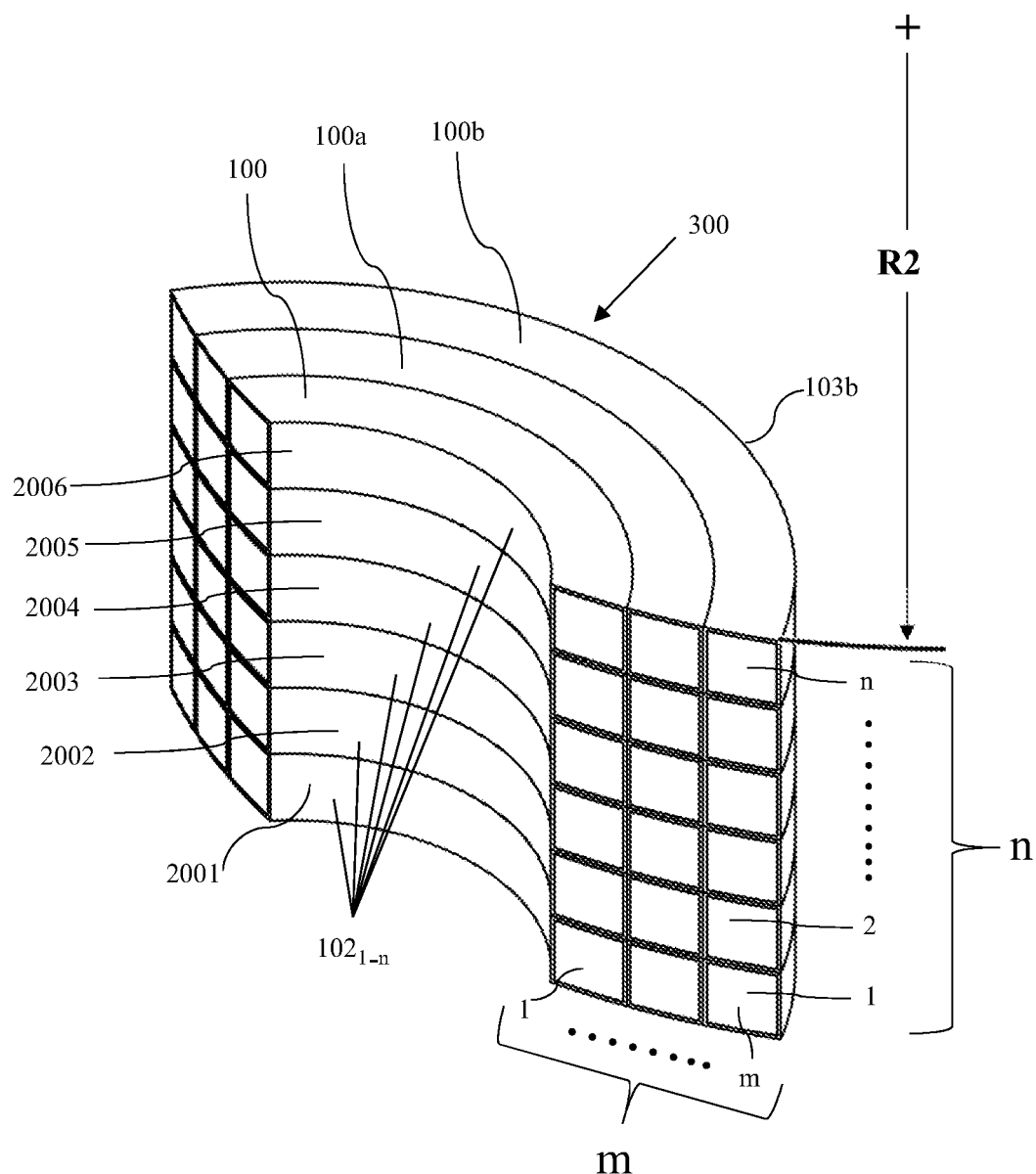
FIG. 24 depicts an embodiment of a group of arrays of axially-magnetized curvilinear permanent magnets of the present invention.

Referring now to FIG. 24, an "n-deep" group 300 of axially-magnetized curvilinear permanent magnet arrays 200-200$_n$ is depicted. In the example depicted in FIG. 24, n=6, but n can be any desired number of axially-magnetized curvilinear permanent magnet arrays 200 desired for a particular rotor use case. The arrays 200$_1$-200$_n$ may be stacked, one on another, with the inner curvilinear (which may be arcuate) surfaces 102$_{1-n}$ of the innermost axially-magnetized curvilinear permanent magnets 200$_{1-n}$ aligned, and with the outer curvilinear (which may be arcuate) surfaces 103" of the outermost axially-magnetized curvilinear permanent magnets 200$_{1-n}$ aligned, forming axially-magnetized curvilinear permanent magnet 300.

Figure 25:
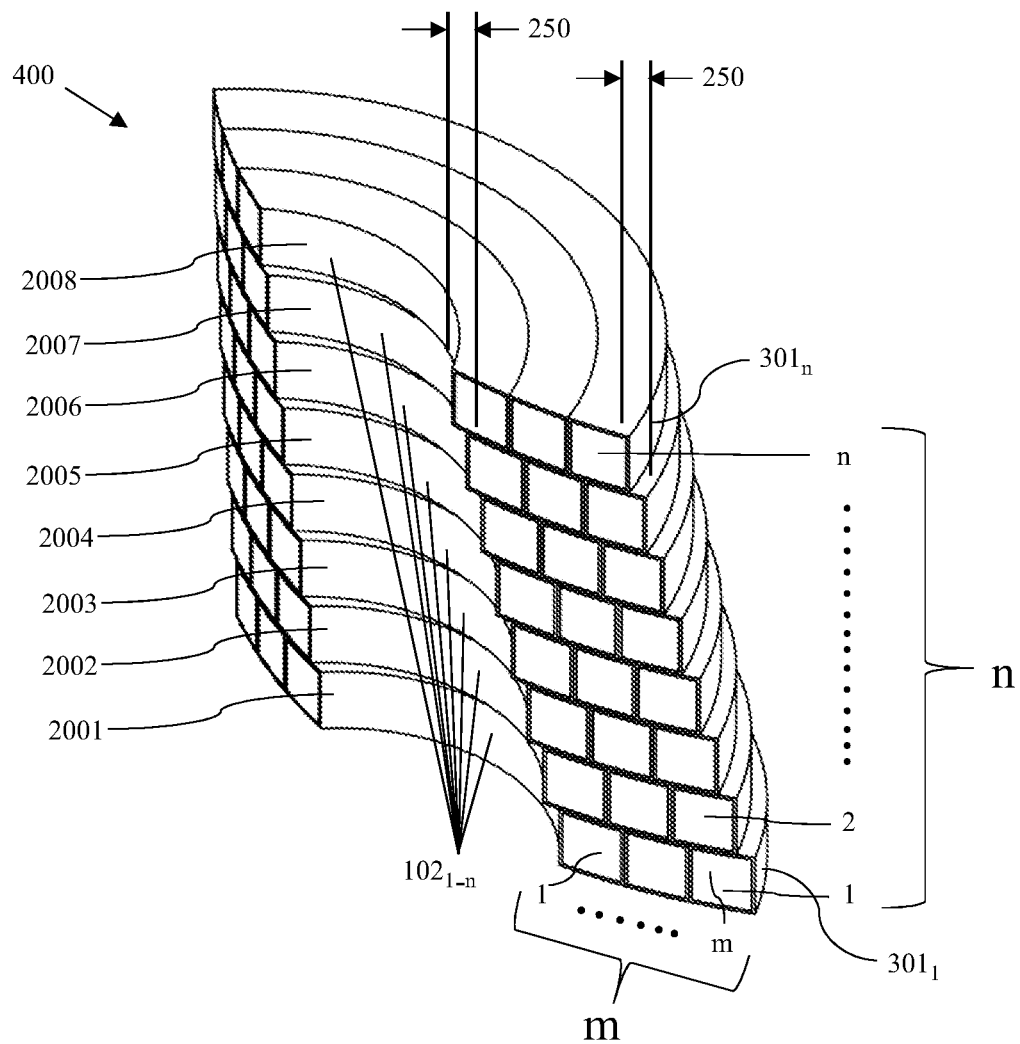
FIG. 25 depicts an embodiment of a group of arrays of curvilinear permanent magnets of the present invention, in which each array is rotationally offset, or staggered, from the adjacent arrays.

Referring now to FIG. 25, a "skewed" or "offset" "n-deep" group 400 of axially-magnetized curvilinear permanent magnet arrays 200-200$_n$ is depicted. In the example depicted in FIG. 2C, n=8, but n can be any desired number of axially-magnetized curvilinear permanent magnet arrays 200 desired for a particular rotor use case. The arrays 200$_1$-200$_n$ may be stacked, one on another, with the inner curvilinear (which may be arcuate) surfaces 102$_{1-n}$ of the innermost axially-magnetized curvilinear permanent magnets 101$_1$-111$_n$ offset at each end by a distance 250 as between adjacent arrays, and with the outer curvilinear (which may be arcuate) surfaces 103$_{1-n}$ of the outermost axially-magnetized curvilinear permanent magnets 100"$_{1-n}$ offset at each end by a distance 250 as between adjacent arrays as depicted in FIG. 25, forming offset axially-magnetized curvilinear permanent magnet 400.

Curvilinear permanent magnets of the invention may be used in electric machine rotor design in any number of configurations, including both motors and electric generators. The scope of the invention includes not only axially-magnetized curvilinear permanent magnets, but the methods of producing such magnets, rotors comprising such magnets, and electric machines comprising such magnets. Exemplary, non-limiting, configurations of rotors and electric machines of the invention follow. These specific examples are intended to demonstrate the principles, schemes, use and application of the inventive curvilinear permanent magnets of the invention but it is to be understood that the inventive curvilinear permanent magnets may be used in any rotor, electric machine, or electric system design or use case in which it is desired to reduce or eliminate demagnetization field vectors in permanent magnets, and the negative effects such demagnetization field vectors may have any device, system or apparatus, including but not limited to electric machines.

Figure 26:
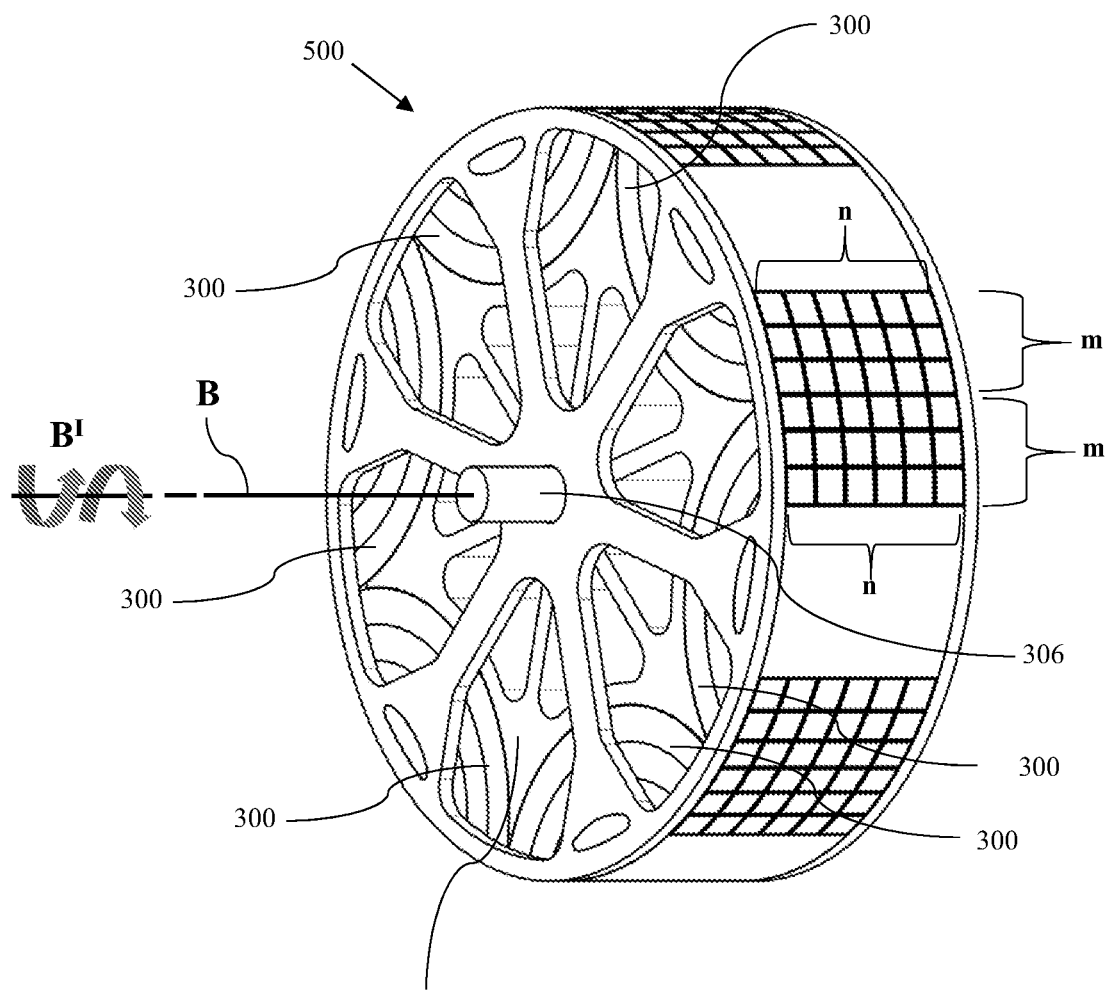
FIG. 26 depicts a perspective view of an exemplary six-pole embodiment of a rotor for an electrical machine, wherein the rotor permanent magnets are inventive axially-magnetized curvilinear permanent magnets that are radially arranged about the rotor axis of rotation.
Figure 27:
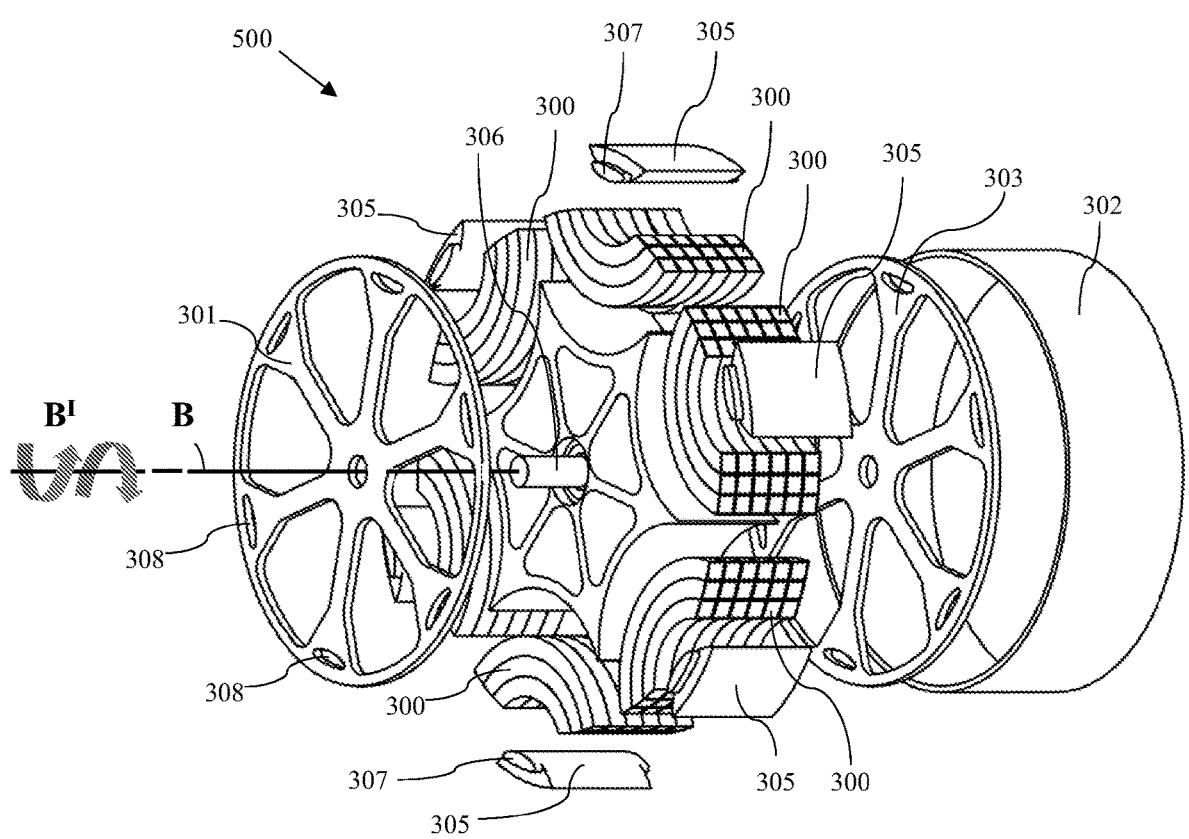
FIG. 27 depicts an exploded view of an exemplary six-pole embodiment of a rotor for an electrical machine, wherein the rotor permanent magnets are inventive axially-magnetized curvilinear permanent magnets that are radially arranged about the rotor axis of rotation.

Referring now to FIGS. 26 and 27, a perspective and an exploded view, respectively, of an exemplary embodiment of a six-pole permanent magnet rotor assembly 500 of the invention is depicted. This exemplary embodiment rotor 500 comprises six axially magnetized curvilinear permanent magnet groups 300 for which m=3 and n=6. The axially magnetized curvilinear permanent magnet groups are configured as shown schematically in FIG. 13. The six-pole permanent magnet rotor assembly 500 comprises a rotor shaft 306 having an axis of rotation B, about which rotor 500 rotates as depicted by arrow B'. Rotor shaft 306 is in mechanical communication with a mechanical structure comprising a rotor inner structure 304 for securing the six axially magnetized curvilinear permanent magnet groups 300 in the arrangement depicted in FIG. 13 suitable for the expected rate of rotation of rotor shaft 306, shock and vibration of expected use cases, and so on. When six-pole permanent magnet rotor assembly 500 is located in proximity to a stator such that its six axially magnetized curvilinear permanent magnet groups 300 are within a rotating magnetic field produced by stator magnets, i.e. when the axially-magnetized curvilinear permanent magnets comprising magnet groups 300 are in magnet communication with the stator magnets, rotor shaft 306 is caused to rotate about its axis of rotation B.

Still referring to FIGS. 26 and 27, the mechanical structure of rotor assembly 500 may comprise a cover 302, a plurality of spacers 305 for securely capturing the six axially magnetized curvilinear permanent magnet groups 300 in the arrangement depicted in FIG. 13, a first end plate 301 and a second end plate 303 that have openings 306 that interlock with tongues 307 on spacers 305, and inner structure 304 shaped to receive supporting capturing the six axially magnetized curvilinear permanent magnet groups 300 and to secure them in place relative to one another as depicted in FIG. 13, with the apex of each axially magnetized curvilinear permanent magnet comprising axially magnetized curvilinear permanent magnet groups 300 oriented towards axis of rotation B.

Figure 28:
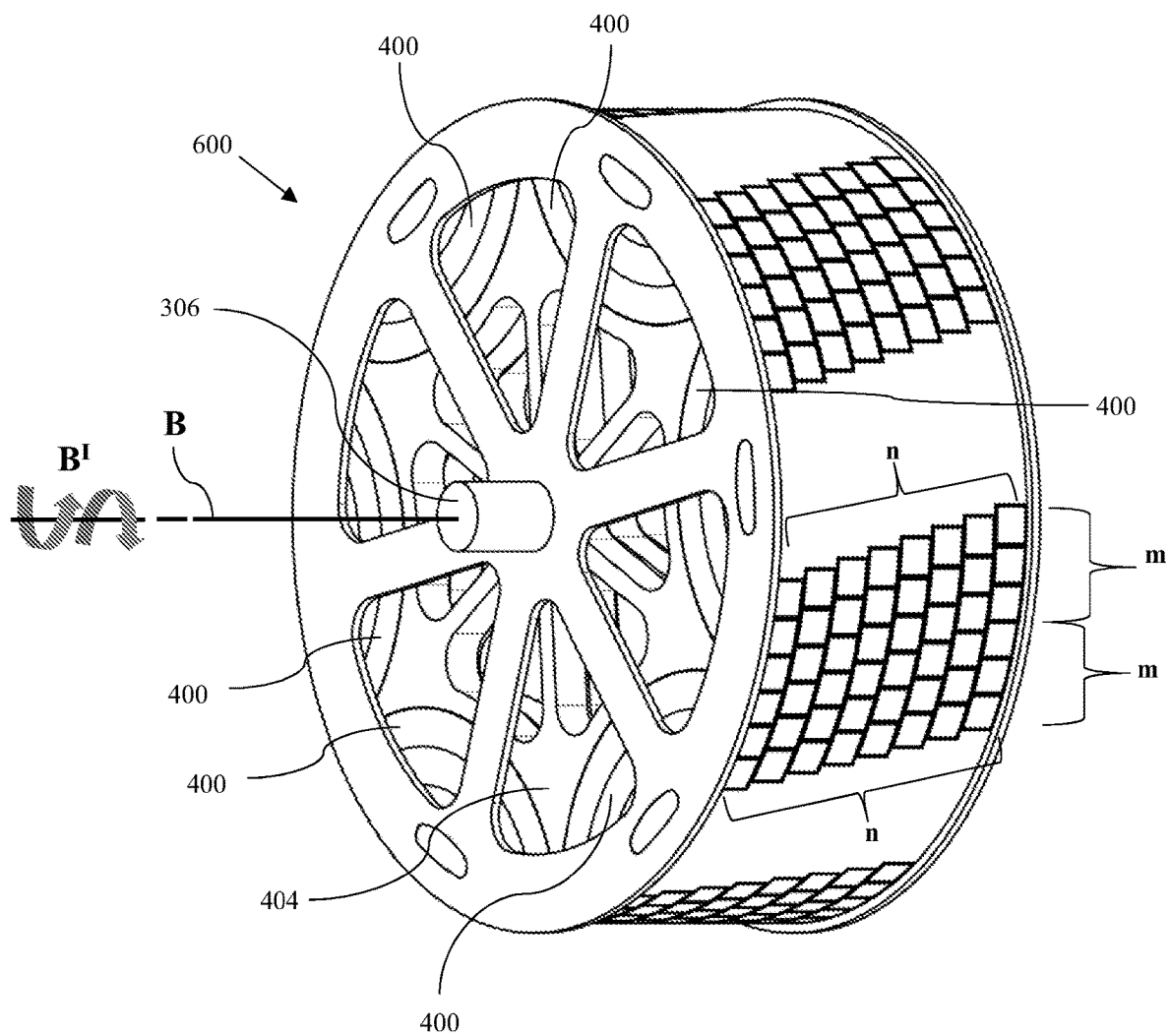
FIG. 28 depicts a perspective view of an exemplary six-pole embodiment of a rotor for an electrical machine, wherein the rotor permanent magnets are inventive axially-magnetized curvilinear permanent magnets that are radially arranged about the rotor axis of rotation, wherein, in the magnet groups comprising the rotor, each magnet array is rotationally offset, or staggered, from the adjacent magnet arrays.
Figure 29:
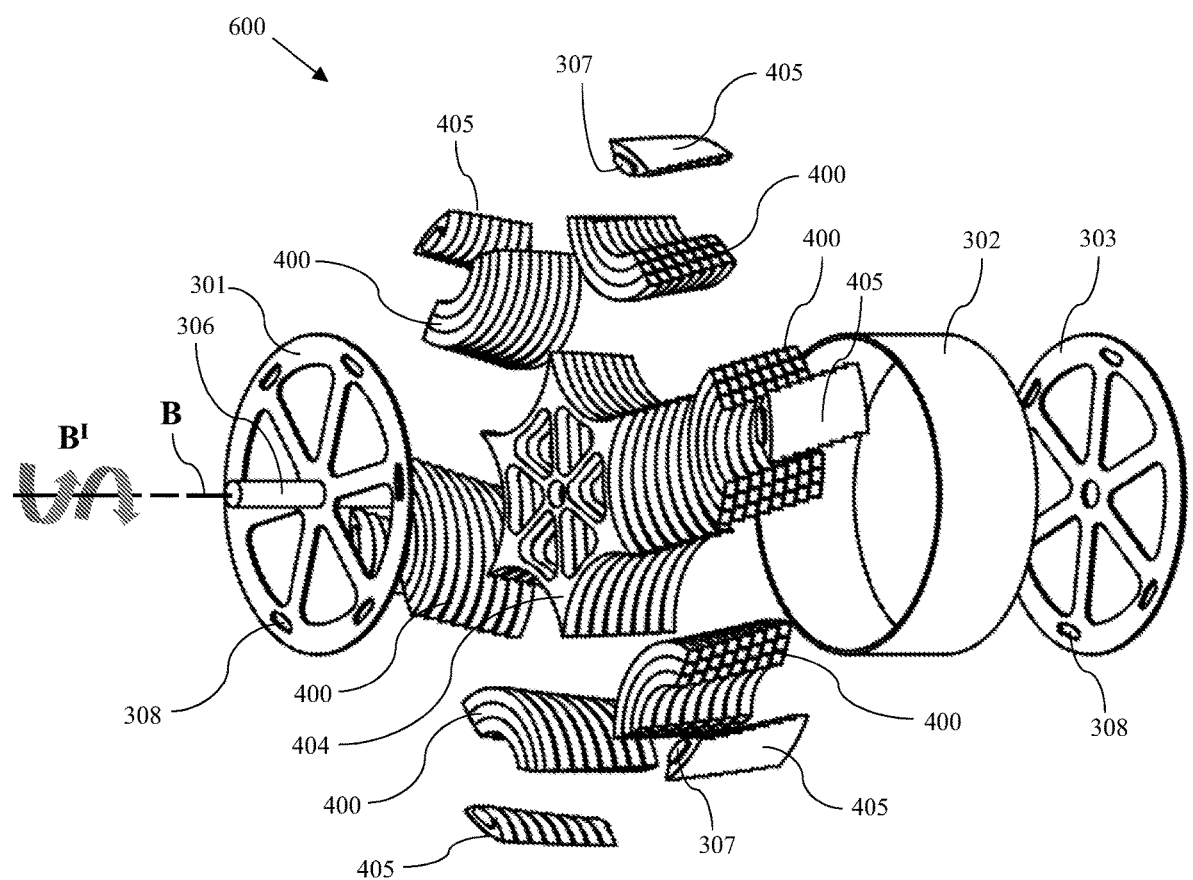
FIG. 29 depicts an exploded view of an exemplary six-pole embodiment of a rotor for an electrical machine, wherein the rotor permanent magnets are inventive axially-magnetized curvilinear permanent magnets that are radially arranged about the rotor axis of rotation, wherein, in the magnet groups comprising the rotor, each magnet array is rotationally offset, or staggered, from the adjacent magnet arrays.

Referring now to FIGS. 28 and 29, a perspective and an exploded view, respectively, of an exemplary embodiment of a six-pole skewed or offset permanent magnet rotor assembly 600 of the invention comprising axially-magnetized curvilinear permanent magnets is depicted. This exemplary embodiment rotor 600 comprises six skewed or offset axially magnetized curvilinear permanent magnet groups 400 for which m=3 and n=8. The axially magnetized curvilinear permanent magnet groups are configured as shown schematically in FIG. 13. The six-pole permanent magnet rotor assembly 600 comprises a rotor shaft 306 having an axis of rotation B, about which rotor 600 rotates as depicted by arrow B'. Rotor shaft 306 is in mechanical communication with a mechanical structure comprising an inner structure 404 for securing the six axially magnetized curvilinear permanent magnet groups 400 in the arrangement depicted in FIG. 13 suitable for the expected rate of rotation of rotor shaft 306, shock and vibration of expected use cases, and so on. When six-pole permanent magnet rotor assembly 600 is located in proximity to a stator such that its six axially magnetized curvilinear permanent magnet groups 400 are within a rotating magnetic field produced by stator magnets, i.e. when the axially-magnetized curvilinear permanent magnets comprising magnet groups 400 are in magnet communication with the stator magnets, rotor shaft 306 is caused to rotate about its axis of rotation B.

Still referring to FIGS. 28 and 29, the mechanical structure of rotor assembly 600 may comprise a rotor cover 302, a plurality of spacers 405 for securely capturing the six axially magnetized curvilinear permanent magnet groups 400 in the arrangement depicted in FIG. 1K, a first end plate 301 and a second end plate 303 that have openings 306 that interlock with tongues 307 on spacers 405, and inner structure 404 shaped to receive supporting capturing the six axially magnetized curvilinear permanent magnet groups 400 and to secure them in place relative to one another as depicted in FIG. 1K, with the apex of each axially magnetized curvilinear permanent magnet comprising axially magnetized curvilinear permanent magnet groups 400 oriented towards axis of rotation B.

Figure 30:
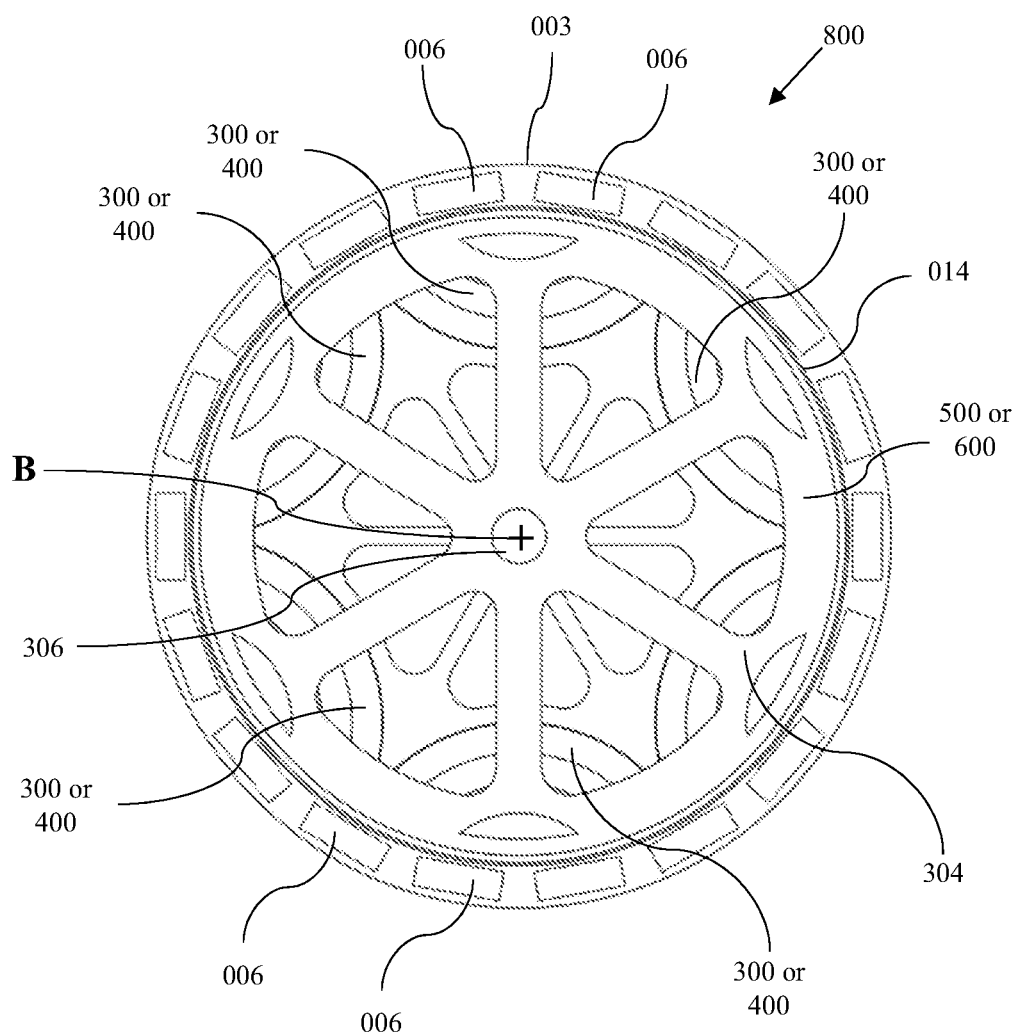
FIG. 30 depicts an end view of an exemplary six-pole embodiment of an electrical machine of the invention, wherein the rotor permanent magnets are inventive curvilinear permanent magnets that are axially magnetized and radially arranged.
Figure 31:
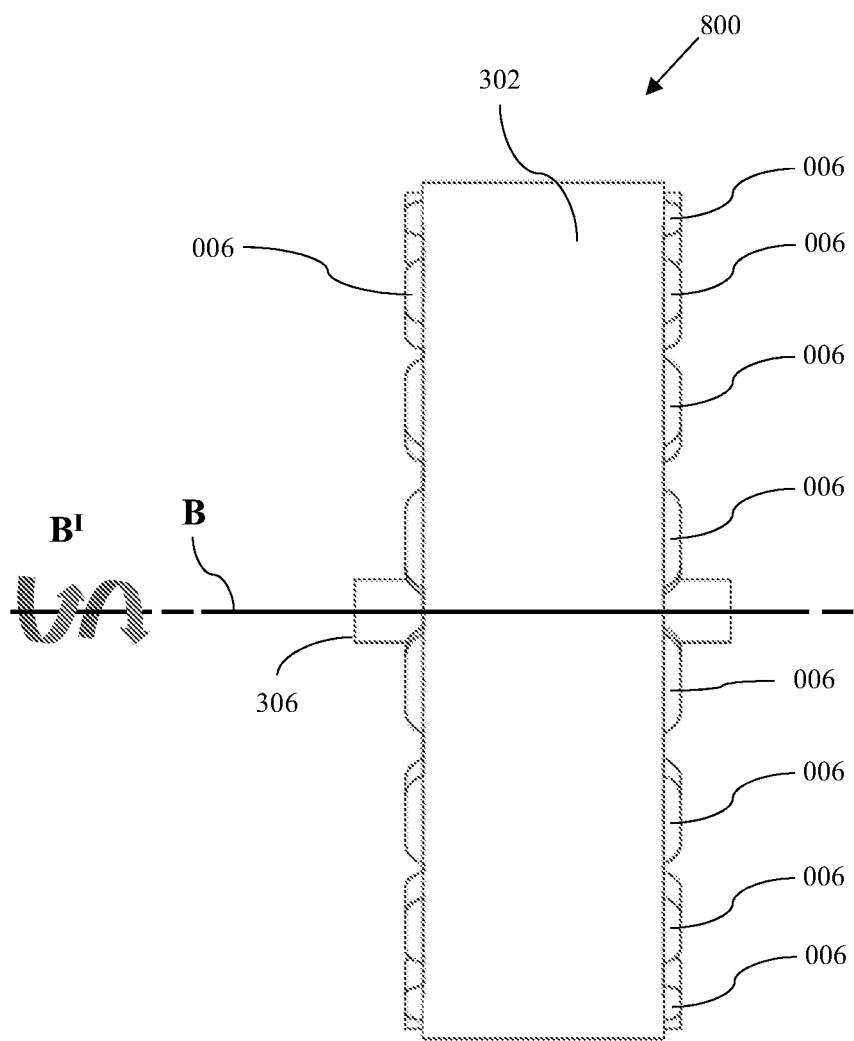
FIG. 31 depicts a side view of an exemplary six-pole embodiment of an electrical machine of the invention, wherein the rotor permanent magnets are inventive curvilinear permanent magnets that are axially magnetized and radially arranged.
Figure 32:
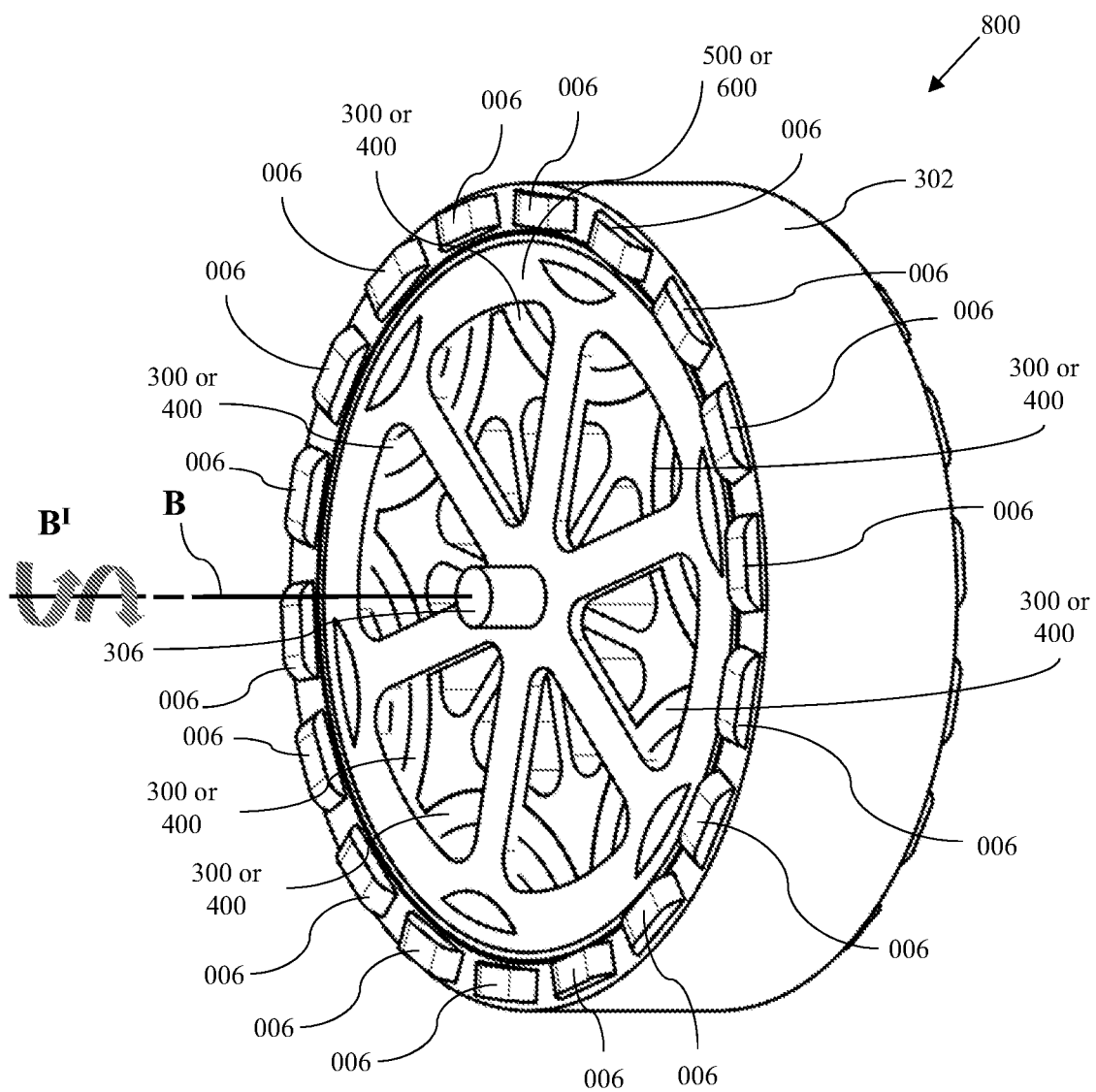
FIG. 32 depicts an exploded view of an exemplary six-pole embodiment of an electrical machine of the invention, wherein the rotor permanent magnets are inventive curvilinear permanent magnets that are axially magnetized and radially arranged.
Figure 33:
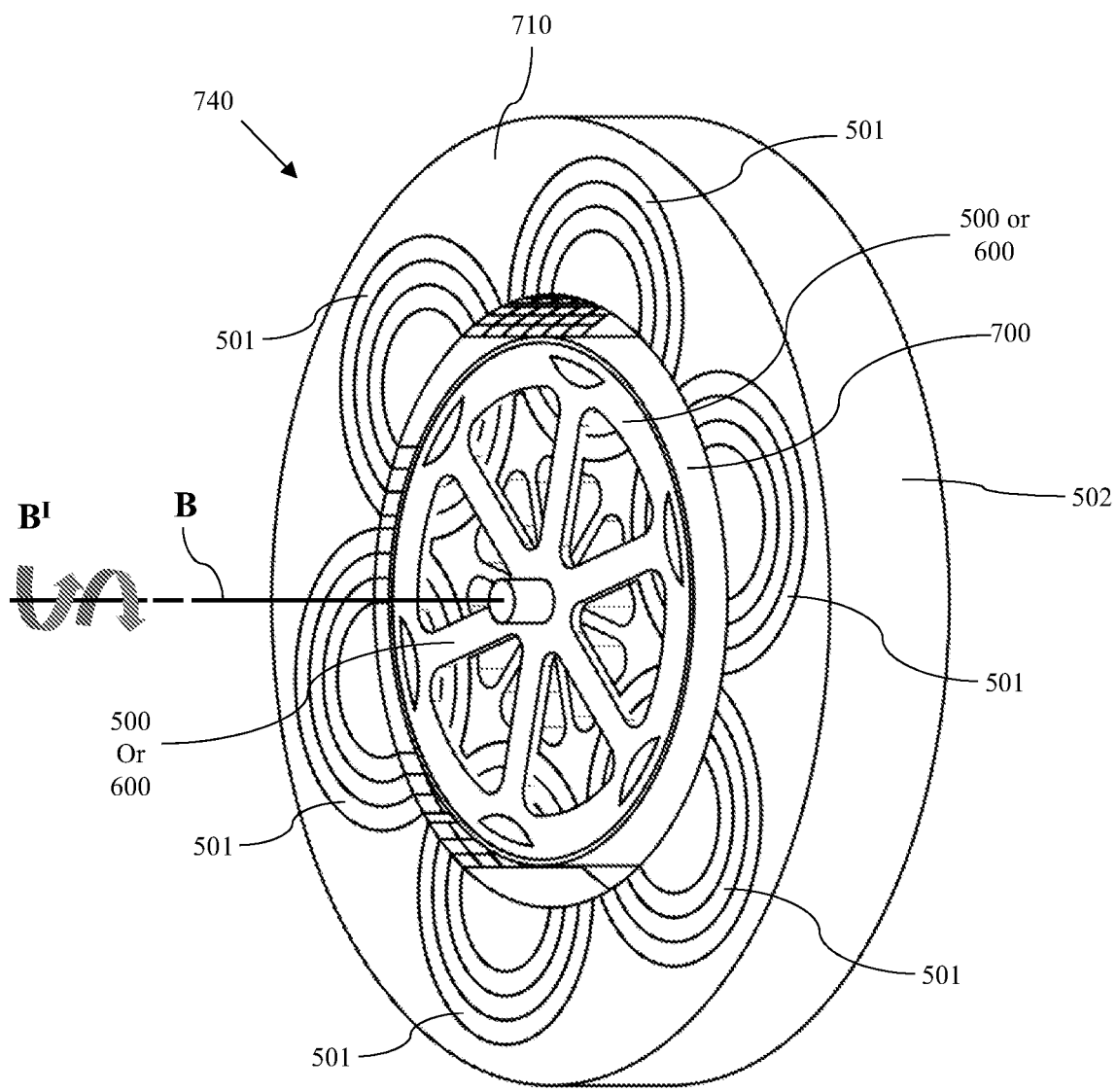
FIG. 33 depicts a perspective view of a six-pole dual rotor of the invention, in which the axially-magnetized curvilinear permanent rotor magnets of the invention are radially arranged.
Figure 34:
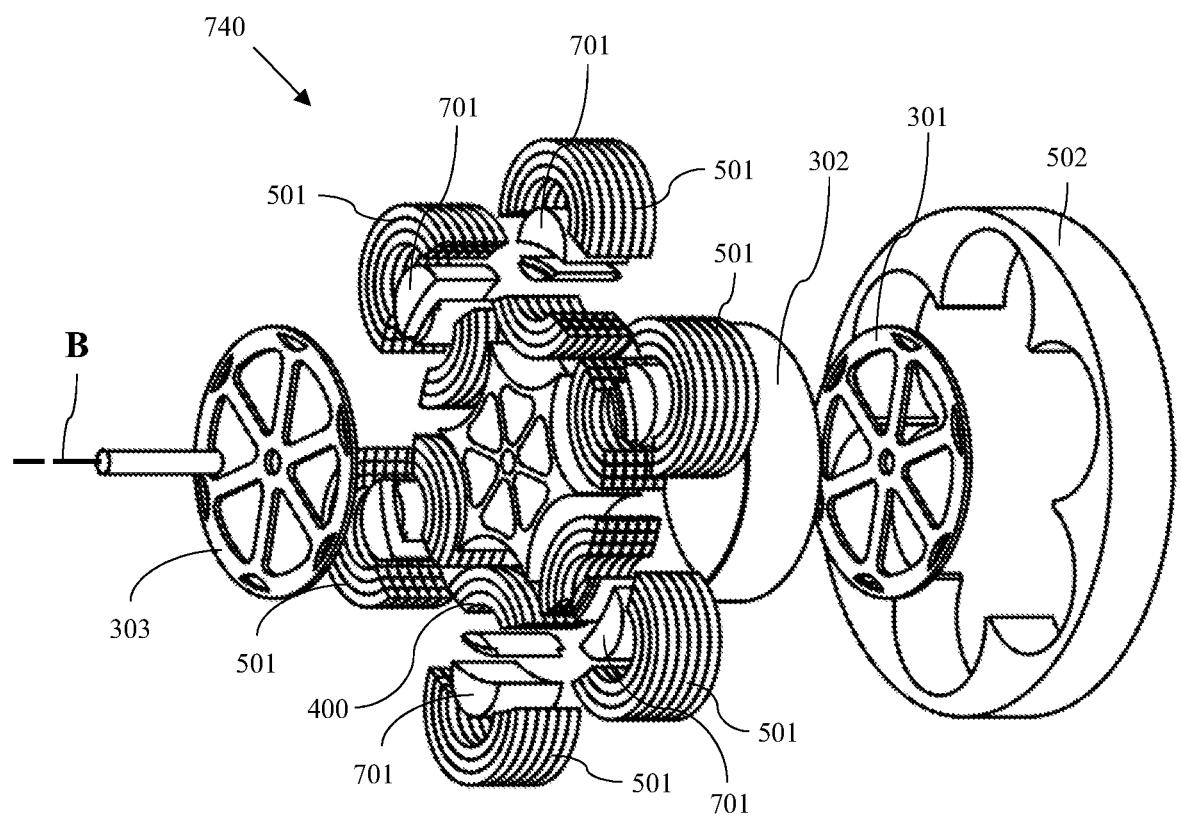
FIG. 34 depicts an exploded view of a six-pole dual rotor of the invention, in which the axially-magnetized curvilinear permanent rotor magnets of the invention are radially arranged.
Figure 35:
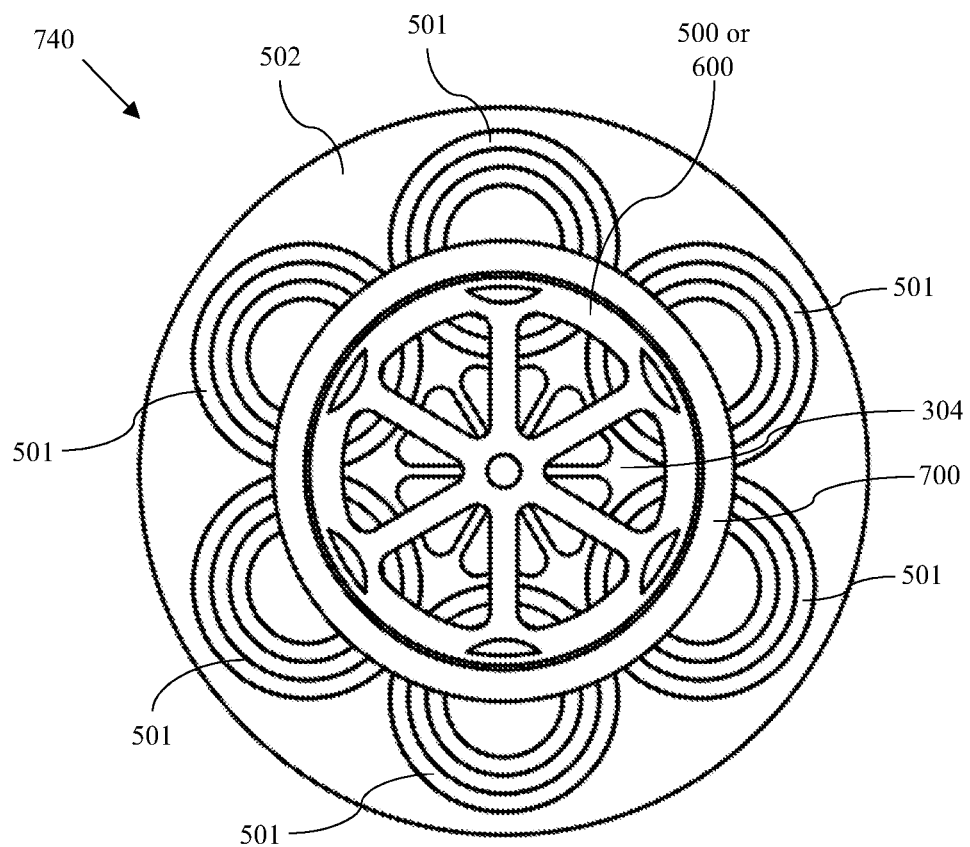
FIG. 35 depicts an end view of a six-pole dual rotor of the invention, in which the axially-magnetized curvilinear permanent rotor magnets of the invention are radially arranged.
Figure 36:
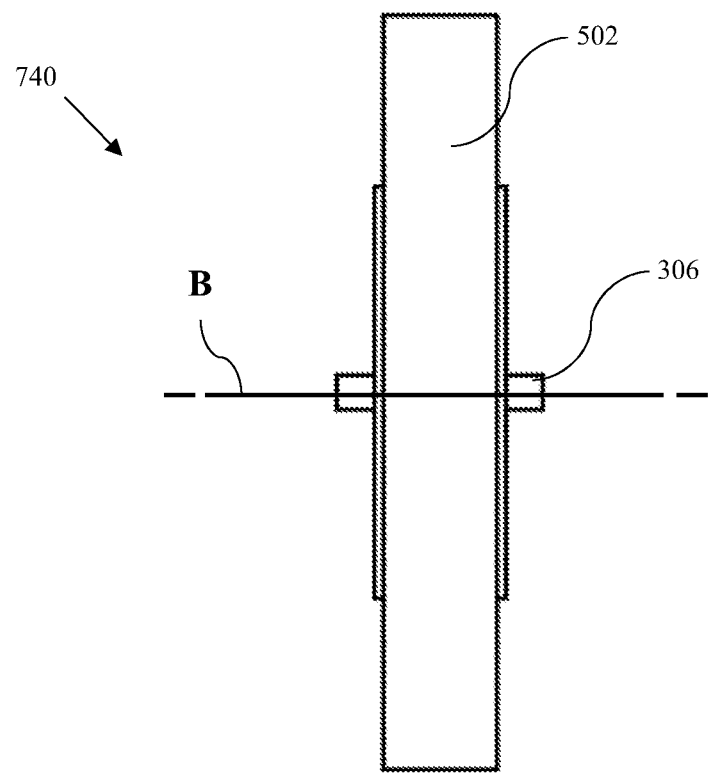
FIG. 36 depicts a side view of a six-pole dual rotor of the invention, in which the axially-magnetized curvilinear permanent rotor magnets of the invention are radially arranged.

Referring now to FIGS. 30, 31 and 32, an exemplary, non-limiting embodiment of an electric machine 800 of the invention comprising a six-pole rotor 500 or 600 is depicted.

Stator 003 comprises a plurality of stator magnets 006 that may be energized to create a rotating stator magnetic field. The axially-magnetized curvilinear magnets comprising axially magnetized curvilinear permanent magnet groups 300 or 400 of the rotor 500 or 600 are disposed within the stator magnetic field, such that the rotor magnet are in magnetic communication with, and can be acted upon, by the stator magnetic field, causing the rotor to rotate about axis of rotation B, which causes rotor shaft 306 to rotate when the stator magnets are energized (this is in the case that electric machine 800 is a motor—in the case of a generator, the rotation of rotor 500 or 600 would induce an electric current in stator magnets 006). Cover 302 is depicted for reference.

Referring now to FIGS. 33-36, a non-limiting exemplary embodiment of a six-pole dual-rotor 740 of the invention is depicted. A rotor of the invention such as rotor 500 comprising axially magnetized curvilinear permanent magnet groups 300, or rotor 600 comprising skewed, or offset, axially magnetized curvilinear permanent magnet groups 400, is able to rotate about axis B in the direction of arrows B'. Rotatable rotor shaft 306 is attached to the rotor such that it rotates around axis of rotor rotation B with the rotor. In this example of a dual rotor of the invention, an outer rotor 710, comprising a second set of axially magnetized curvilinear permanent magnet groups 501, is also present. Rotor 500 (or 600, as the case may be) is mechanically attached to outer rotor 710 forming a dual rotor such that they rotate together around axis of rotation B. In embodiments, the number of rotor axially magnetized curvilinear permanent magnet groups equals the number of outer rotor axially magnetized curvilinear permanent magnet groups. In embodiments, each axially magnetized curvilinear permanent magnet group comprising the rotor has the same number of axially magnetized curvilinear permanent magnets (as depicted in the six-pole example depicted in FIGS. 26 and 28), and each axially magnetized curvilinear permanent magnet group comprising the outer rotor 501 has the same number of axially magnetized curvilinear permanent magnets. In embodiments, the axially magnetized curvilinear permanent magnet groups comprising the rotor equals the number of axially magnetized curvilinear permanent magnet groups 501 comprising the outer rotor 710. The axially magnetized curvilinear permanent magnet group comprising the outer rotor 501 may be held in placed, or received by, an outer rotor support ring 502. A dual rotor stator air gap 700 exists between the rotor and the outer rotor. The rotor, which may be, for example, a rotor such as 500 or 600 but may be any rotor that comprises axially-magnetized curvilinear permanent magnets, may be termed an "inner rotor" when used in reference to the dual rotor configuration. In embodiments, the axially magnetized curvilinear permanent magnet groups comprising the inner rotor and outer rotor may be arranged, configured and disposed such that they each have an arcuate longitudinal axis having a radius, and each axially magnetized curvilinear permanent magnet of each inner rotor magnet group has a matching axially magnetized curvilinear permanent magnet of equal longitudinal axis radius in a magnet group in the outer rotor 501. In the example shown, the axially magnetized curvilinear permanent magnets comprising the inner rotor have a θ less than 180°, and each axially magnetized curvilinear permanent magnets comprising the inner rotor have a θ greater than 180°, but this is just exemplary, and the scope of the invention includes axially magnetized curvilinear permanent magnets of any configuration. First rotor end plate 301, second rotor end plate 303, and rotor cover 302, rotor shaft 306, rotor inner structure 304 and axis of rotor rotation B are shown for reference.

Figure 37:
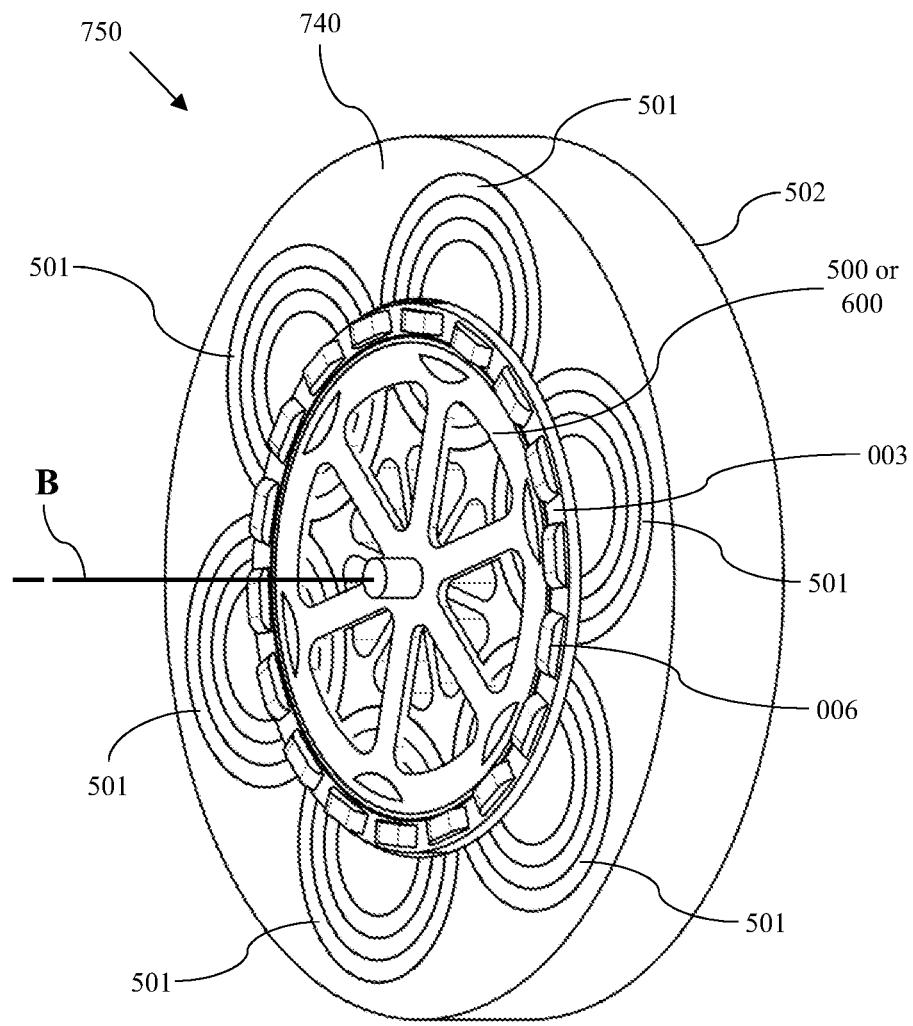
FIG. 37 depicts a perspective view of a six-pole dual rotor electric machine of the invention, in which the axially-magnetized curvilinear permanent rotor magnets of the invention are radially arranged.

Referring now to FIG. 37, a non-limiting exemplary embodiment of a six-pole dual-rotor electric machine of the invention 750 is depicted. In this example, stator 003, comprising a plurality of stator magnets 006, is disposed in the dual rotor stator gap 700 of the inventive dual rotor depicted in FIGS. 33-36. The axially-magnetized curvilinear magnets comprising axially magnetized curvilinear permanent magnet groups 300 or 400 of the rotor 500 or 600 are disposed within the stator 003 magnetic field, and the axially-magnetized curvilinear magnets comprising axially magnetized curvilinear permanent magnet groups 501 of the outer rotor 740 are also disposed within the stator magnetic field, such that the rotor magnets are in magnetic communication with, and can be acted upon, by the stator magnetic field when the stator magnets 006 are energized, causing the dual rotor 740 to rotate about axis of rotation B, which causes rotor shaft 306 to rotate when the stator magnets are energized (this is in the case that electric machine 900 is a motor—in the case of a generator, the rotation of the inner rotor and outer rotor by rotation of rotor shaft 306 induces an electric current in stator magnets 006). Outer rotor support ring 502 is depicted for reference.

Figure 38:
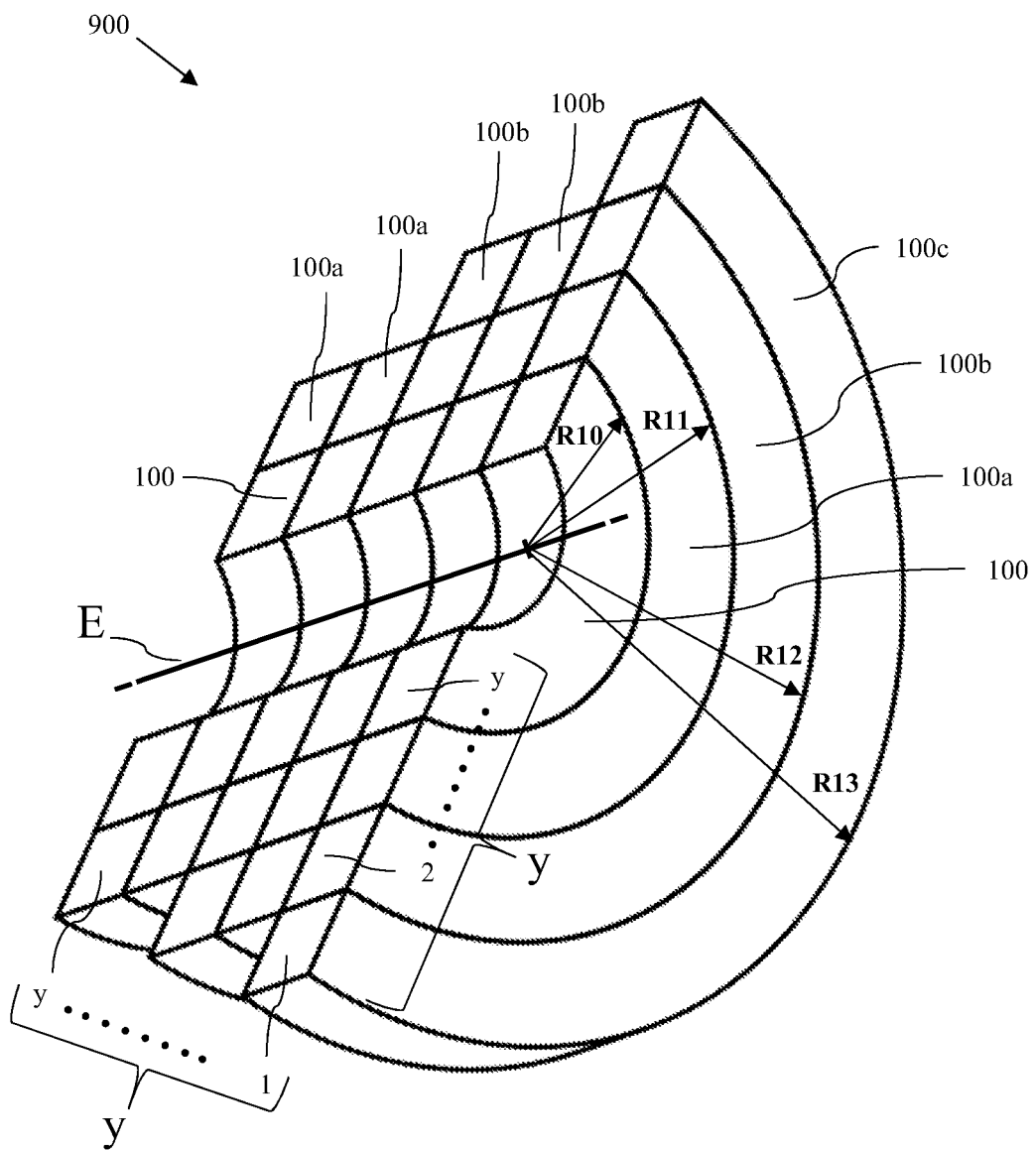
FIG. 38 depicts a perspective view of an exemplary embodiment of an axially-oriented group of axially-magnetized curvilinear permanent magnets 900, in which the axially-magnetized curvilinear permanent magnets may be axially arranged about the rotor axis of rotation.

Referring now to FIG. 38, an exemplary embodiment of an axially-oriented group of axially-magnetized curvilinear permanent magnets 900 is depicted. As used relative the magnet group 900, "axially-oriented" means that each of the curvilinear magnets 100-100c, and so on, are disposed in a plane that runs parallel to axis of rotor shaft rotation B. This "axial orientation" of curvilinear magnets 100-100c, and so on, is not be confused with the axial magnetization of each curvilinear magnet, which refers to the direction of magnetization of each curvilinear magnet being along the direction of the curvilinear axis of the magnet, as described elsewhere herein. The axially-oriented group of axially-magnetized curvilinear permanent magnets may comprise one or more magnet arrays of any number y, each magnet array comprised of axially-magnetized curvilinear permanent magnets 100, 100a, 100b, 100c, and so on, nested as depicted in the figure. As can be seen in the figure, arrays comprising varying number of axially-magnetized curvilinear permanent magnets may comprise magnet group 900, depending on the desired configuration of the rotor. In the example shown, axially-magnetized curvilinear magnet 100 may have an outer radius R10, allowing it to nest with the inner surface of axially-magnetized curvilinear magnet 100 that is complementary to the outer surface of axially-magnetized curvilinear magnet 100; axially-magnetized curvilinear magnet 100a may have an outer radius R11, allowing it to nest with the inner surface of axially-magnetized curvilinear magnet 100b that is complementary to the outer surface of axially-magnetized curvilinear magnet 100a, axially-magnetized curvilinear magnet 100b may have an outer radius R12, allowing it to nest with the inner surface of axially-magnetized curvilinear magnet 100c that is complementary to the outer surface of axially-magnetized curvilinear magnet 100b, and so on.

Figure 39:
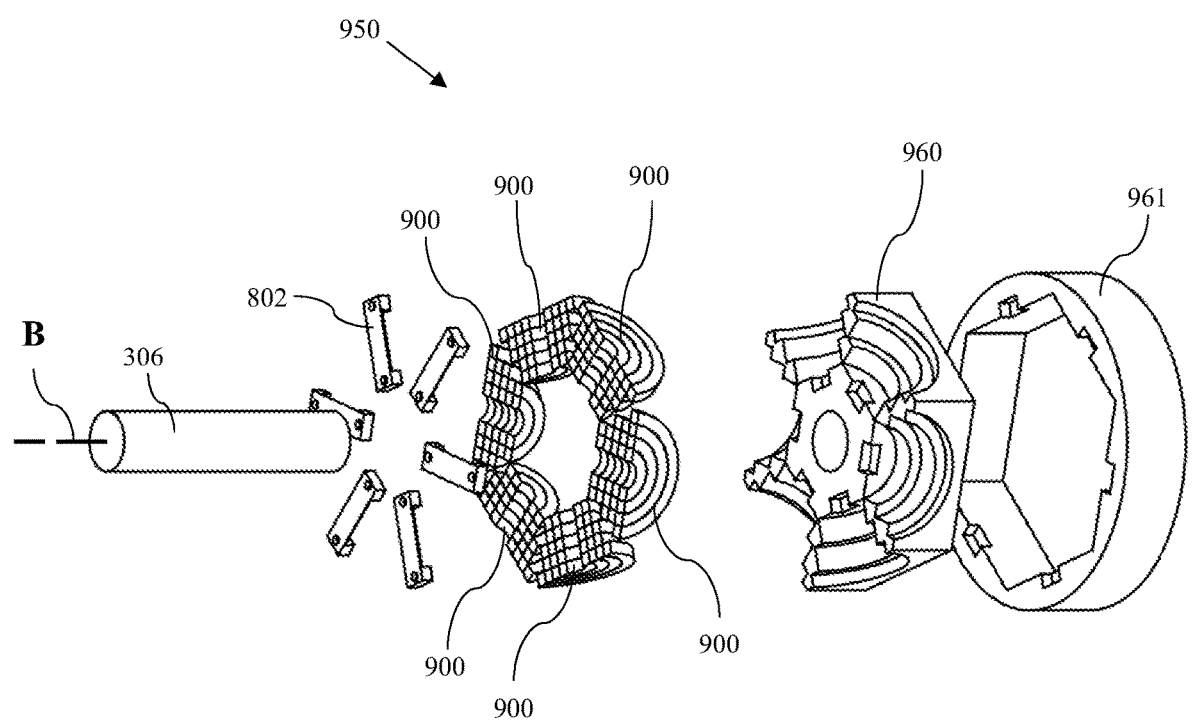
FIG. 39 depicts an exploded view of an exemplary embodiment of a six-pole rotor of the invention that comprises a plurality of axially-oriented groups of axially-magnetized curvilinear permanent magnets, in which the axially-magnetized curvilinear permanent magnets are axially arranged about the rotor axis of rotation.
Figure 40:
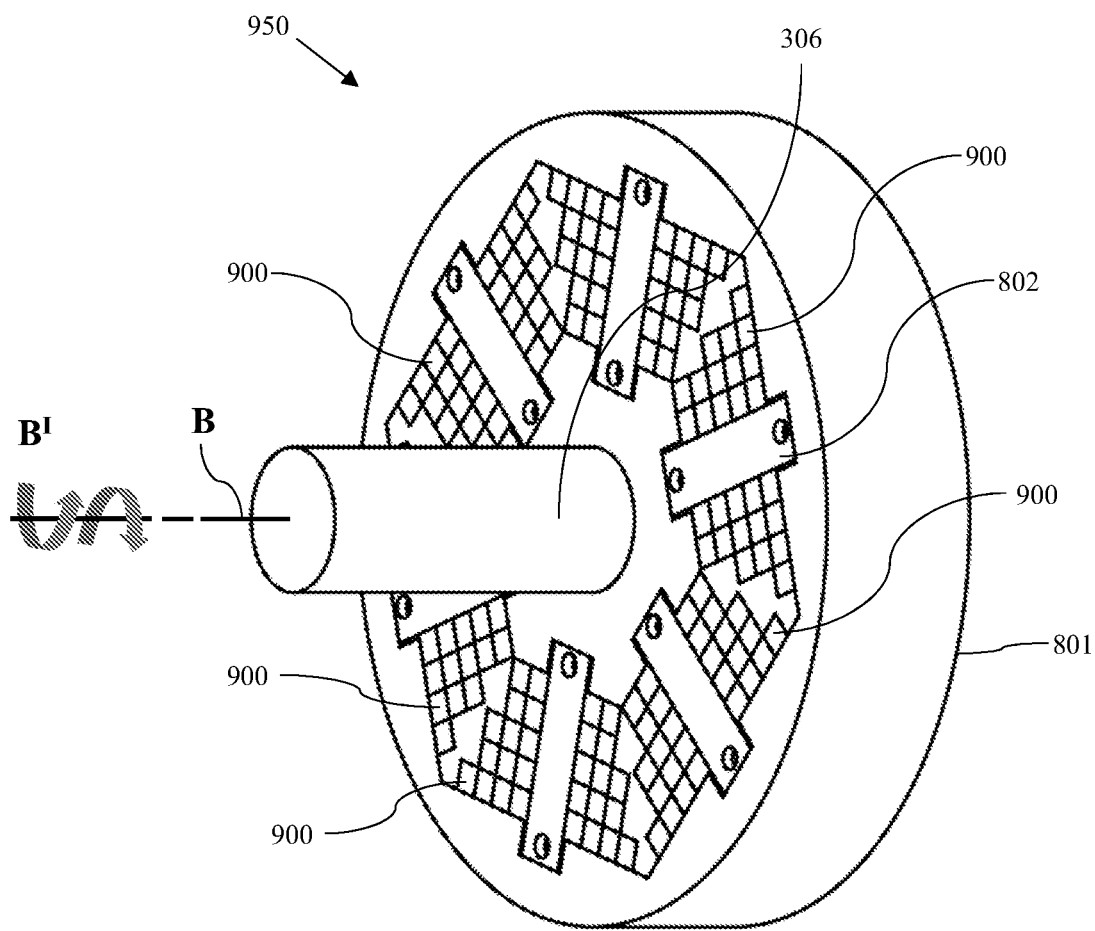
FIG. 40 depicts a perspective view of an exemplary embodiment of a six-pole rotor of the invention that comprises a plurality of axially-oriented groups of axially-magnetized curvilinear permanent magnets, in which the axially-magnetized curvilinear permanent magnets are axially arranged about the rotor axis of rotation.
Figure 41:
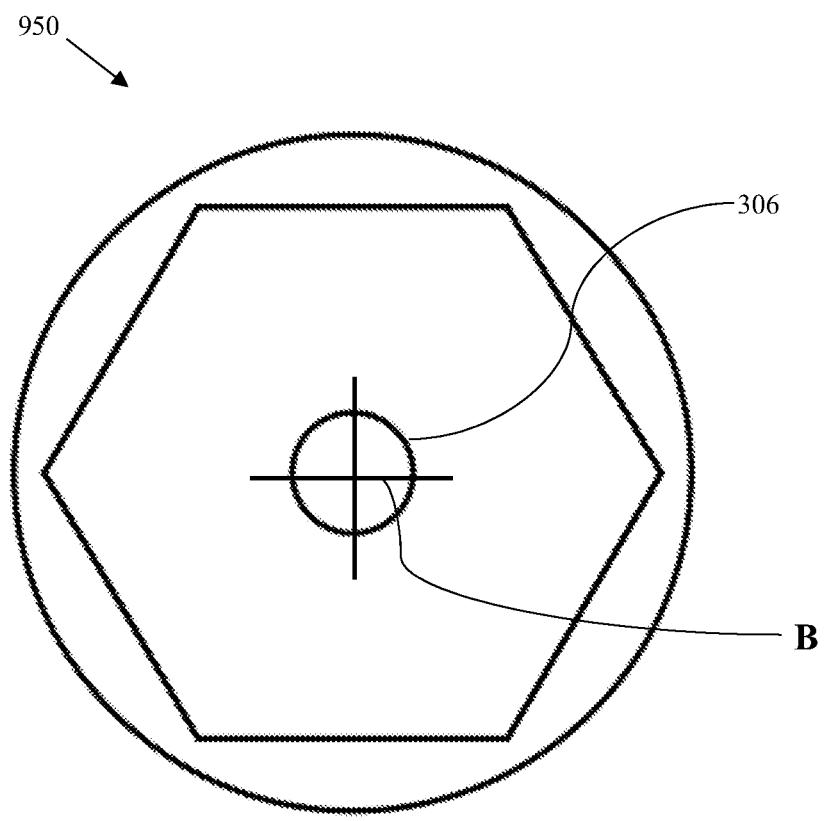
FIG. 41 depicts an end view of an exemplary embodiment of a six-pole rotor of the invention that comprises a plurality of axially-oriented groups of axially-magnetized curvilinear permanent magnets, in which the axially-magnetized curvilinear permanent magnets are axially arranged about the rotor axis of rotation.

Referring now to FIGS. 39-41, an exemplary embodiment of an electric machine rotor 950 comprising a plurality of axially oriented curvilinear permanent magnet groups 900 is depicted. The axially oriented curvilinear permanent magnet groups 900 may be received by, or at least supported by, an axially oriented curvilinear permanent magnet group support ring 960, that is in turn received by, or at least supported by, an axially oriented curvilinear permanent magnet group support ring structure 961. The axially oriented curvilinear permanent magnet groups 900 may be held in place in support ring 960 and support structure 961 by brackets 802 or equivalent structure. Rotor axis of rotation B, direction of rotation B' and rotor shaft 306 are shown for reference.

Figure 42:
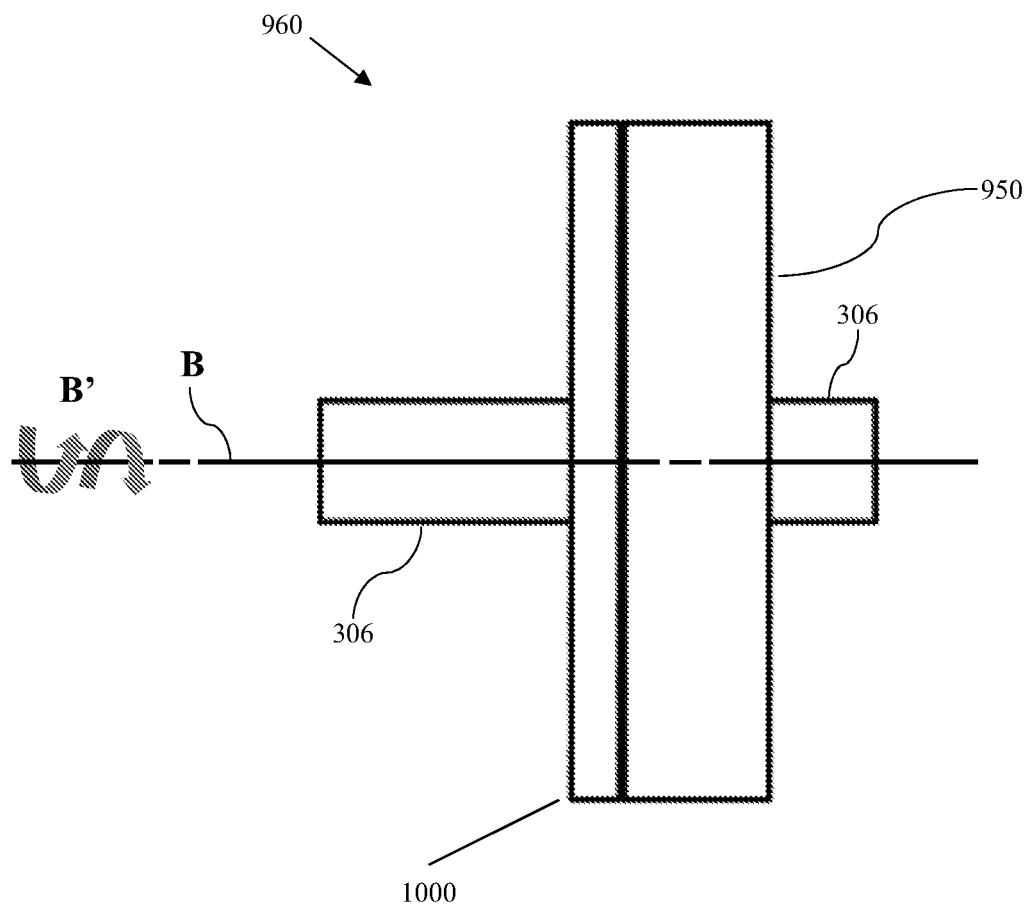
FIG. 42 depicts a side view of an exemplary embodiment of a six-pole electric machine of the invention that comprises a six-pole rotor having a plurality of axially-oriented groups of axially-magnetized curvilinear permanent magnets, and a stator.
Figure 43:
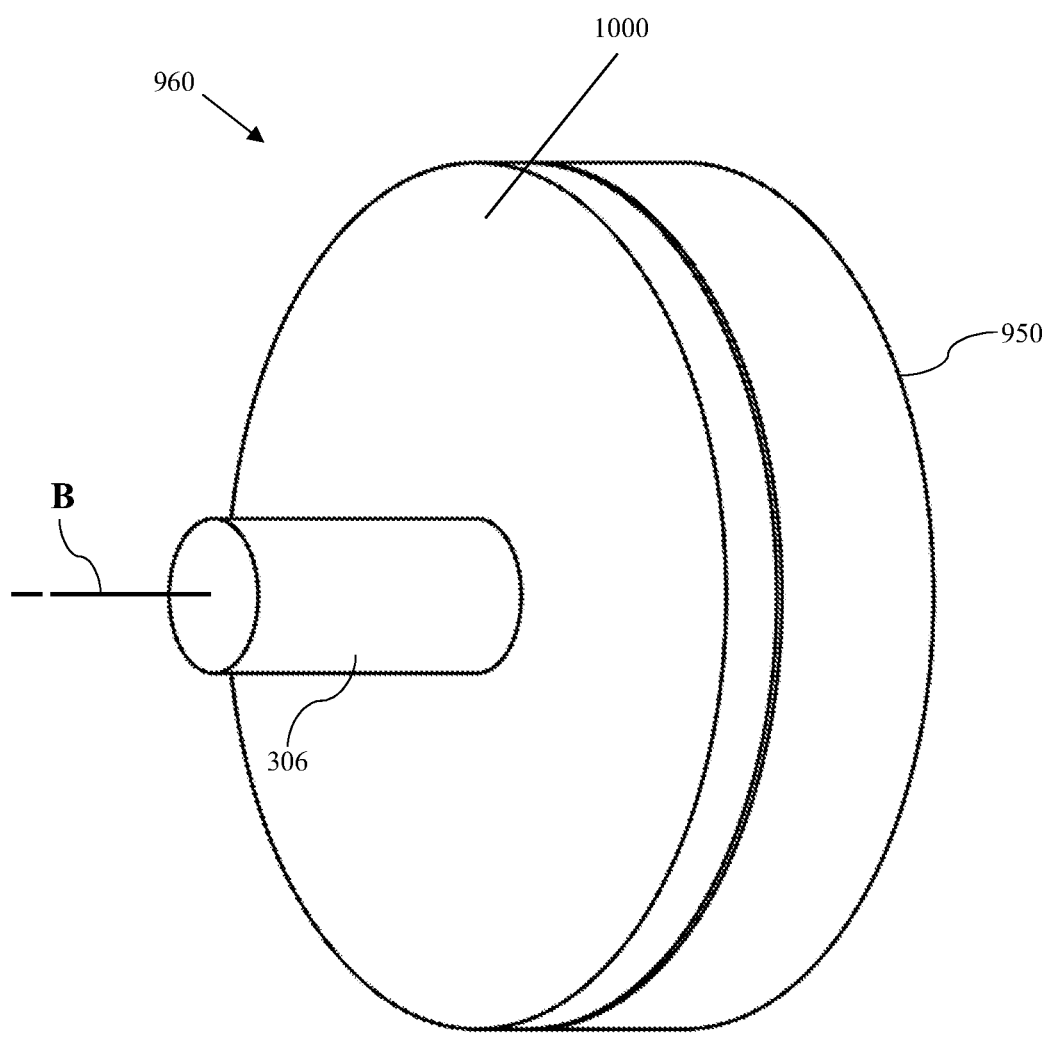
FIG. 43 depicts a perspective view of an exemplary embodiment of a six-pole electric machine of the invention that comprises a six-pole rotor having a plurality of axially-oriented groups of axially-magnetized curvilinear permanent magnets, and a stator.

Referring now to FIGS. 42 and 43, an exemplary embodiment of an electric machine 960 comprising rotor 950, which comprises a plurality of axially oriented curvilinear permanent magnet groups 900 is depicted. Rotor axis of rotation B, direction of rotation B' and rotor shaft 306 are shown for reference. Electric machine 960 also comprises stator 1000, which is disc-shaped and comprises a plurality of magnets 006 which are not shown in the figure for clarity of drawing purposes. The axially-magnetized curvilinear magnets comprising axially magnetized curvilinear permanent magnet group 900 of the rotor 950 are disposed within the stator 1000 magnetic field, such that the rotor magnets are in magnetic communication with, and can be acted upon, by the stator magnetic field, causing the rotor 950 to rotate about axis of rotation B, which causes rotor shaft 306 to rotate when the stator magnets are energized (this is in the case that electric machine 960 is a motor—in the case of a generator, the rotation of rotor 950 would induce an electric current in stator magnets 006). Cover 302 is depicted for reference.

Figure 44:
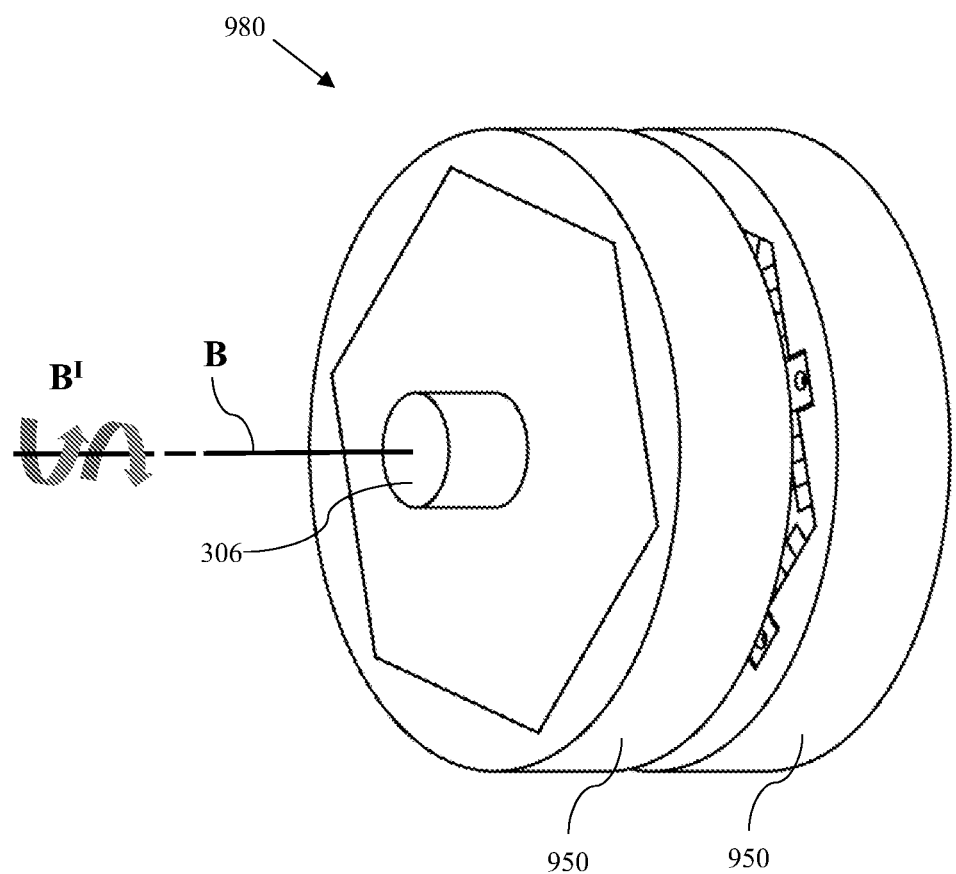
FIG. 44 depicts a perspective view of an exemplary embodiment of a six-pole dual rotor of the invention, wherein each rotor comprises a plurality of axially-oriented groups of axially-magnetized curvilinear permanent magnets, in which the axially-magnetized curvilinear permanent magnets are axially arranged about the rotor axis of rotation.
Figure 45:
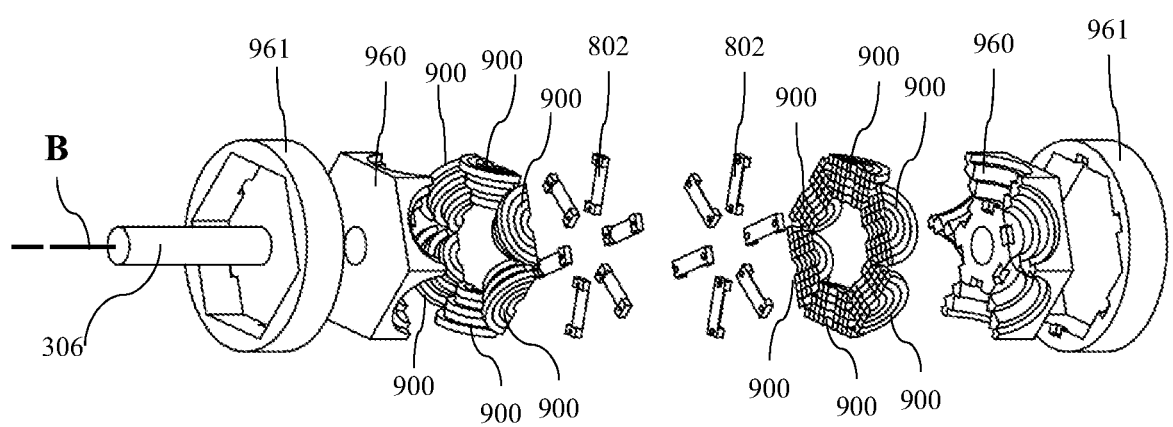
FIG. 45 depicts an exploded view of an exemplary embodiment of a six-pole dual rotor of the invention, wherein each rotor comprises a plurality of axially-oriented groups of axially-magnetized curvilinear permanent magnets, in which the axially-magnetized curvilinear permanent magnets are axially arranged about the rotor axis of rotation.
Figure 46:
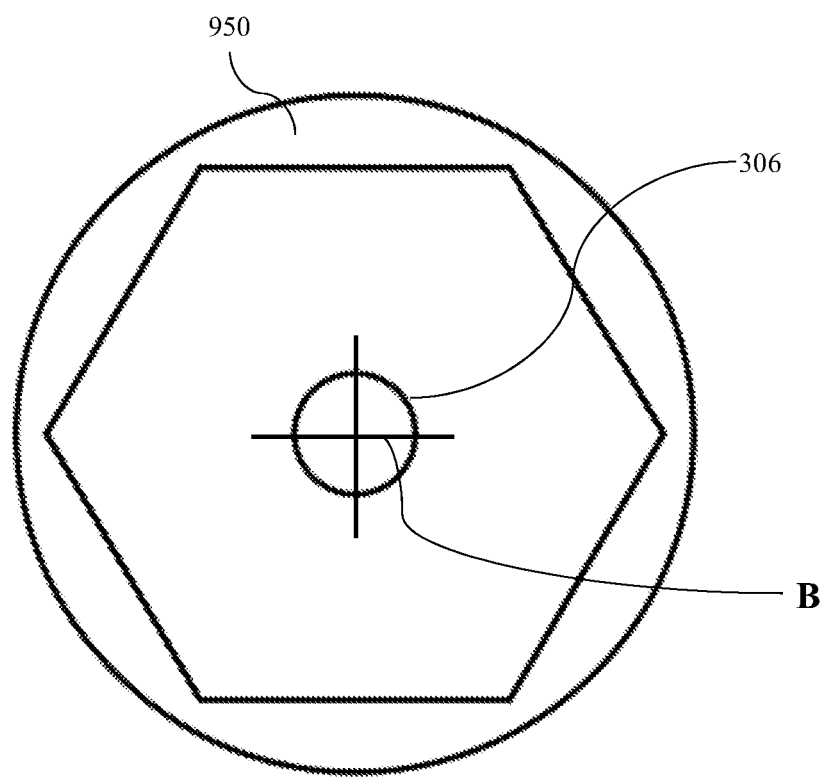
FIG. 46 depicts an end view of an exemplary embodiment of a six-pole dual rotor of the invention, wherein each rotor comprises a plurality of axially-oriented groups of axially-magnetized curvilinear permanent magnets, in which the axially-magnetized curvilinear permanent magnets are axially arranged about the rotor axis of rotation.

Referring now to FIGS. 44-46, an exemplary embodiment of an electric machine dual rotor 980 comprising two rotors 950, each rotor 950 comprising a plurality of axially oriented curvilinear permanent magnet groups 900 as discussed above, is depicted. Each rotor 950 is attached to rotor shaft 306 such that rotor shaft 306 rotates with each rotor 950 about rotor shaft axis of rotation B.

Figure 47:
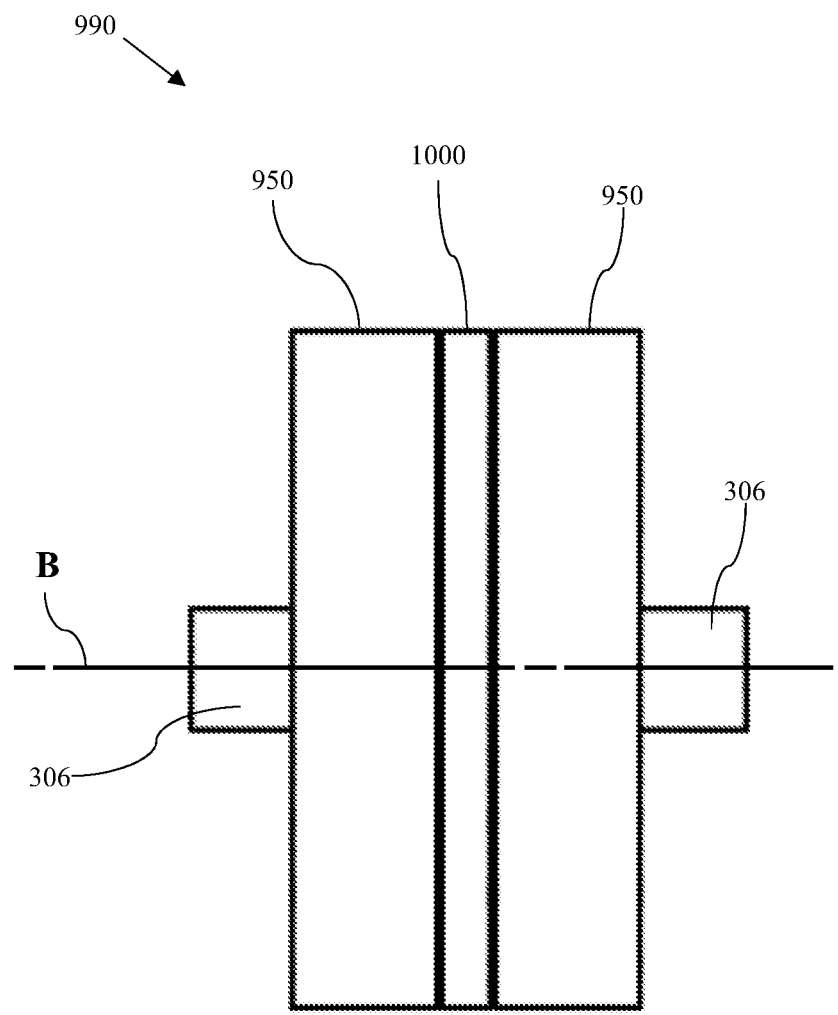
FIG. 47 depicts a side view of an exemplary embodiment of a six-pole electric machine of the invention that comprises two six-pole dual rotors, each having a plurality of axially-oriented groups of axially-magnetized curvilinear permanent magnets, and a stator.
Figure 48:
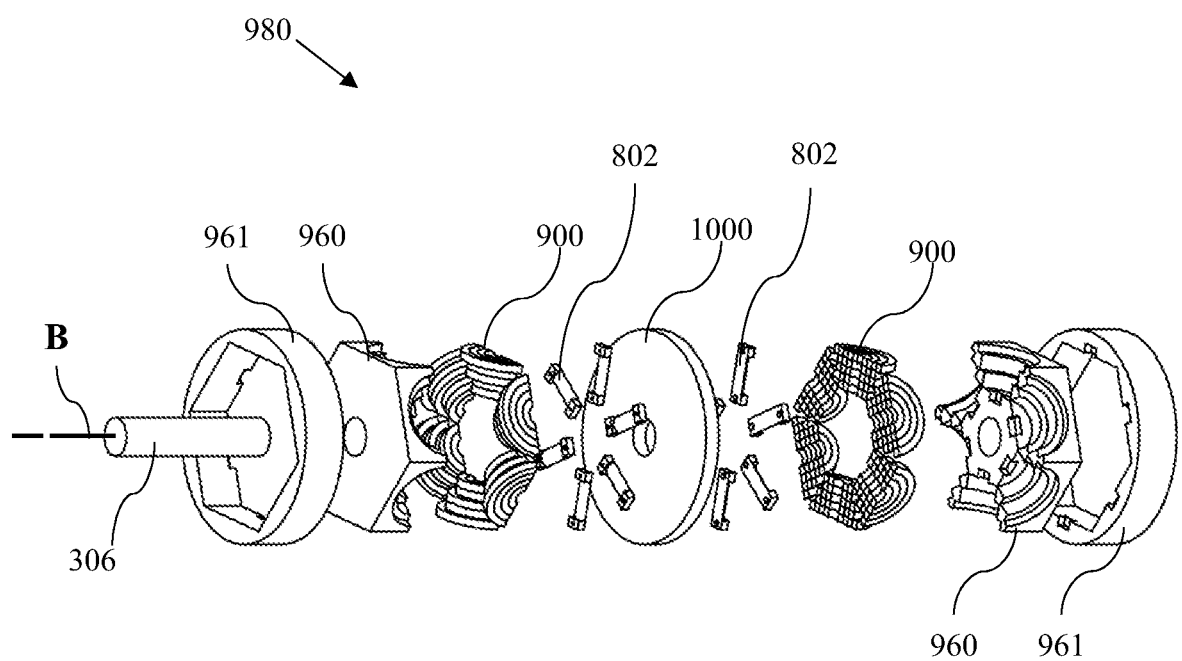
FIG. 48 depicts an exploded view of an exemplary embodiment of a six-pole electric machine of the invention that comprises two six-pole dual rotors, each having a plurality of axially-oriented groups of axially-magnetized curvilinear permanent magnets, and a stator, in which the axially-magnetized curvilinear permanent magnets are axially arranged about the rotor axis of rotation.
Figure 49:
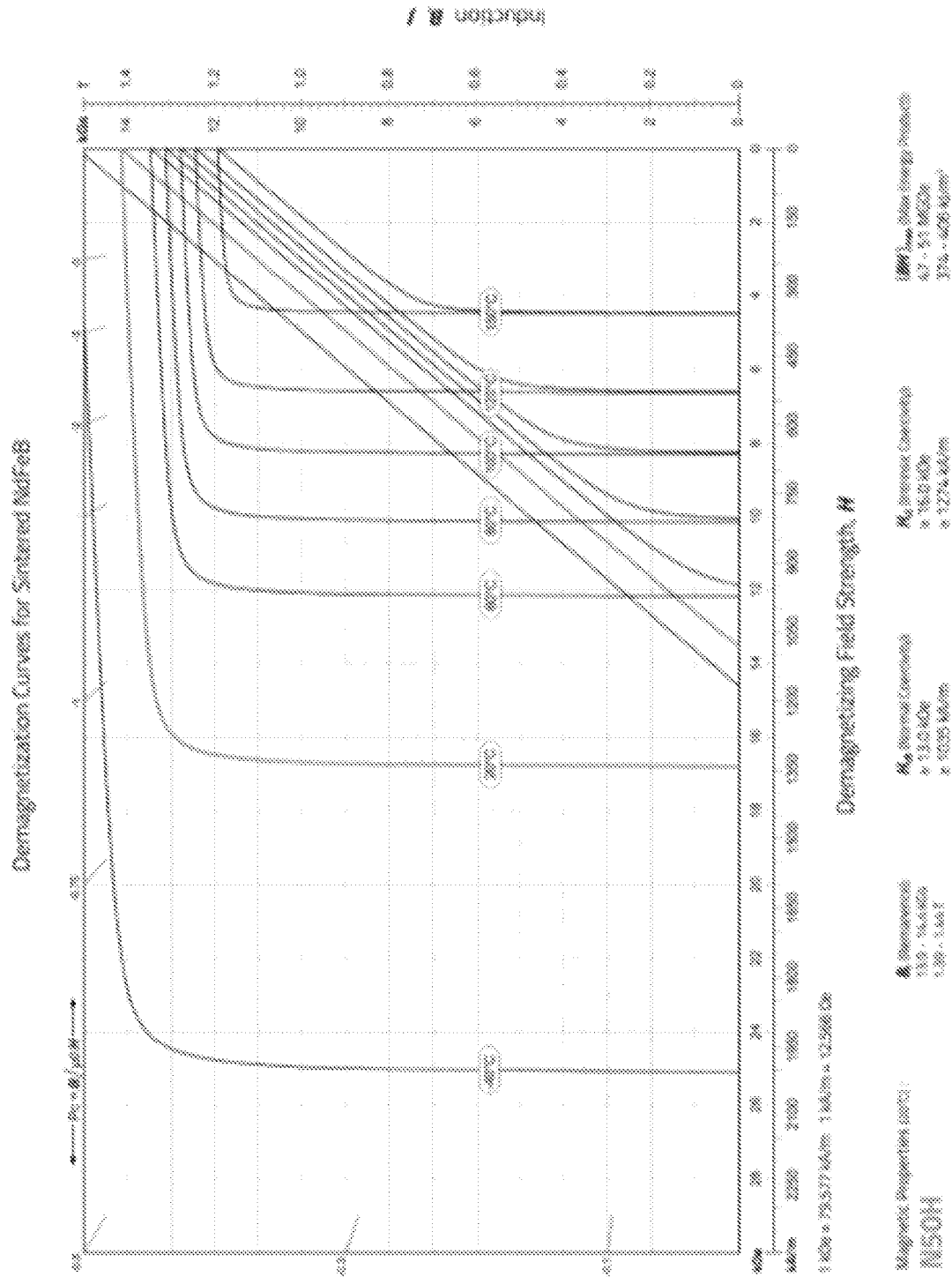
FIG. 49 depicts magnet coercivity degradation over temperature.

Referring now to FIGS. 47 and 48, an exemplary embodiment of a dual rotor electric machine of the invention 990 comprising first and second rotors 980 is depicted. In this embodiment, stator 1000 is disposed between rotors 950. The stator 1000 comprises stator magnets 006, which are not shown, for drawing clarity purposes. The first and second rotors 980 may be mechanically attached to one another and may be directly or indirectly attached to rotor shaft The axially-magnetized curvilinear magnets comprising axially magnetized curvilinear permanent magnet groups 900 of the rotors 950 are disposed within the stator 1000 magnetic field generated by the stator magnets 006, such that the rotor magnets are in magnetic communication with, and can be acted upon, by the stator magnetic field when the stator magnets 006 are energized, causing the dual rotor 980 to rotate about axis of rotation B, which causes rotor shaft 306 to rotate when the stator magnets are energized (this is in the case that electric machine 990 is a motor—in the case that electric machine 990 is a generator, the rotation of rotor 980 by rotation of rotor shaft 306 induces an electric current in stator magnets 006). Outer rotor support ring 502 is depicted for reference.

The axially magnetized curvilinear permanent magnets comprising the invention may be, in embodiments, permanent magnets produced by applicant's "PM-Wire" manufacturing process. The PM-Wire manufacturing process is described in the following U.S. Patent Applications filed in the USPTO, each of which are incorporated herein by reference in their entirety: U.S. patent application Ser. No. 16/089,716 filed in the USPTO on Sep. 28, 2018 entitled "METHOD OF MANUFACTURING PERMANENT MAGNETS" which published from the USPTO as US Publication No. US 2019-0122818 A1 on Apr. 4, 2019, which is hereby incorporated by reference in its entirety herein and U.S. patent application Ser. No. 15/941,810 filed in the USPTO on Mar. 30, 2018 entitled Single-step Manufacturing of FLUX-DIRECTED PERMANENT MAGNET ASSEMBLIES, which published from the USPTO as U.S. Publication No. US 2018-0226190 A1 on Aug. 9, 2018; PM-Wire may be used in the manufacture and production of rotors for electrical machines such as the dual rotor machines described in U.S. patent application Ser. No. 16/089,622 filed in the USPTO on Mar. 28, 2018 and which issued as U.S. Pat. No. 10,892,672 on Jan. 12, 2021, which is incorporated herein by reference in its entirety. The PM-Wire process, and permanent magnets produced by the PM-Wire process, may also comprise any of the teachings of provisional patent application 63/020,039, which is also incorporated herein by reference in its entirety. The PM-Wire process, and permanent magnets produced by the PM-Wire process, also comprise the teachings of provisional patent application 63/020,039, which is also incorporated herein by reference in its entirety. The axially-magnetized curvilinear permanent magnets may also be produced by any of the methods taught in U.S. provisional patent application Ser. No. 63/137,363, entitled PERMANENT MAGNETS HAVING CURVILINEAR SHAPES WITH AXIAL MAGNETIZATION, filed in United States Patent and Trademark Office (USPTO) on Jan. 14, 2021, the disclosure of which is incorporated by reference herein in its entirety; and in International (PCT) Application No. PCT/US21/30980, entitled METHOD FOR CONTINUING MANUFACTURING OF PERMANENT MAGNETS, filed in the United States Receiving Office (USRO) of the USPTO on May 5, 2021, the disclosure of which is incorporated by reference herein in its entirety. Each of the foregoing patent applications and patents are hereby incorporated herein by reference in their entirety and form a part of this disclosure. The PM-Wire permanent magnet manufacturing method is a novel manufacturing process that is, in embodiments, based on a powder-in-tube process in which a permanent magnetic powder material is placed in a metal tube under a magnetic field to align the powder and create a preferred direction of magnetization. The magnetic powder material and tube may then be compressed until the cross-sectional area of the magnet is reduced as desired, in embodiments by 50% or more. Further, the PM-Wire process may comprise the steps of providing an elongate curvilinear permanent magnet having a curvilinear longitudinal axis; placing said elongate curvilinear permanent magnet in a magnetic field that, for the length of the elongate curvilinear permanent magnet, the magnetic field magnetization vector is aligned with the curvilinear longitudinal axis of said curvilinear permanent magnet; wherein the magnetic field is of sufficient strength, and is applied for a long enough period of time, that the magnetic material comprising the elongate permanent magnet is permanent axially magnetized with a magnetization vector that is aligned with the curvilinear longitudinal axis of the elongate curvilinear permanent magnet. The resulting elongate PM-Wire permanent magnet may have a high length-to-cross sectional area such as, for example up to 1.5 m/0.04 $m^2$ or greater. The resulting elongate PM-Wire permanent magnet may then be shaped, sintered/heat treated and magnetized as disclosed in the various PM-Wire references mentioned above. For example, the resulting elongate PM-Wire permanent magnet may be formed into a desired curvilinear shape using any known mechanical technique for forming elongate structures. In the case in which the desired curvilinear shape is arcuate, roll-forming, or forming over a mandrel or system of mandrels, may be employed to shape the elongate PM-Wire permanent magnet into an arcuate shape of desired radius. The desired inside radius, for example, may be R2 as depicted in FIG. 22. The resulting curvilinear, arcuate shaped elongate PM-Wire permanent magnet may then be cut into proper arcuate length L as depicted in FIG. 22. The curvilinear permanent magnet thus formed may be finally magnetized either before forming and cutting to length, during forming and cutting to length or after forming and cutting to length, as described relative to FIGS. 50 and 51 below.

Figure 50:
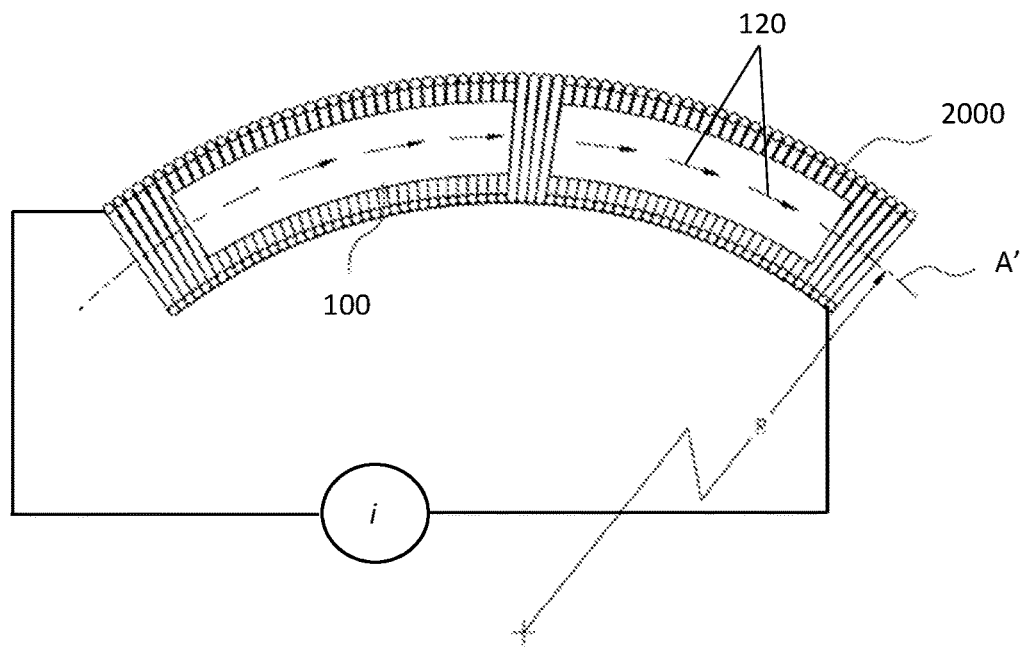
FIGS. 50 and 51 depict systems for providing the axial magnetization of the axially-magnetized the curvilinear permanent magnets of the invention.
Figure 51:
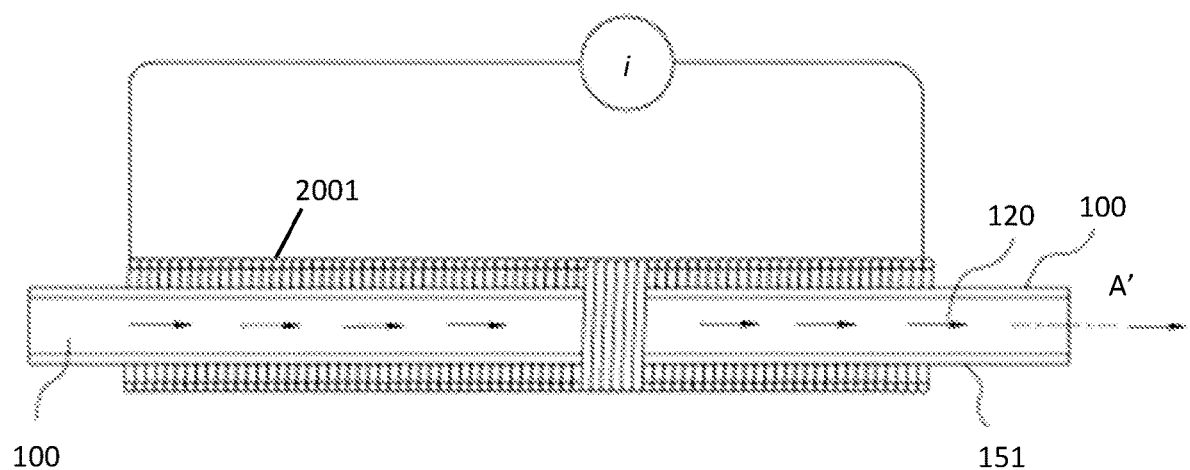

Referring now to FIGS. 50 and 51, an exemplary embodiment of a magnetizing arrangement for producing the axial magnetization of the axially-magnetized curvilinear permanent magnets 100, 100a, 100b, and so on, of the invention is depicted. A curvilinear magnet 100 (or 100a, 100b and so on) of the invention may be produced by any method, but may, in embodiments, produced by the PM-Wire method as described above. If magnetized after forming and cutting, the setup of FIG. 50 applies. In this case, the permanent magnet, which may be a PM Wire magnet, is passed through or placed with a solenoid 2000 having a curvilinear, or arcuate, axis that is formed to radius R such that permanent magnet is received by solenoid 2001. An electric current i is passed through the solenoid winding, producing a magnetic field within the solenoid that has a magnetic component 120 that is directed along the curvilinear axis of permanent magnet 100, 100a, 100b, etc. Current i is applied at high enough amperage and for a long enough duration of time to permanently axially magnetize the magnetic material comprising curvilinear permanent magnet 100, 100a, 100b, etc. such that the direction of magnetization within curvilinear permanent magnet 100, 100a, 100b, etc. is aligned with its curvilinear axis, which may be an arcuate axis. If curvilinear permanent magnet 100, 100a, 100b, etc. is magnetized before forming and cutting, the setup of FIG. 51 applies. In this case, the permanent magnet, which may be a PM Wire magnet, is passed through or placed with a solenoid 2001 having a linear axis that is formed such that the permanent magnet is received by solenoid 2001. An electric current i is passed through the solenoid winding, producing a magnetic field within the solenoid that has a magnetic component 120 that is directed along the linear axis of permanent magnet 100, 100a, 100b, etc. Current i is applied at high enough amperage and for a long enough duration of time to permanently axially magnetize the magnetic material comprising curvilinear permanent magnet 100, 100a, 100b, etc. such that the direction of magnetization within permanent magnet 100, 100a, 100b, etc. is aligned with its axis. The resulting axially-magnetized permanent magnet may then be shaped into any curvilinear shape, such as the arcuate shape depicted in FIGS. 21 and 22, producing an axially-magnetized curvilinear permanent magnet of the invention.

In the description of operation of the axially-magnetized curvilinear permanent magnets of the invention, and in the description of operation of rotors and electric machines of the invention using such axially-magnetized curvilinear permanent magnets, it is understood that although electric motor operation may be described relative to the embodiments, the schemes and principles of the invention apply to electric generator operation of the embodiments as well, and that the magnets, rotors, and electric machines of the invention include all rotating electric machines within their scope, including both electric motors and electric generators. Likewise, while examples of rotors and electric machines having certain number of poles are shown and described, it is understood that the scope of the invention is not limited by number of rotor poles. Thus, the scope of the embodiments of the axially-magnetized, curvilinear permanent magnets, rotors, and electric machines of the invention includes any number of rotor poles, including but not limited to two, four, six, eight or more rotor poles.

In embodiments, the invention may comprise a system of permanent magnets for an outer rotor of a dual rotor electric machine, comprising: a plurality of axially-magnetized curvilinear permanent magnets that are configured in an outer rotor of a dual rotor electric machine; each magnet of the plurality of axially-magnetized curvilinear permanent magnets being elongate, having a cross sectional shape, and having a curvilinear longitudinal axis; wherein each magnet of the plurality of axially-magnetized curvilinear permanent magnets is disposed such that the resulting magnetic field vector inside each of the plurality of axially-magnetized curvilinear permanent magnets is substantially aligned with said curvilinear permanent magnet axial magnetization. The curvilinear longitudinal axis of each magnet of said plurality of axially-magnetized curvilinear permanent magnets may be arcuate in shape, the arcuate shape having an apex, and an open end, and wherein the curvilinear longitudinal axis each magnet of the plurality of axially-magnetized curvilinear permanent magnets is contained within a plane. The plane of the curvilinear longitudinal axis each magnet of the plurality of axially-magnetized curvilinear permanent magnets may be oriented orthogonally to an axis of rotation of a rotor comprising the plurality of axially-magnetized curvilinear permanent magnets. The apex of the arcuate-shaped longitudinal axis of each magnet of the plurality of axially-magnetized curvilinear permanent magnets may be oriented away from the axis of rotation of said rotor. The axially-magnetized curvilinear permanent magnets may be arranged into an even number of arrays, each array comprising two or more axially-magnetized curvilinear permanent magnets nested together with their magnetic North ends adjacent to one another, forming an array magnetic North end, and with their magnetic South ends adjacent to one another, forming an array magnetic South end; and wherein each array is oriented so that its array magnetic North pole end is adjacent to an array magnetic North pole end of the adjacent array, and each array oriented so that its array magnetic South pole end is adjacent to an array magnetic South pole end of the opposing adjacent array. The axially-magnetized curvilinear permanent magnets may be arranged into an even number of groups; wherein each group comprises a plurality of stacked arrays; each array comprising two or more axially-magnetized curvilinear permanent magnets nested together with their magnetic North ends adjacent to one another, forming an array magnetic North end, and with their magnetic South ends adjacent to one another, forming an array magnetic South end; and the arrays being stacked such that the array magnetic North ends are stacked one above the other, forming a group North pole end, and the array magnetic South ends are stacked one above the other, forming a group South pole end; wherein, each group is oriented so that its group magnetic North pole end is adjacent to a group magnetic North pole end of the adjacent group, and each group is oriented so that its group magnetic South pole end is adjacent to a group magnetic South pole end of the opposing adjacent array.

Further, the axially-magnetized curvilinear permanent magnets may be arranged into an even number of groups; wherein each group comprises a plurality of offset-stacked arrays, wherein each array in each stack of arrays is offset by a predetermined distance from the array immediately below the array directly underneath; wherein each array comprises two or more axially-magnetized curvilinear permanent magnets nested together with their magnetic North ends adjacent to one another, forming an array magnetic North end, and with their magnetic South ends adjacent to one another, forming an array magnetic South end; and the arrays may be stacked such that the array magnetic North ends are stacked one above the other, forming a group North pole end, and the array magnetic South ends are stacked one above the other, forming a group South pole end. Each group may be oriented so that its group magnetic North pole end is adjacent to a group magnetic North pole end of the adjacent group, and each group may be oriented so that its group magnetic South pole end is adjacent to a group magnetic South pole end of the opposing adjacent array.

The permanent magnets may comprise a magnetic material characterized by a coercivity of less than 0.9 Tesla at 20° C., the permanent magnets each having less than 20% by volume demagnetization when operating at 150° C.

In embodiments, the invention may comprise a permanent magnet rotor for an electrical machine, comprising: a plurality of axially-magnetized curvilinear permanent magnets that are configured in said rotor so as to be in magnetic communication with the magnets of a stator, forming a rotor-stator pair for use in an electric machine; each magnet of said plurality of axially-magnetized curvilinear permanent magnets being elongate, having a cross sectional shape, and having a curvilinear longitudinal axis; wherein each magnet of said plurality of axially-magnetized curvilinear permanent magnets is disposed such that the resulting magnetic field vector inside each of the plurality of axially-magnetized curvilinear permanent magnets is substantially aligned with said curvilinear permanent magnet axial magnetization; a structure for supporting said plurality of axially-magnetized curvilinear permanent magnets; and a rotor shaft rotatably attached to said structure, said rotor shaft having a longitudinal axis. The curvilinear longitudinal axis of each magnet of the plurality of axially-magnetized curvilinear permanent magnets may be arcuate in shape, the arcuate shape having an apex, and an open end, and wherein the curvilinear longitudinal axis each magnet of the plurality of axially-magnetized curvilinear permanent magnets may be contained within a plane. The plane of the curvilinear longitudinal axis each magnet of the plurality of axially-magnetized curvilinear permanent magnets may be oriented orthogonally to an axis of rotation of the rotor.

The apex of the arcuate-shaped longitudinal axis of each magnet of the plurality of axially-magnetized curvilinear permanent magnets may be oriented towards the axis of rotation of the rotor. The axially-magnetized curvilinear permanent magnets are arranged into an even number of arrays, each array comprising two or more axially-magnetized curvilinear permanent magnets nested together with their magnetic North ends adjacent to one another, forming an array magnetic North end, and with their magnetic South ends adjacent to one another, forming an array magnetic South end; and each array may be oriented so that its array magnetic North pole end is adjacent to an array magnetic North pole end of the adjacent array, and each array may be oriented so that its array magnetic South pole end is adjacent to an array magnetic South pole end of the opposing adjacent array.

The axially-magnetized curvilinear permanent magnets may be arranged into an even number of groups; wherein each group comprises a plurality of stacked arrays; each array comprising two or more axially-magnetized curvilinear permanent magnets nested together with their magnetic North ends adjacent to one another, forming an array magnetic North end, and with their magnetic South ends adjacent to one another, forming an array magnetic South end; and the arrays being stacked such that the array magnetic North ends are stacked one above the other, forming a group North pole end, and the array magnetic South ends are stacked one above the other, forming a group South pole end; wherein, each group is oriented so that its group magnetic North pole end is adjacent to a group magnetic North pole end of the adjacent group, and each group is oriented so that its group magnetic South pole end is adjacent to a group magnetic South pole end of the opposing adjacent array.

The axially-magnetized curvilinear permanent magnets may be arranged into an even number of groups wherein each group comprises a plurality of offset-stacked arrays, wherein each array in each stack of arrays is offset by a predetermined distance from the array immediately below the array directly underneath; each array comprising two or more axially-magnetized curvilinear permanent magnets nested together with their magnetic North ends adjacent to one another, forming an array magnetic North end, and with their magnetic South ends adjacent to one another, forming an array magnetic South end; and the arrays may be stacked such that the array magnetic North ends are stacked one above the other, forming a group North pole end, and the array magnetic South ends are stacked one above the other, forming a group South pole end; wherein, each group is oriented so that its group magnetic North pole end is adjacent to a group magnetic North pole end of the adjacent group, and each group is oriented so that its group magnetic South pole end is adjacent to a group magnetic South pole end of the opposing adjacent array. The plane of the curvilinear longitudinal axis each magnet of the plurality of axially-magnetized curvilinear permanent magnets may be oriented parallel to an axis of rotation of a rotor comprising said plurality of axially-magnetized curvilinear permanent magnets. The apex of the arcuate-shaped longitudinal axis of each magnet of the plurality of axially-magnetized curvilinear permanent magnets may be oriented towards said axis of rotation of said rotor. The axially-magnetized curvilinear permanent magnets may be arranged into an even number of arrays, each array may comprise two or more axially-magnetized curvilinear permanent magnets nested together with their magnetic North ends adjacent to one another, forming an array magnetic North end, and with their magnetic South ends adjacent to one another, forming an array magnetic South end; and each array may be oriented so that its array magnetic North pole end is adjacent to an array magnetic North pole end of the adjacent array, and each array may be oriented so that its array magnetic South pole end is adjacent to an array magnetic South pole end of the opposing adjacent array.

The axially-magnetized curvilinear permanent magnets may be arranged into an even number of groups; wherein each group comprises a plurality of stacked arrays; each array may comprise two or more axially-magnetized curvilinear permanent magnets nested together with their magnetic North ends adjacent to one another, forming an array magnetic North end, and with their magnetic South ends adjacent to one another, forming an array magnetic South end; the arrays being stacked such that the array magnetic North ends are stacked one above the other, forming a group North pole end, and the array magnetic South ends are stacked one above the other, forming a group South pole end; wherein, each group may be oriented so that its group magnetic North pole end is adjacent to a group magnetic North pole end of the adjacent group, and each group may be oriented so that its group magnetic South pole end is adjacent to a group magnetic South pole end of the opposing adjacent array.

Each magnet of said plurality of axially-magnetized curvilinear permanent magnets comprise a magnetic material characterized by a coercivity of less than 0.9 Tesla at 20° C., the axially-magnetized curvilinear permanent magnets each having less than 20% by volume demagnetization when operating at 150° C.

In embodiments, the invention may further comprise a permanent magnet outer rotor for a dual rotor electric machine, comprising: a plurality of axially-magnetized curvilinear permanent magnets that are configured in an outer rotor of a dual rotor electric machine; each magnet of the plurality of axially-magnetized curvilinear permanent magnets being elongate, having a cross sectional shape, and having a curvilinear longitudinal axis; wherein each magnet of the plurality of axially-magnetized curvilinear permanent magnets is disposed such that the resulting magnetic field vector inside each of the plurality of axially-magnetized curvilinear permanent magnets is substantially aligned with said curvilinear permanent magnet axial magnetization; a structure for supporting said plurality of axially-magnetized curvilinear permanent magnets; a rotor shaft attached to said structure, said rotor shaft having a longitudinal axis. The curvilinear longitudinal axis of each magnet of the plurality of axially-magnetized curvilinear permanent magnets is arcuate in shape, the arcuate shape having an apex, and an open end, and wherein the curvilinear longitudinal axis each magnet of said plurality of axially-magnetized curvilinear permanent magnets is contained within a plane. The plane of said curvilinear longitudinal axis each magnet of said plurality of axially-magnetized curvilinear permanent magnets is oriented orthogonally to an axis of rotation of a rotor comprising said plurality of axially-magnetized curvilinear permanent magnets. The apex of the arcuate-shaped longitudinal axis of each magnet of said plurality of axially-magnetized curvilinear permanent magnets is oriented away from said axis of rotation of said rotor. The axially-magnetized curvilinear permanent magnets may be arranged into an even number of arrays, each array comprising two or more axially-magnetized curvilinear permanent magnets nested together with their magnetic North ends adjacent to one another, forming an array magnetic North end, and with their magnetic South ends adjacent to one another, forming an array magnetic South end; and wherein each array is oriented so that its array magnetic North pole end is adjacent to an array magnetic North pole end of the adjacent array, and each array oriented so that its array magnetic South pole end is adjacent to an array magnetic South pole end of the opposing adjacent array. The axially-magnetized curvilinear permanent magnets may be arranged into an even number of groups; wherein each group comprises a plurality of stacked arrays; each array comprising two or more axially-magnetized curvilinear permanent magnets nested together with their magnetic North ends adjacent to one another, forming an array magnetic North end, and with their magnetic South ends adjacent to one another, forming an array magnetic South end; and the arrays being stacked such that the array magnetic North ends are stacked one above the other, forming a group North pole end, and the array magnetic South ends are stacked one above the other, forming a group South pole end; wherein, each group is oriented so that its group magnetic North pole end is adjacent to a group magnetic North pole end of the adjacent group, and each group is oriented so that its group magnetic South pole end is adjacent to a group magnetic South pole end of the opposing adjacent array. The axially-magnetized curvilinear permanent magnets are arranged into an even number of groups; wherein each group comprises a plurality of offset-stacked arrays, wherein each array in each stack of arrays is offset by a predetermined distance from the array immediately below the array directly underneath; each array comprising two or more axially-magnetized curvilinear permanent magnets nested together with their magnetic North ends adjacent to one another, forming an array magnetic North end, and with their magnetic South ends adjacent to one another, forming an array magnetic South end; and the arrays being stacked such that the array magnetic North ends are stacked one above the other, forming a group North pole end, and the array magnetic South ends are stacked one above the other, forming a group South pole end; wherein, each group is oriented so that its group magnetic North pole end is adjacent to a group magnetic North pole end of the adjacent group, and each group is oriented so that its group magnetic South pole end is adjacent to a group magnetic South pole end of the opposing adjacent array. Each magnet of said plurality of axially-magnetized curvilinear permanent magnets comprise a magnetic material characterized by a coercivity of less than 0.9 Tesla at 20° C., the axially-magnetized curvilinear permanent magnets each having less than 20% by volume demagnetization when operating at 150° C.

The invention may further comprise an axially-magnetized curvilinear permanent magnet having a length, produced by the steps of:

provide an elongate curvilinear permanent magnet having a curvilinear longitudinal axis;

placing said elongate curvilinear permanent magnet in a magnetic field that, for the length of the elongate curvilinear permanent magnet, the magnetic field magnetization vector is aligned with the curvilinear longitudinal axis of said curvilinear permanent magnet;

wherein the magnetic field is of sufficient strength, and is applied for a long enough period of time, that the magnetic material comprising the elongate permanent magnet is permanent axially magnetized with a magnetization vector that is aligned with the curvilinear longitudinal axis of the elongate curvilinear permanent magnet, wherein:

The curvilinear longitudinal axis may be further defined as being arcuate; and

The curvilinear permanent magnet may be produced by the steps of:

providing a tube having an interior volume a length, a first end, and a second end;

providing a magnetic powder;

filling the interior volume of the tube with anisotropic magnetic powder while subjecting the anisotropic magnetic powder to a pre-aligning magnetic field while the magnetic powder is being poured into the tube; and subjecting the exterior surfaces of the tube to compressive forces, reducing the cross-sectional size of the tube, and compressing the magnetic material within the tube.

The invention comprises the above described methods, structures, devices, apparatuses and processes, as well as all legally equivalent embodiments. The embodiments of the invention may comprise any of the features, steps and elements described herein or depicted in the accompanying figures, in any number, order, orientation, configuration, or combination. The descriptions and figures are exemplary of the invention concepts comprising the invention, and thus are not intended to specifically limit scope of the invention to only the combinations or configurations described or depicted.

What is claimed is:

1. A system of permanent magnets for a rotor of an electric machine, comprising:

a plurality of axially-magnetized curvilinear permanent magnets that are configured in a rotor;
each magnet of said plurality of axially-magnetized curvilinear permanent magnets being elongate, having a cross sectional shape, and having a curvilinear longitudinal axis;
wherein each magnet of said plurality of axially-magnetized curvilinear permanent magnets is disposed such that the resulting magnetic field vector inside each of the plurality of axially-magnetized curvilinear permanent magnets is substantially aligned with said curvilinear permanent magnet axial magnetization;
wherein the curvilinear longitudinal axis of each magnet of said plurality of axially-magnetized curvilinear permanent magnets is further defined as being arcuate in shape, said arcuate shape having an apex, and an open end, and wherein said curvilinear longitudinal axis of each magnet of said plurality of axially-magnetized curvilinear permanent magnets is contained within a plane;
wherein the plane of said curvilinear longitudinal axis each magnet of said plurality of axially-magnetized curvilinear permanent magnets is oriented orthogonally to an axis of rotation of a rotor comprising said plurality of axially-magnetized curvilinear permanent magnets;
wherein the apex of the arcuate-shaped longitudinal axis of each magnet of said plurality of axially-magnetized curvilinear permanent magnets is oriented towards said axis of rotation of said rotor;
wherein the axially-magnetized curvilinear permanent magnets are arranged into an even number of arrays, each array comprising two or more axially-magnetized curvilinear permanent magnets nested together with their magnetic North ends adjacent to one another, forming an array magnetic North end, and with their magnetic South ends adjacent to one another, forming an array magnetic South end; and
wherein each array is oriented so that its array magnetic North pole end is adjacent to an array magnetic North pole end of the adjacent array, and each array oriented so that its array magnetic South pole end is adjacent to an array magnetic South pole end of the opposing adjacent array.

2. The system of permanent magnets of claim 1, wherein the number of array North pole ends is two, and the number of array South pole ends is two, forming a four-pole permanent magnet rotor.

3. The system of permanent magnets of claim 1, wherein the number of array North pole ends is three, and the number of array South pole ends is three, forming a six-pole permanent magnet rotor.

4. The system of permanent magnets of claim 1, wherein the number of array North pole ends is four, and the number of array South pole ends is four, forming an eight-pole permanent magnet rotor.

5. The system of permanent magnets of claim 1, wherein the number of axially-magnetized curvilinear permanent magnets comprising each array is three.

6. The system of permanent magnets of claim 1:
wherein the axially-magnetized curvilinear permanent magnets are arranged into an even number of groups;
wherein each group comprises a plurality of stacked arrays;
each array comprising two or more axially-magnetized curvilinear permanent magnets nested together with their magnetic North ends adjacent to one another, forming an array magnetic North end, and with their magnetic South ends adjacent to one another, forming an array magnetic South end; and
the arrays being stacked such that the array magnetic North ends are stacked one above the other, forming a group North pole end, and the array magnetic South ends are stacked one above the other, forming a group South pole end;
wherein, each group is oriented so that its group magnetic North pole end is adjacent to a group magnetic North pole end of the adjacent group, and each group is oriented so that its group magnetic South pole end is adjacent to a group magnetic South pole end of the opposing adjacent array.

7. The system of permanent magnets of claim 6, wherein the number of group North pole ends is two, and the number of group South pole ends is two, forming a four-pole permanent magnet rotor.

8. The system of permanent magnets of claim 6, wherein the number of group North pole ends is three, and the number of group South pole ends is three, forming a six-pole permanent magnet rotor.

9. The system of permanent magnets of claim 6, wherein the number of group North pole ends is four, and the number of group South pole ends is four, forming an eight-pole permanent magnet rotor.

10. The system of permanent magnets of claim 6, wherein the number of axially-magnetized curvilinear permanent magnets comprising each array is three.

11. The system of permanent magnets of claim 1:
wherein the axially-magnetized curvilinear permanent magnets are arranged into an even number of groups;
wherein each group comprises a plurality of offset-stacked arrays, wherein each array in each stack of arrays is offset by a predetermined distance from the array immediately below the array directly underneath;
each array comprising two or more axially-magnetized curvilinear permanent magnets nested together with their magnetic North ends adjacent to one another, forming an array magnetic North end, and with their magnetic South ends adjacent to one another, forming an array magnetic South end; and
the arrays being stacked such that the array magnetic North ends are stacked one above the other, forming a group North pole end, and the array magnetic South ends are stacked one above the other, forming a group South pole end;
wherein, each group is oriented so that its group magnetic North pole end is adjacent to a group magnetic North pole end of the adjacent group, and each group is oriented so that its group magnetic South pole end is adjacent to a group magnetic South pole end of the opposing adjacent array.

12. The system of permanent magnets of claim 11, wherein the number of group North pole ends is two, and the number of group South pole ends is two, forming a four-pole permanent magnet rotor.

13. The system of permanent magnets of claim 11, wherein the number of group North pole ends is three, and the number of group South pole ends is three, forming a six-pole permanent magnet rotor.

14. The system of permanent magnets of claim 11, wherein the number of group North pole ends is four, and the number of group South pole ends is four, forming an eight-pole permanent magnet rotor.

15. The system of permanent magnets of claim 11, wherein the number of axially-magnetized curvilinear permanent magnets comprising each array is three.

* * * * *